United States Patent [19]

Schlack et al.

[11] Patent Number: 5,392,447
[45] Date of Patent: Feb. 21, 1995

[54] IMAGE-BASED ELECTRONIC POCKET ORGANIZER WITH INTEGRAL SCANNING UNIT

[75] Inventors: Carl W. Schlack, Rochester; J. Terrence Flynn, Fairport; Jay B. Soper; Kenneth G. Corl, both of Rochester; Roger S. Gaborski, Pittsford; Robert H. Philbrick, Rochester, all of N.Y.

[73] Assignee: Eastman Kodak Compay, Rochester, N.Y.

[21] Appl. No.: 819,390

[22] Filed: Jan. 10, 1992

[51] Int. Cl.⁶ .............................................. G06F 15/62
[52] U.S. Cl. .................................... 395/800; 395/800; 364/231; 364/231.1; 364/231.2; 364/231.3; 364/231.31; 364/237.1; 364/237.82; 364/237.9; 364/DIG. 1
[58] Field of Search ................ 395/800, 200, 250; 364/DIG. 1, DIG. 2, 231, 231.1, 231.2, 231.3, 231.31, 237.1, 237.82, 237.9

[56] References Cited

U.S. PATENT DOCUMENTS

| | | | |
|---|---|---|---|
| 3,621,265 | 11/1971 | Berler | 250/219 D |
| 4,117,542 | 9/1978 | Klausner et al. | 364/900 |
| 4,118,687 | 10/1978 | McWaters et al. | 382/57 |
| 4,143,417 | 3/1979 | Wald et al. | 364/900 |
| 4,459,036 | 7/1984 | Sado et al. | 368/251 |
| 4,631,577 | 12/1986 | Yamamishi | 358/503 |
| 4,634,845 | 1/1987 | Hale et al. | 235/350 |
| 4,654,818 | 3/1987 | Wetterau, Jr. | 364/900 |
| 4,715,010 | 12/1987 | Inoue et al. | 364/705 |
| 4,750,049 | 6/1988 | Murakami et al. | 358/296 |
| 4,757,388 | 7/1988 | Someya et al. | 358/224 |
| 4,771,277 | 9/1988 | Barbee et al. | 345/173 |
| 4,824,109 | 4/1989 | Cervantes | 473/70 |
| 4,847,760 | 7/1989 | Yagi | 364/400 |
| 4,849,815 | 7/1989 | Streck | 379/100 |
| 4,887,165 | 12/1989 | Sato et al. | 358/474 |
| 4,888,635 | 12/1989 | Harada et al. | 358/509 |
| 4,890,258 | 12/1989 | Tsugei et al. | 364/900 |
| 4,890,832 | 1/1990 | Komaki | 237/1 E |
| 4,899,228 | 2/1990 | Sano et al. | 358/473 |
| 4,912,640 | 3/1990 | Tsugei | 364/400 |
| 4,914,568 | 4/1990 | Kodosky et al. | 364/200 |
| 4,937,676 | 6/1990 | Finelli et al. | 348/375 |
| 4,943,868 | 7/1990 | Yoshinaga et al. | 358/403 |
| 4,980,910 | 12/1990 | Oba et al. | 379/355 |
| 4,982,344 | 1/1991 | Jordan | 364/521 |
| 5,077,612 | 12/1991 | Megrgardt et al. | 348/231 |
| 5,208,745 | 5/1993 | Quentin et al. | 364/188 |
| 5,221,838 | 6/1993 | Gutman et al. | 235/379 |

FOREIGN PATENT DOCUMENTS

| | | |
|---|---|---|
| 0393509 | 10/1990 | European Pat. Off. . |
| 0411698 | 2/1991 | European Pat. Off. . |
| 0438298 | 7/1991 | European Pat. Off. . |

OTHER PUBLICATIONS

Patent Abstracts of Japan; vol. 15, No. 380 (p-1256) 24 Sep. 1991 & JP,A,31 49 661 (Kenwood Corp.) 26 Jun. 1991*.

Patent Abstracts of Japan; vol. 7, No. 184 (p-216) 13 Aug. 1983 & JP,A,58 086 657 (Ricoh KK) 24 May 1983*.

*Primary Examiner*—Alyssa H. Bowler
*Assistant Examiner*—Dzung C. Nguyen
*Attorney, Agent, or Firm*—Dennis R. Arndt

[57] ABSTRACT

An electronic organizer is provided that incorporates an internal electronic scanner and a touch sensitive display screen to enter text and image data. The internal electronic scanner permits both machine generated text and image data to be scanned and directly entered into the electronic organizer. Hand-printed text data is also entered directly via the touch sensitive display screen using a stylus or pen. The scanned machine generated text, the scanned image data and the hand-printed text can either be preserved as an image-oriented bit map, or optical character recognition routines can be applied to the data to identify characters and convert the identified characters to computer coded text data. Data entered into the electronic organizer is arranged in a relational database format, which permits the operator to quickly and easily enter and retrieve related information between a number of different databases with a minimal amount of effort. A small document transport mechanism is provided to aid in the scanning of small size documents.

15 Claims, 20 Drawing Sheets

FIG. 7

| | INFORMATION | SCHEDULE | MEMO | ← | ↓ | ↑ | → |
|---|---|---|---|---|---|---|---|

| | | | | | To Do | Sched |
|---|---|---|---|---|---|---|
| | Mon | Tues | Wed | Thurs | Fri | Sat | Sun |
| Time | Person | | | Location | | Purpose | |
| 7:00 | x Roger Brown | | | Rm 235 | | Consult | |
| 7:30 | | | | | | | |
| 8:00 | x Marie Wilson | | | Rm 440 | | Post Op | |
| 8:30 | x W. Jefferson | | | Rm 250 | | Follow Up | |
| 9:00 | Dr. Howe | | | His Office | | Building Fund | |
| 9:30 | x Henrietta Ark | | | Rm 444 | | Consult | |
| 10:00 | Office | | | | | Prepare seminar | |
| 10:30 | | | | | | | |
| 11:00 | | | | | | | |
| 11:30 | | | | | | | |
| 12:00 | | | | Conf Rm 2B | | Intern Seminar | |
| 12:30 | | | | | | | |
| 1:00 | | | | | | | |
| 1:30 | | | | | | | |
| 2:00 | | | | | | | |

SCAN

CHANGE
FIND
CONNECT
HELP
TOOLS
OPTIONS
PEN

FIG. 9

| | INFORMATION | SCHEDULE | MEMO | ↓ ↑ ↓ ↑ |
|---|---|---|---|---|

| | Mon | Tues | Wed | Thurs | Fri | Sat | Sun | Sched | To Do |
|---|---|---|---|---|---|---|---|---|---|
| Time | Person | | | Location | | Purpose | | | |
| 7:00n | x Roger Brown | | | Rm 235 | | Consult | | | |

FIND
[Look-up]
Substitute
———
List

Patient: Brown, Roger K.
Age: 25
Status: Married
Address: 125 Winton Rd
 Rochester, NY 14618
Home Phone: 275-2245
Work Phone: 445-8356

Diagnosis: Angina Pectoris
Current Medication: Procardia, 60mg/dy
 Isordil, 10mg, 3/dy

2:00

SCAN

CHANGE
FIND
CONNECT
HELP
TOOLS
OPTIONS
PEN

FIG. 11

| INFORMATION | SCHEDULE | MEMO |

SCAN

CHANGE
FIND
CONNECT
HELP
TOOLS
OPTIONS
PEN

Isordil

Dosage and Administration: ISORDIL (isosorbide dinitrate) 2.5mg. and 5mg. SUBLINGUAL tablets. The basic dosage is one or two 5mg. tablets every 2 to 3 hours. The 2.5mg. tablet facilitates adjustment of dosage in patients who may require it. Both dosage forms are used sublingually for treatment of Angina Pectoris attack (including Angina Decubitus) or prophylatically in situations likely to provoke such attacks.

ISORDIL 10mg. CHEWABLE tablets. The smallest effective dose should be used. The initial dose should be no more than 5mg. (1/2 tablet) as an occasional severe hypotensive response may occur. The low dose may be effective in relieving the accute attack, but if no significant hypotension is seen, an increase in dose may permit more effective prevention of attacks. The chewable is scored to permit dosage adjustment. For relief of the acute Tabs: F G H I J Category K Generic L Name

FIG. 14

| INFORMATION | SCHEDULE | MEMO | To Do | Sched |
|---|---|---|---|---|
| Mon | Tues | Wed | Thurs | Fri | Sat | Sun |

| Time | Person | Location | Purpose |
|---|---|---|---|
| 7:00 | x Roger Brown | Rm 235 | Consult |
| 7:30 | | | |
| 8:00 | x Marie Wilson | Rm 440 | Post Op |
| 8:30 | x W. Jefferson | Rm 250 | Follow Up |
| 9:00 | Dr. Howe | His Office | Building Fund |
| 9:30 | x Henrietta Ark | Rm 444 | Consult |
| 10:00 | Office | | Prepare seminar |
| 10:30 | | | |
| 11:0 | | | |
| 11:3 | | | nar |
| 12:0 | | | |
| 12:3 | | | |
| 1:0 | | | |
| 1:30 | | | |
| 2:00 | | | |

~ 1 2 3 4 5 6 7 8 9 0 - = 
⇥ Q W E R T Y U I O P [ ] 
Caps A S D F G H J K L ; " ↵ 
⇧ Z X C V B N M , . / ⌫
Space

SCAN

CHANGE
FIND
CONNECT
HELP
TOOLS
OPTIONS
PEN

FIG. 16

| INFORMATION | SCHEDULE | MEMO |

Patients / Staff / Partners
P Q R S T U V

Patient: Sord, Arthur
Age: 37
Status: Married
Address: 456 jackson, St
Rochester, NY 14644
Home Phone: 432-9834
Work Phone: 243-4455

Health Plan: Blue Cross/Blue Shield
Subscriber No.: YMK306243011-1
Group No.: 48-012-8
Package: 010
B. Shield Plan: 804
B. Cross Plan: 304

Page 1

SCAN
CHANGE
FIND
CONNECT
HELP
TOOLS
OPTIONS
PEN

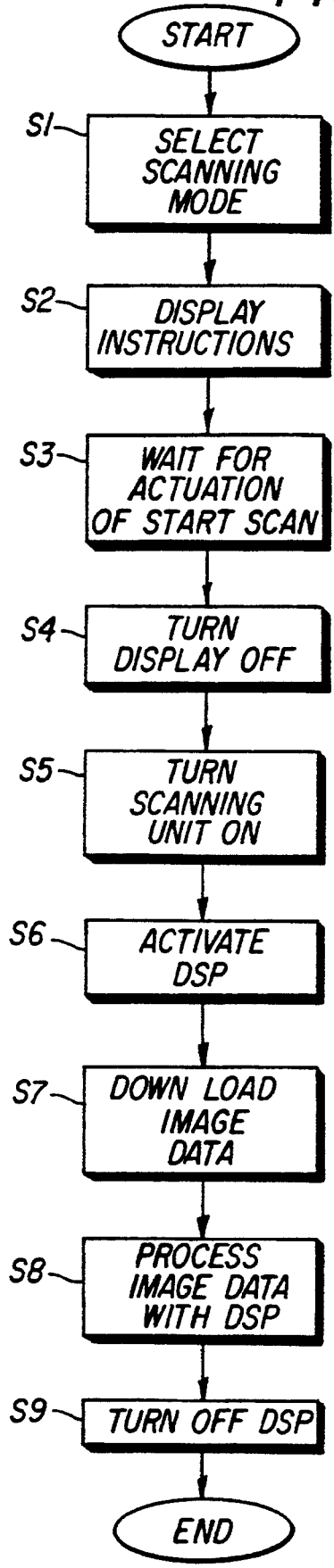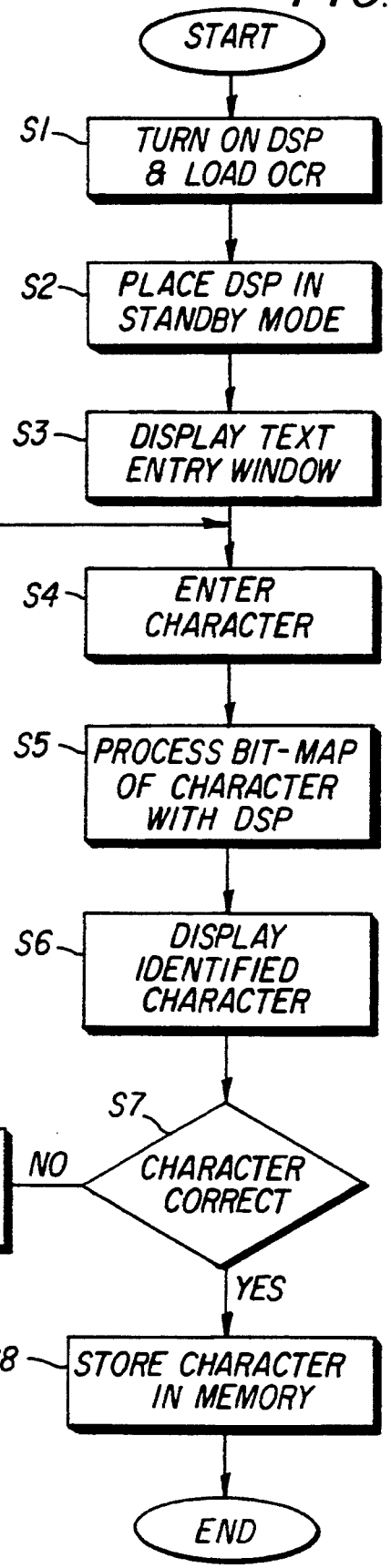
FIG. 18
FIG. 19

IMAGE-BASED ELECTRONIC POCKET ORGANIZER WITH INTEGRAL SCANNING UNIT

FIELD OF THE INVENTION

The invention relates in general to compact electronic organizers that are capable of storing information (for example schedule information, telephone numbers, memos, etc.) commonly used by individuals on a day-to-day basis. More specifically, the invention is related to a compact electronic pocket organizer that is capable of entering and storing personal information in the form of both text and image data in a manner that permits the information to be quickly and easily correlated between a plurality of databases when entered and retrieved.

BACKGROUND

A wide variety of compact electronic organizers are currently available that permit an operator to enter various information related to the operator's personal schedule and business contacts. For example, the WIZARD TM series of hand-held electronic organizers available from the Sharp Electronics Corporation includes a keyboard and display that permits the operator to enter schedule information, telephone numbers and memos for later review and retrieval. The operator can also create a business card file in which information related to a number of business cards can be stored, sorted and retrieved.

A primary drawback of the type of electronic organizer described above is the method in which information is entered and subsequently retrieved by the operator. Specifically, the operator is forced to use a very small keyboard to enter text data as the electronic organizer is designed to be of a compact or "pocket" size. Many individuals find the small keys on the keyboards to be difficult to use and may therefore experience a large number of errors when trying to enter or retrieve information.

Attempts have been made to overcome the problem of small keys by having the operator use an input stylus to activate the keys or buttons on the keyboard. While the stylus does make it easier for the operator to select a desired key, the overall data entry operation using the stylus is very slow as the operator must use a "hunt and peck" approach to enter data. Thus, the transfer of data from various source materials into the organizer, for example the transfer of name, address, company name and telephone number from a business card to a business card file within the organizer, becomes a very tedious and time consuming operation.

Another disadvantage in the method of entering data in conventional organizers is that, in many instances, the same data must be re-entered in a number of different databases. For example, it may be desirable to include identical information concerning a particular individual, such as the individual's name, in a telephone directory file, a business card file and a memo file. Conventional organizers do not provide a mechanism to relate data between databases. Thus, the user of the organizer is forced to re-enter the same name information in each of the desired files, thereby increasing the number of key strokes required and the probability that a data entry error will occur.

A further drawback of currently available electronic organizers is the inability to correlate various information from different databases for easy access and retrieval. For example, an operator using the electronic organizer's schedule function mode of operation may find that an appointment is indicated for a particular individual at a certain time. The operator may wish to contact the noted individual by telephone to cancel the scheduled appointment. To obtain the individual's telephone number, the operator must exit the schedule function mode and enter a telephone directory function mode. The operator must then search a telephone directory file for the individuals name to obtain the telephone number. Thus, the operator is required to enter a number of commands to switch from one discrete mode of operation to another to obtain the desired information. The requirement to use multiple discrete modes to retrieve information is timing consuming and tedious.

In view of the above, it is an object of the present invention to provide an electronic organizer that incorporates a user interface that reduces the amount of effort required to enter and retrieve both text and image data into the electronic organizer. It is a further object of the invention to provide an electronic organizer with the ability to correlate and relate information between several different databases to permit the operator to quickly and easily enter and retrieve related information with a minimal amount of effort. Other objects and advantages of the invention will become apparent from the detailed description of the best mode of practicing the invention provided below.

SUMMARY OF THE INVENTION

The present invention provides an electronic organizer incorporating an easy to learn and use interface that includes an internal electronic scanner and a touch sensitive display screen to enter text and image data. The internal electronic scanner permits both machine generated text and image data to be scanned and directly entered into the electronic organizer, thereby reducing the number of manual data entry operations required by the operator. Hand-printed text data is also entered via the touch sensitive display screen using a stylus or pen. The scanned machine generated text, the scanned image data and the hand-printed text can either be preserved as an image-oriented bit map, or optical character recognition routines can be applied to the data to identify characters and convert the identified characters to computer coded text data. Data entered into the electronic organizer is arranged in a relational database, which permits the operator to quickly and easily enter and retrieve related information between a number of different databases with a minimal amount of effort. A small document transport mechanism is also provided to assist in the scanning of small documents.

BRIEF DESCRIPTION OF THE DRAWINGS

With the above as background, reference should now be made to the following detailed description and the accompanying drawings, in which:

FIG. 7 illustrates the display of a daily schedule screen on a display unit of the electronic organizer illustrated in FIG. 1;

FIG. 9 illustrates the overlay of a Find function option screen over the display illustrated in FIG. 8;

FIG. 11 illustrates the display of information retrieved from a memory card located in a memory card expansion slot of the organizer illustrated in FIG. 1;

FIG. 14 illustrates the display of a virtual alphanumeric keyboard on the display unit of the organizer illustrated in FIG. 1;

FIG. 16 illustrates a database record file that is displayed on the display unit of the organizer illustrated in FIG. 1;

FIG. 18 is a flow diagram illustrating the operation of the scanner unit and digital signal processor illustrated to scan an image;

FIG. 19 is a flow diagram illustrating the entry of data in the Text input window illustrated in FIG. 15 using the pen input unit shown in FIG. 1;

MODES OF CARRYING OUT THE INVENTION

Figure 1:
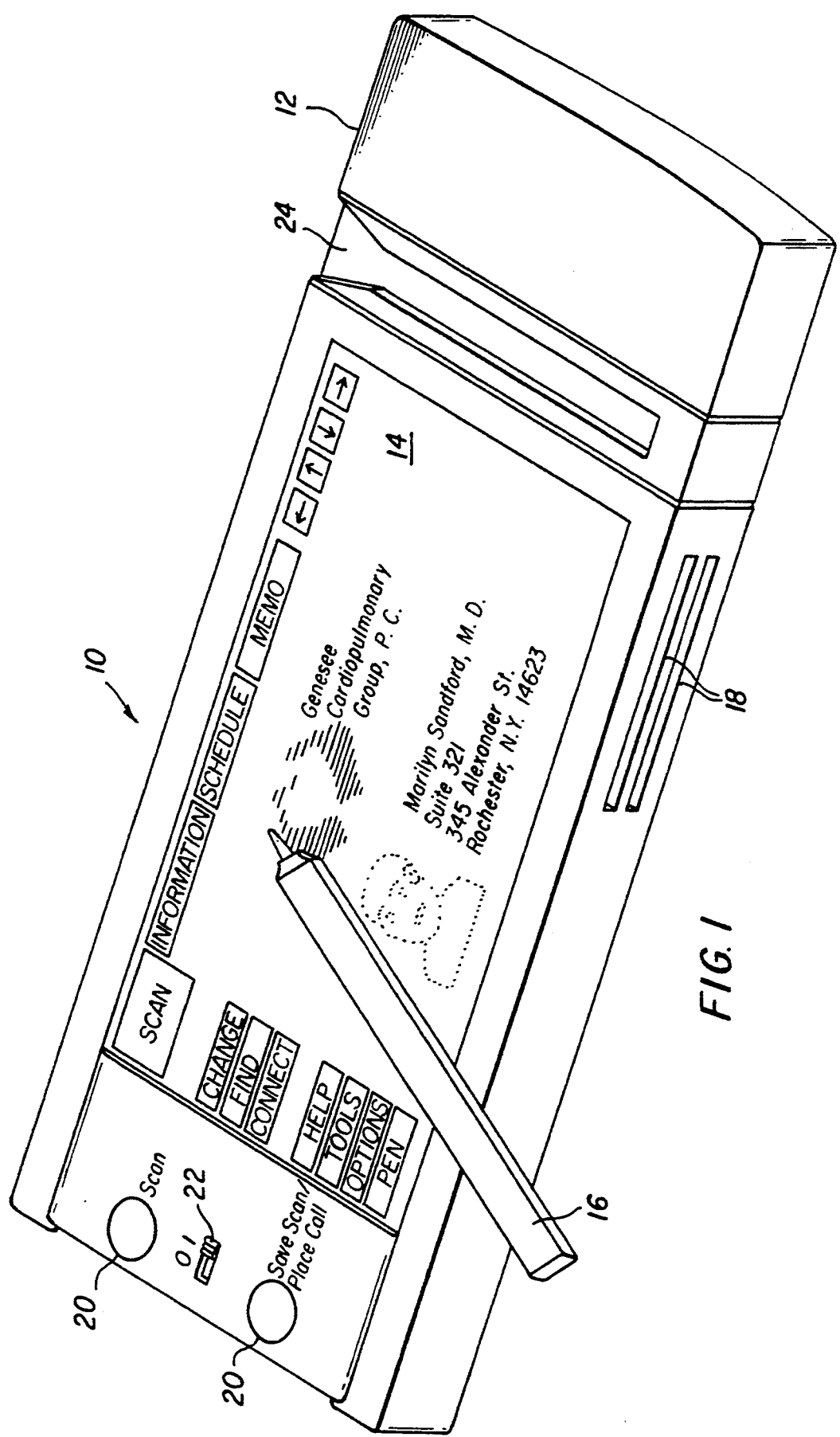
FIG. 1 is a top perspective view of an electronic organizer in accordance with the present invention.

A top perspective view of a hand-held electronic pocket organizer according to the present invention is illustrated in FIG. 1. The organizer includes a main unit 10, a battery power unit 12 releaseably coupled to the main unit 10, a high resolution touch sensitive electronic display panel 14 located on a top surface of the main unit 10, a pen input unit 16, memory card expansion slots 18 located in the main unit 10, scanner control start and stop buttons 20-21, and a main unit power ON/OFF switch 22. A pen holder slot 24 is also located on the main unit 10 to hold the pen input unit 16 when it is not in use.

The operator interacts with the main unit 10 through the use of the pen input unit 16 and the touch sensitive electronic display panel 14. Various overlay screens or "windows" are displayed on the display panel 14 and the operator touches the pen input unit 16 to the display panel 14 at specified locations to perform various functions such as data entry—including hand-printed text entry and virtual alphanumeric keyboard operations—and organizer navigational operations—i.e. moving from one organizer function to another—as will be described in greater detail below.

The display panel 14 preferably includes a resistive type pen input material that overlays a liquid crystal display having a pixel count of at least 640×200 in a text mode of operation and 320×200 in a graphics mode of operation when displayed at 72 dpi. The resistive pen input material consists of several layers of transparent materials which are fabricated such that the application of pressure by a pen shaped object will result in a voltage being generated and measured that is spatially proportional to the incident pens physical position. The use of such resistive type touch sensitive pen input devices in electronic digitizer tablets is well known in the art. It will be understood, however, that the term "touch sensitive" is not intended to limit the display panel 14 to a resistive type unit that requires physical contact. For example, touch screens that use light beams to locate the position of an object that passes through a plane located above the actual display surface can also be utilized for the display panel 14. Other types of displays may also be used, provided that the operator can selectively enter information by simply touching or pointing to prespecified areas of the display unit.

Figure 2:
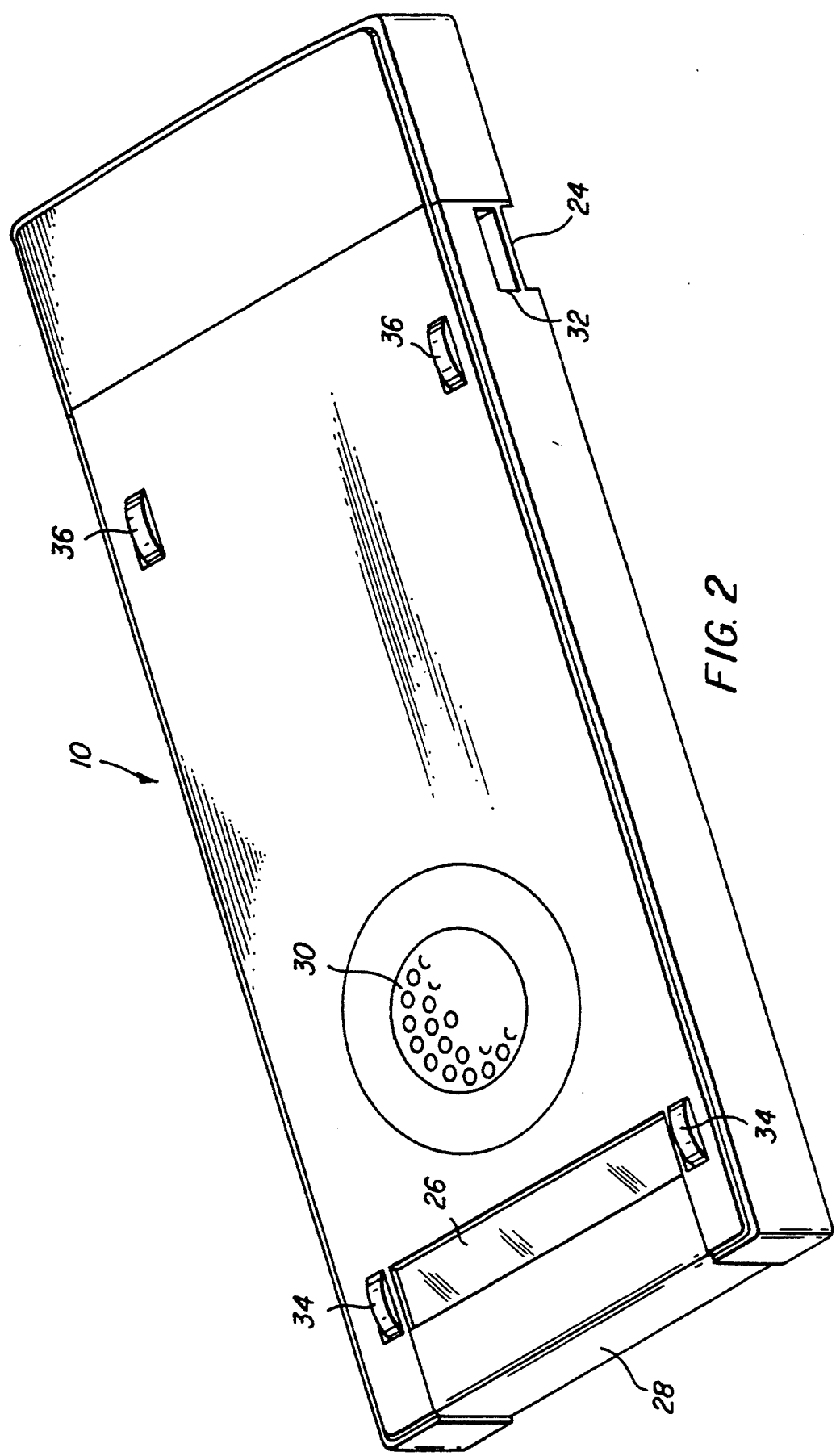
FIG. 2 is a perspective view of the bottom of the electronic organizer shown in FIG. 1.

As shown in FIG. 2, the organizer also includes an imaging window 26 for a linear electronic scanner unit incorporated within the main unit 10, a small document transport mechanism platen 28 that extends from the main unit 10 during the operation of a small document transport mechanism incorporated within the main unit 10, a speaker unit 30 which is used to generate acoustic telephone dial tones, and external power connectors 32. Front transport wheels or rollers 34 are preferably located adjacent to the imaging window 26 of the linear electronic scanner unit and rear transport wheels 36 are provided at the opposite end of the organizer. The front and rear transport wheels 34, 36 permit the organizer to be rolled over the surface of materials to be scanned including, for example, materials having machine generated text—i.e. printed materials such as telephone directory listings—and images—i.e. photographs or graphics—for direct entry into the memory of the organizer.

The scanning of small documents is a problem common in conventional hand-held type scanning devices, as it is difficult to properly locate and hold a small document in place as the scanner is passed over the small document. Thus, conventional hand-held type scanning devices may require that small documents, such as business cards, be secured to a surface with tape or some other mechanism prior to performing a scanning operation. The small document transport mechanism incorporated in the main unit 10 solves the problem of scanning small documents by providing a mechanism for grasping and transporting small documents past the imaging window 26 of the linear scanning unit.

Figure 3:
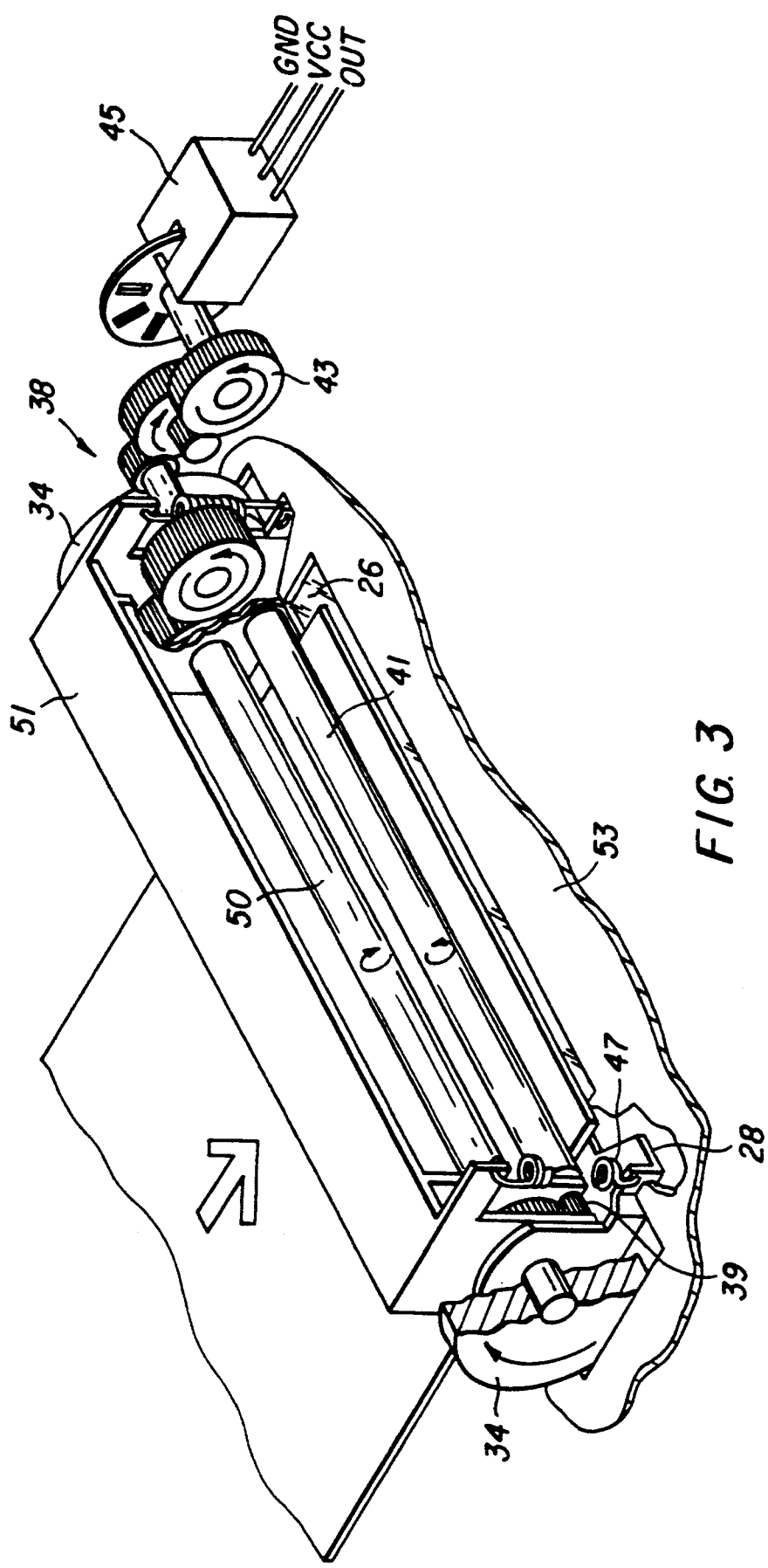
FIG. 3 is a schematic diagram of a small document transport mechanism employed in the electronic organizer shown in FIG. 1.

As shown in FIG. 3, the front transport wheels 34 of the organizer are preferably connected to a drive axle 50, which in turn is coupled through a pinch roller drive gears 39 to a document pinch roller 41. The drive axle 50 is also coupled via encoder gears 43 to an optical encoder unit 45.

The small document transport mechanism platen 28 shares a common pivot axis (at either end) with the drive axle 50. Tension springs 47 are employed to pull the platen 28 up against the bottom of the document pinch roller 41. The document pinch roller 41, the transport wheels 34 and the drive axle 50 are mounted on a frame 51 that is spring loaded within the main unit 10 to permit the frame 51 to be extended or lowered from the bottom surface 53 of the main unit 10 during operation of the small document transport mechanism 38. In the lowered position, the platen 28 and the document pinch roller 41 form a nip into which a small document is inserted for scanning.

In operation, a small document is placed in the nip of the small document transport mechanism 38 and the organizer is rolled over a smooth surface. The rotation of the front transport wheels 34 causes the drive axle 50 to rotate, which in turn causes the document pinch roller 41 to rotate. The pinch roller 41 subsequently drives the small document past the imaging window 26 of the linear electronic scanning unit. The illustrated small document transport mechanism 38 is particularly well suited for use in the organizer, as it does not require an electrical motor to transport the small document and therefore does not drain energy from the battery unit 12.

It should be noted that, in the illustrated embodiment, the small document is actually scanned in the opposite direction than a large document. The organizer is moved from left-to-right across a page to scan a large document. The small document, however, transports the small document past the scanning window from right-to-left. Thus, compensation for the change in the scanning direction must be made either when data is initially stored or a translation operation on the data must be performed prior to the display of the data on the display panel 14.

The optical encoder unit 45 generates encoding signals in accordance with the rotation of the axle 50 that correspond to the movement of the organizer over a surface. The encoding signals produced by the optical encoder unit 45 are used to clock the operation of the linear electronic scanning unit so that a line of image data is generated as the organizer is moved a predetermined distance over the surface in a manner well known in the hand-held scanning art and need not be described detail. The encoding signals are also used by a central processing unit (CPU), located on a motherboard 48 within the main unit 10 of the organizer, to monitor the speed of the scanning operation. The central processing unit preferably generates a warning signal if the scanning speed is exceeding a predetermined limit. The warning signal can be either an audio warning signal generated by activating the speaker unit 30 and/or a visual warning signal displayed either on the display panel 14 or on a separate LED indicator provided on the main unit 10. In either case, the warning signal is preferably of a type that provides feedback to the operator to warn the operator when the scanning speed limit is being approached, for example by increasing the frequency of the audio warning signal, changing the color of the visual warning signal, or by flashing the visual warning signal at varying frequencies. The visual or audio feedback permits the operator to reduce the scanning speed before the predetermined speed limit is exceeded.

Figure 4:
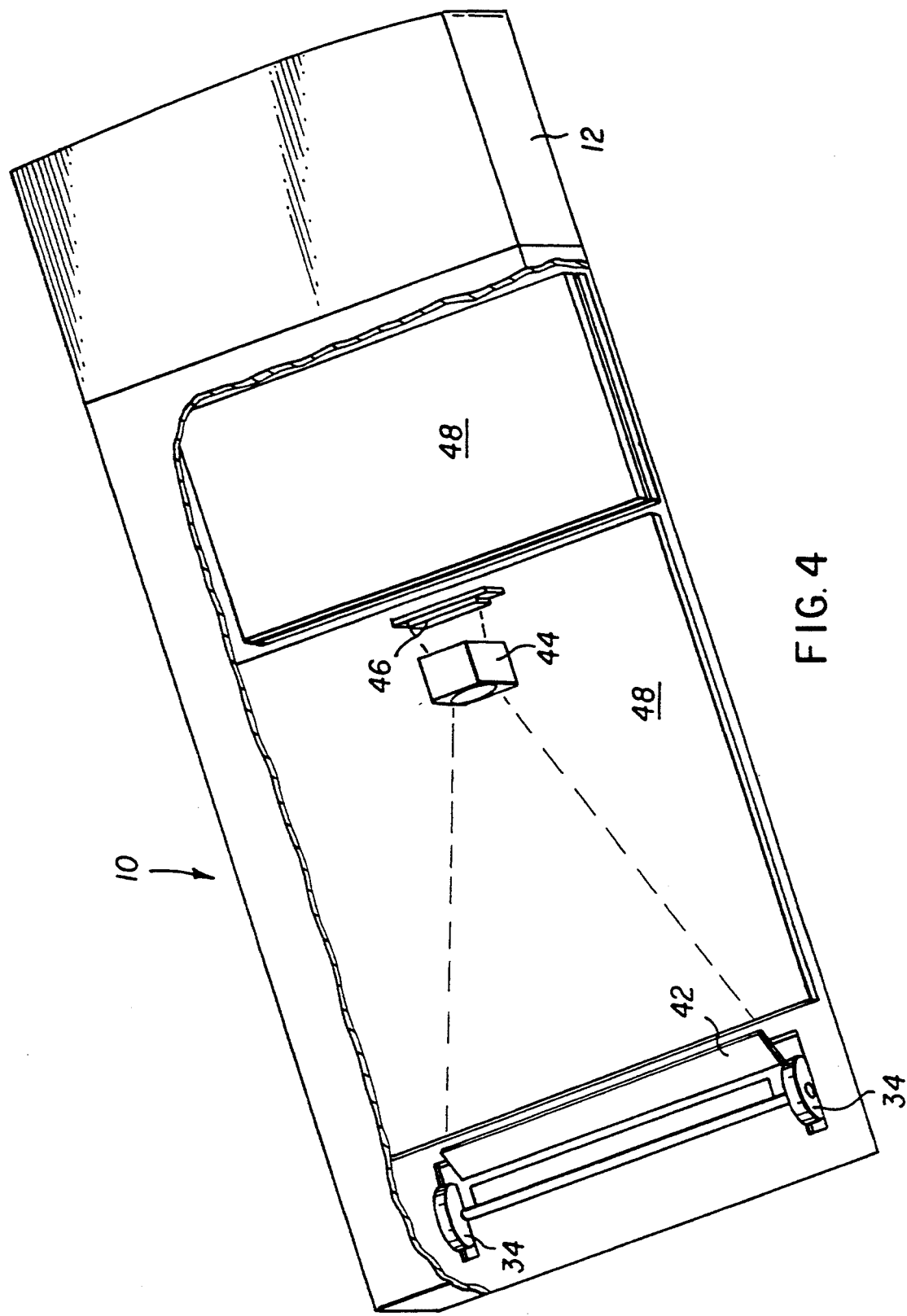
FIG. 4 is a schematic representation of the layout of a scanning unit in the electronic organizer illustrated in FIG. 1.

The layout of the linear electronic scanning unit within the main body 10 of the organizer is illustrated in FIG. 4. The linear electronic scanning unit includes a light source 40, a mirror 42, a lens array 44, and a linear electronic image sensor 46. In operation, the image being scanned is reflected by the mirror 42 to the lens array 44, which in turn focuses the image on the linear electronic image sensor 46. The linear electronic image sensor 46, with its associated control circuitry, converts the image to digital image data in a conventional manner. The digital image data is then supplied to a digital signal processing unit (DSP) located on the motherboard 48 in the form of a bit map.

FIG. 4 also illustrates the preferred location of the card expansion slots 18 with respect to the motherboard 48. The card expansion slots 18 accept memory cards that can either be used to expand the system memory of the organizer or to hold special software application programs or database packages. The card expansion slots 18 are preferably configured to hold memory cards that conform to the standards established by the Personal Computer Memory Card International Association (PCMCIA), including cards conforming to the Execute-In-Place (XIP) standard, although memory cards utilizing other configurations could be utilized. Memory cards that could be employed in the invention are currently available from the Maxell Corporation of Fair Lawn, N.J. and have memory capacities on the order of one megabyte.

Figure 5:
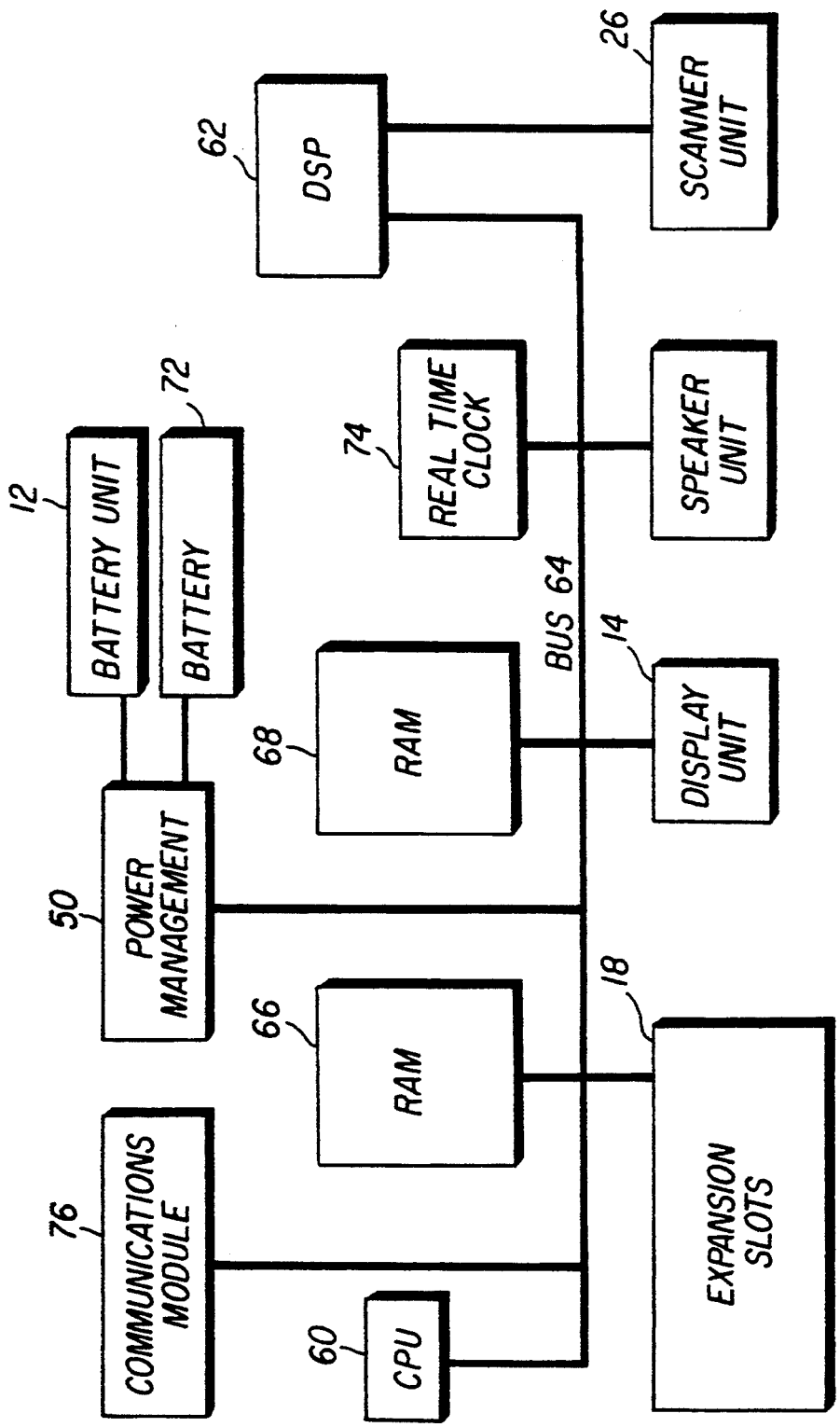
FIG. 5 is a schematic block diagram of the electrical operating system of the electronic organizer illustrated in FIG. 1.

A basic electrical schematic block diagram of the organizers operating system is illustrated in FIG. 5. The central processing unit (CPU) 60 (for example a F8680 processor available from Chips & Technology Corporation) and the digital signal processing unit (DSP) 62 (for example a TS350C51 processor available from Texas Instruments Corporation) mentioned above are coupled to a bus 64. System memory is provided by a one megabyte capacity random access memory (RAM) unit 66 and a two megabyte capacity read only memory (ROM) unit 68. As was mentioned above, additional memory can be provided by inserting memory cards in the card expansion slots 18 which are also coupled to the bus 64. The CPU 60 controls the overall operation of the organizer, while the DSP 62 works in conjunction with the CPU 60 to support processing operations related to scanned data.

The organizer preferably supports two modes of scanning operations, namely, a Text Mode of operation (default mode) which is used to scan machine generated text images and a Photo Mode of operation (user selected) which is used to scan high resolution images such as photographs or graphics. Images processed in the Text Mode of operation are converted to one bit/pixel by thresholding and the image pixels are packed eight bits per byte. The images are preferably compressed by a CCITT GIII/IV (Committee Communications Internationale de Telephone et Telegraph Group III and IV) lossless method. Text Mode images may be displayed directly on the display unit 14, or an optical character recognition algorithm (OCR) can be applied to the image to convert the text image data to computer coded text data, e.g. ASCII. Images in the Photo Mode of operation are processed by an error diffusion method wherein the images are converted to one bit/pixel by distributing the gray level error into the surrounding pixels. The pixels are packed eight bits per byte and the images are compressed using a lossey or lossless method, for example, JPEG (Joint Professional Engineering Group) algorithm. The Photo Mode of operation optimizes the quality of scanned photographic images as for display on the display unit 14.

Conventional OCR algorithms can be employed by the DSP 62 to identify text data in the Text Mode of operation. Two representative algorithms for machine-print recognition include: WORDSCAN ™ sold by Calera Recognitions Systems of Santa Clara, Calif.; and OMINPAGE ™ sold by Caere Corporation of Los Gatos, Calif. A separate hand-print algorithm is used by the DSP 62 to identify characters that are written on the display unit 14 by the pen unit 16 in a write mode of operation that will be discussed in greater detail below. One representative hand-print character recognition algorithm that can be employed is incorporated in the HANDWRITER TM product sold by Communications Intelligence Corporation of Menlo Park, Calif.

The DSP 62 is preferably powered down when not in use in order to conserve power. The DSP 62, however, does not contain power down data storage capability. All internal data required by the DSP 62, including OCR algorithms and image processing programs, must therefore be downloaded to the DSP 62 each time it is powered up to perform a processing function. The DSP 62 is configured such that the internal registers of the DSP 62 are accessed by the CPU 60 as input/output devices over the bus 64.

A real time clock 74 is also included in the operating system to provide a time base to support time of day, date, calendar and alarm functions of the organizer. The operation of the real time clock 74 is controlled by a crystal oscillator to insure accuracy and stability. The real time clock 74 remains operational when the rest of the operating system is turned off by the user.

Power is supplied to the operating system via the power management circuit 50, which is coupled to the battery power unit 12 and to an emergency rechargeable back-up battery 72, when the main unit power ON/Off switch 22 is activated. The power management circuit 50 includes a monitoring circuit that monitors the power level of the battery power unit 12 and switches to the emergency rechargeable back-up battery 72 if the monitored level falls below a predetermined value. A recharging circuit is also provided within the power management circuit 50 to recharge the back-up battery 72 either from the battery power unit 12 (once a new or recharged battery power unit 12 is installed) or from an external AC or DC source that is coupled to the power management circuit 50 via the external power connectors 32. The function performed by the power management circuit 50 is particularly important to prevent the loss of data stored in the RAM unit 66 which must be continually supplied with power.

Data entry and retrieval is primarily accomplished through the high resolution touch sensitive electronic display panel 14 (in conjunction with the pen input unit 16). A communications module 76, however, is also coupled to the bus 64 to permit text and image data to be downloaded directly to the operating system from external sources. The communication module 76, for example, includes a standard serial and/or parallel computer interface circuit (for example a standard RS232 interface) which permits the organizer to be directly connected to a computer. A facsimile interface circuit and a modem are also preferably included within the communication module 76 to permit the organizer to receive and transmit data via telecommunication lines. To conserve space within the main unit 10, however, the facsimile interface and modem can be provided as separate accessory modules that are attached to the main unit 10 when needed.

In a preferred embodiment, an infrared communications link is also included in the communications module 76 to permit commands and data to be entered directly into and retrieved from the operating system of the organizer without hard-wired connections. The infrared communication link is particularly useful in providing communications between two organizers without having to provide a physical connection the two organizers. Thus, an individual can easily and quickly download schedule information or other data directly into a co-workers organizer.

Figure 6:
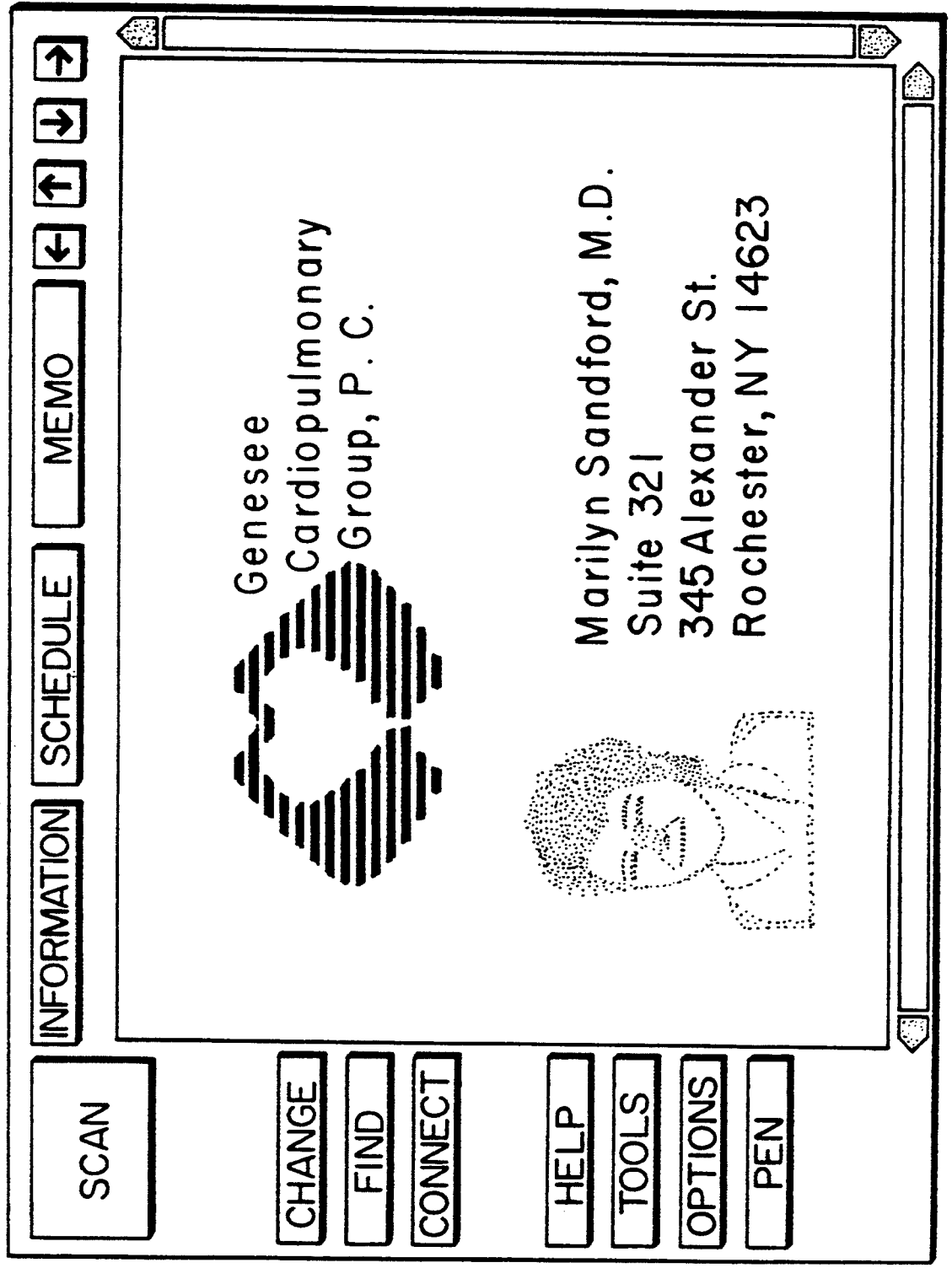
FIG. 6 illustrates the display of information on a display unit of the electronic organizer illustrated in FIG. 1 on power up.

The touch sensitive electronic display panel 14, in combination with the linear electronic scanner unit 26, provides an easy to learn and use interface that permits the operator to enter and retrieve data from the organizer with a minimal amount of effort. For example, FIG. 6 illustrates one type of information display that can be presented on the display panel 14 upon power-up of the organizer in a preferred mode of operation. The illustrated information identifies the owner of the organizer by name, address, company name (with company logo displayed) and photograph. The advantage of the illustrated organizer over conventional types of organizers can most readily be appreciated through the realization that none of the information displayed in FIG. 6 must be manually entered into the organizer by the operator.

The information displayed in FIG. 6, in contrast to conventional organizers, is entered through the use of the linear scanner unit without requiring the operator to key-in the text data. For example, all of the information is obtained simply by scanning a business card containing a photograph in the Photo Mode of operation. In such a case, the information is retained as a bit-map image file in the RAM unit 66 for later retrieval and display on the display unit 14, i.e., the resulting image displayed on the display unit would be an electronic reproduction of the original business card. Alternatively, the illustrated information can be obtained by scanning different source materials, storing the information in different files, and then linking the files together through the use of a relational database to retrieve and display the information on the display unit 14. For example, if the business card did not contain a photograph, the owner's name, address and company name could be obtained from the business card by scanning the business card with the scanner unit 26 in the Text Mode of operation. An OCR algorithm is then applied to the scanned image data by the DSP 62 to identify the text information contained therein. The identified text information is then stored in a primary database file, for example, a text based business card file. A photograph is then scanned in the Photo Mode of operation by the scanner unit 26 and the scanned photographic image data is stored in a bit-map image file in memory. The text data is then retrieved from the business card file and combined with the photographic image data from the bit-map image file upon power-up of the organizer to generate the illustrated display.

In addition to the owner information, various function blocks are displayed on the touch panel display 14. The function blocks include main functions such as Information, Schedule and Memo, support functions such as Change, Find and Connect, and accessory functions such as Help, Tools and Options. Each of the functions are initiated by touching the function block with the pen input unit 16. For example, a daily schedule shown in FIG. 7 is displayed by touching the Schedule function block. The schedule display screen preferably takes on the "look and feel" of a card file. The operator can easily switch days by touching the "card" for the day to be selected.

Figure 8:
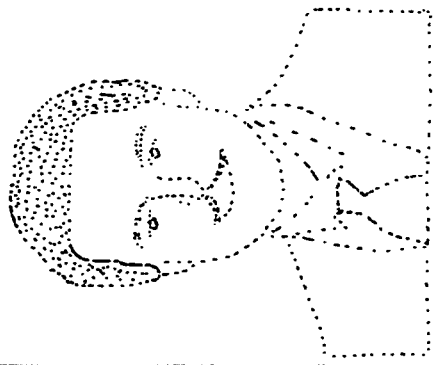
FIG. 8 illustrates the display of information related to one of the fields of the daily schedule illustrated in FIG. 7.

Information related to selected data fields displayed on the schedule display screen can be retrieved through the use of the relational database simply be touching the in data field with the pen input unit 16. For example, the illustrated schedule indicates that a doctor has a consult visit with a patient, Roger Brown, at 7:00. The doctor, however, may not remember the condition of the patient or may want to contact the patient to change the appointment time. Using conventional organizers, the doctor would be required to leave the schedule file and enter a memo file to retrieve the information on the patients condition and then leave the memo file to enter a telephone directory file to obtain the patient's telephone number. Switching between the various files is time consuming and tedious. In contrast, all the relevant information related to a selected data field is retrieved and displayed in the present invention as shown in FIG. 8 simply by touching the patient's name with the pen input unit 16.

Figure 10:
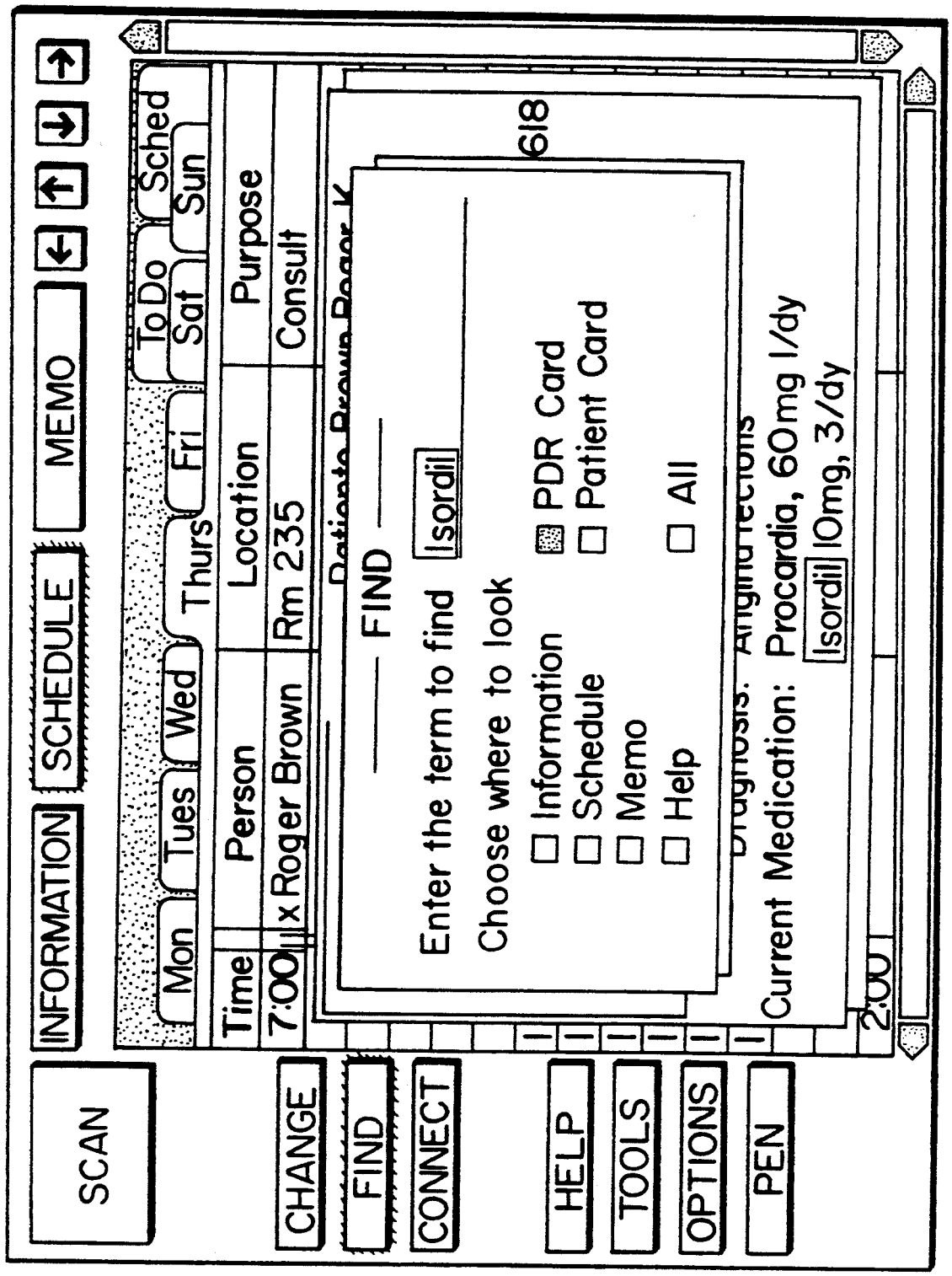
FIG. 10 illustrates the overlay of a Find screen over the display illustrated in FIG. 8.

The doctor may wish to obtain further information on the drug that has been prescribed for the patient. This can be accomplished by touching the Find function block with the pen input unit 16. A Find function menu screen is displayed in an overlay fashion on the display unit 14 as shown in FIG. 9. Selecting the Lookup option causes a Find inquiry screen to be displayed as shown in FIG. 10. The term to be found can be entered by simply touching the name of the drug on the underlying display screen with the pen input unit 16. The Find inquiry screen also asks where to look for the information. In the illustrated example, the "PDR Card" block is selected, which refers to a memory card containing information from the Physicians Desk Reference published by Medical Economic Co. Inc., of Oradell, N.J. that would be located in the card interface slot 18. A search of the information in the PDR card is then conducted and the result is displayed as shown in FIG. 11.

Figure 12:
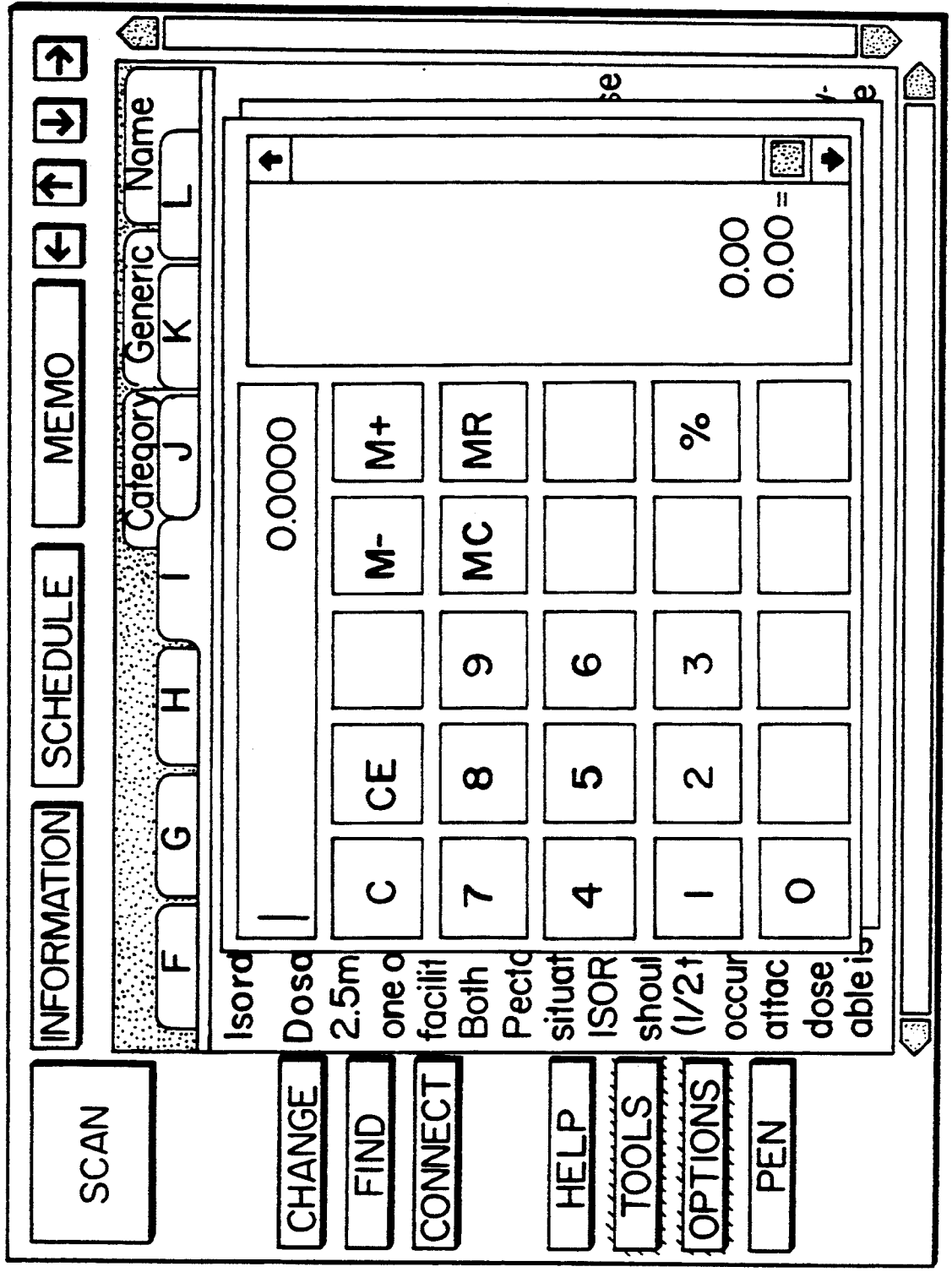
FIG. 12 illustrates the display of a calculator tool screen in a Tool function mode of operation.

At this point, the doctor may wish to calculate a new dosage for the patient by touching the Tools function block to display a calculator tool screen as shown in FIG. 12. The "keys" of the calculator are then activated by touching them with a pen input unit 16. Other tool functions include an acoustic auto-dialer that generates acoustic telephone dial tones via the speaker unit 30 so that the doctor may use the organizer as an acoustic auto-dialer to call the patient.

Figure 13:
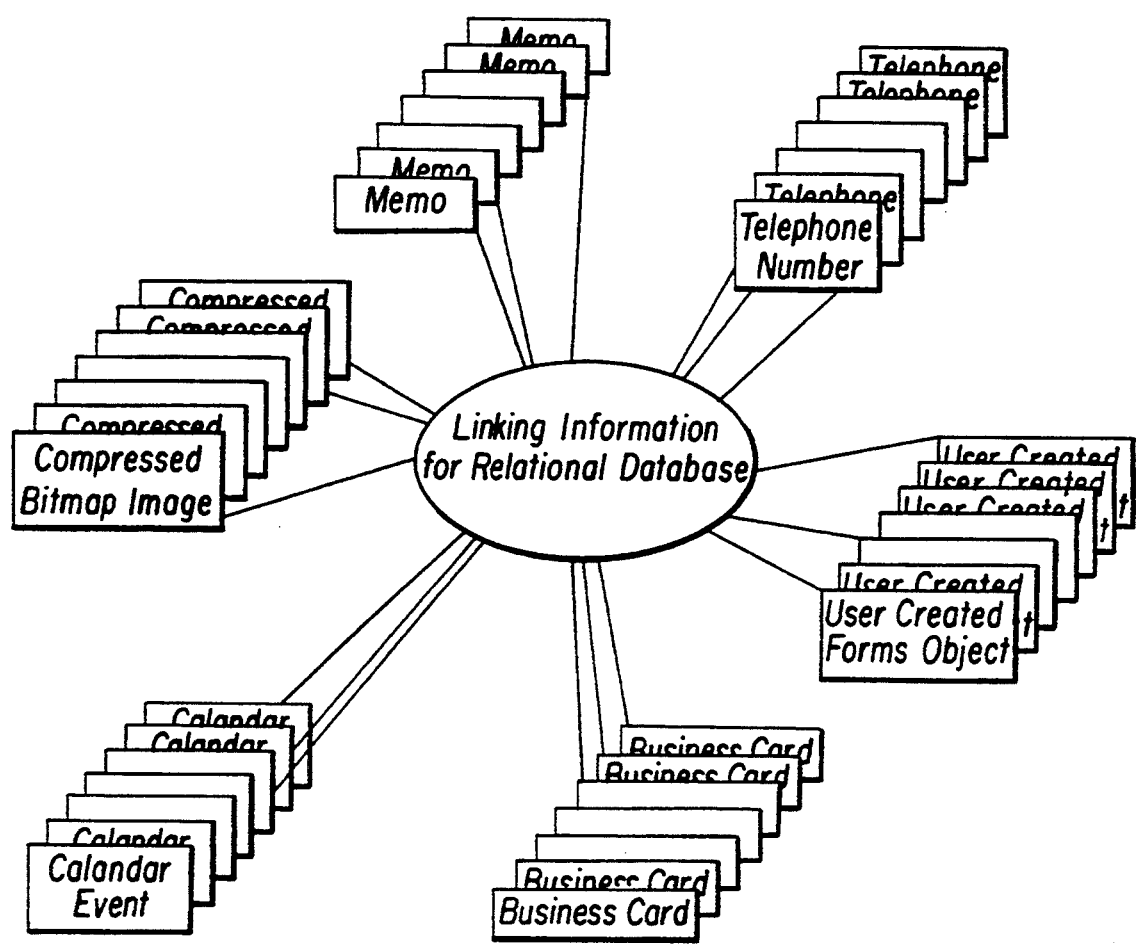
FIG. 13 illustrates how data can be correlated using a relational database in the organizer illustrated in FIG. 1.

As was mentioned above, the ease at which related information can be retrieved is a direct result of the use of a relational database to organize all of the various data files to be stored in the organizer. The relational database is functionally illustrated in block diagram form in FIG. 13. All of the various files including a memo file, a bitmap image file, a calendar event file, a business card file and a telephone number directory file share one or more common relational information linking fields. The preferred relational information linking fields include name, address, telephone number, subject and date. The operator is prompted at the initiation of a scan operation to identify and attach a file tag, containing one or more of the linking fields, to the image being scanned. The file tag allows each scanned image file to be easily identified and cross-referenced in any of the organizer's modes of operation.

The entry of the file tag information, as well as any annotations that the operator may wish to enter on the scanned image, can be entered by one of two different methods. The first method involves the use of a virtual alphanumeric keyboard that is overlayed on the display unit 14 as shown in FIG. 14. The pen unit 16 is then used to select the "keys" of the virtual alphanumeric keyboard to enter the required information. This method, however, has some of the drawbacks associated with conventional organizers that use a stylus to activate the keys of a keyboard, i.e., it requires a "hunt and peck" type approach for those individuals that are unfamiliar with a standard keyboard layout.

Figure 15:
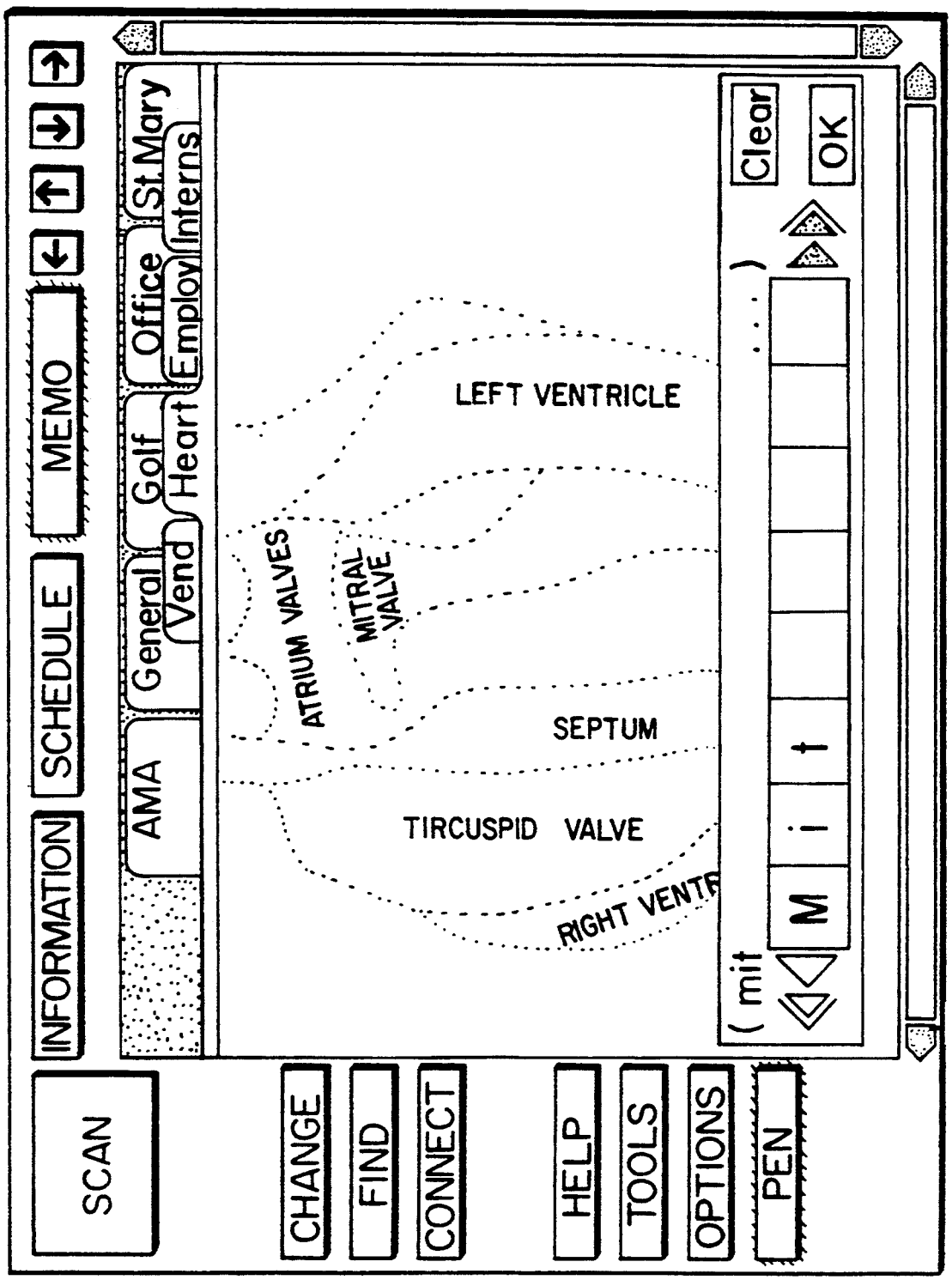
FIG. 15 illustrates the entry of hand-printed text information using the pen input unit of the organizer illustrated in FIG. 1.

FIG. 15 illustrates a preferred method of entering data in a write mode of operation in which the operator can use the pen input unit 16 to print the information on the display unit 14. In the illustrated example, a diagram of a heart has been scanned from a textbook and displayed on the display unit 14. By activating the pen function block, a text input window is overlayed over the image of the heart. The operator then prints information in the blocks of the text input window using the pen input unit 16. The DSP 62 applies a hand-print text OCR algorithm to identify the text characters that were printed in the blocks.

Figure 17:
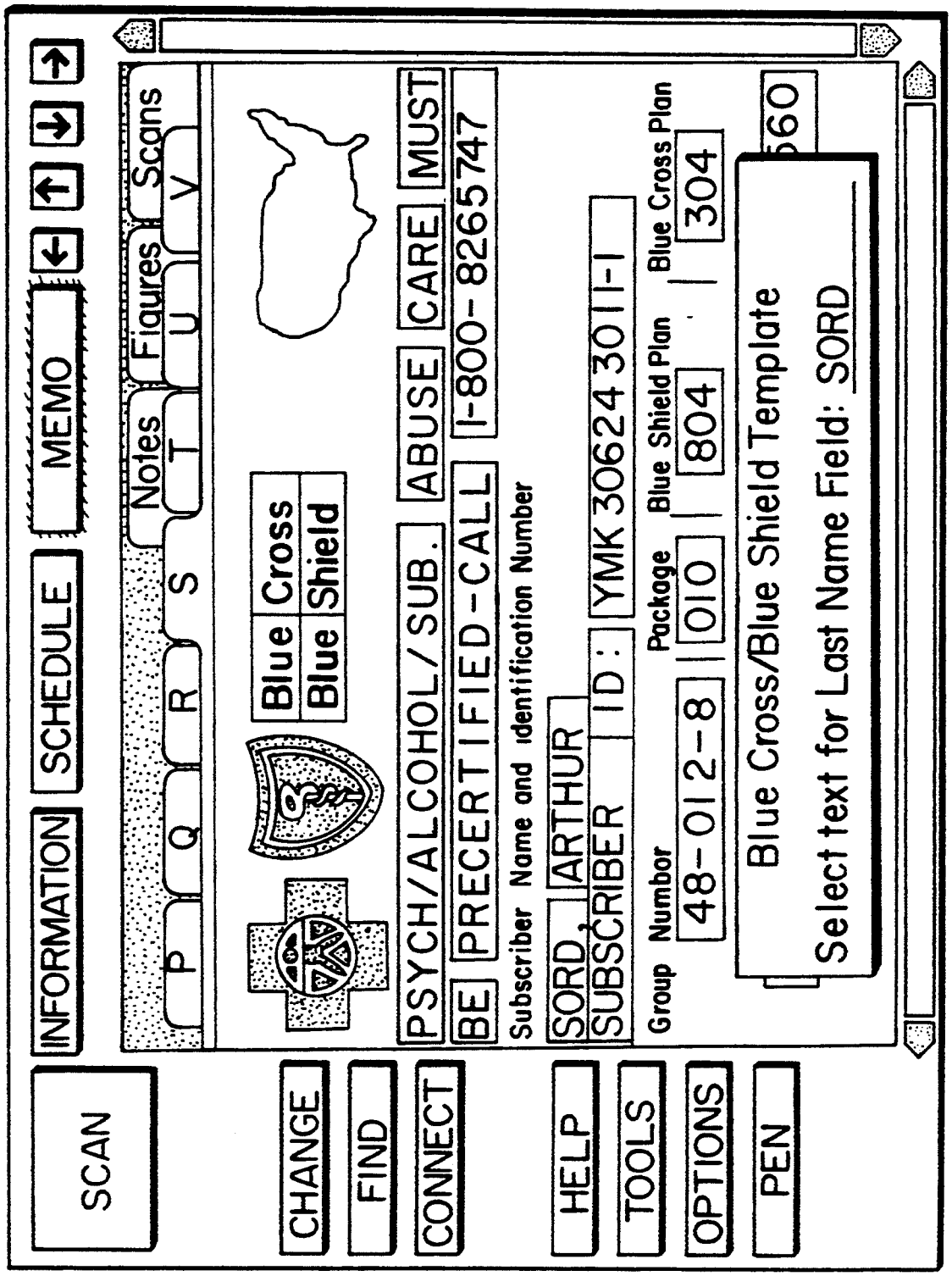
FIG. 17 illustrates the blocking of identified text fields by the system shown in FIG. 5.

Text information can also be transferred from scanned images directly into a text data file without requiring the operator to key-in the text data. FIG. 16, for example, illustrates a text information file that is displayed on the display unit 14 which contains a patient's personal information as well as information on the patient's medical insurance. The medical insurance information for the text information file is obtained directly from the patient's scanned medical card, the image of which is illustrated in FIG. 17. The CPU 60 performs a text identification routine to a bit map of the scanned medical card to identify areas of the bit map that contain text information. A box is drawn around each of the areas that are determined to contain text information. The DSP 62 then performs an OCR text recognition algorithm to the data contained within the areas specified by the boxes to identify the text data contained within the boxes. The operator can then transfer the identified text data within selected boxes into the text information file by touching a selected box to fill in a template field that is overlayed on the display. The template field continues to prompt the user to select a box for each of the fields in the text information file.

The above-described scanning operations are further illustrated in flow diagram form in FIGS. 18 and 19. FIG. 18 illustrates the operation of the scanner unit 26 and DSP 62 to scan an image. At step S1, the operator selects which type of scanning mode (either the Text Mode or the Photo mode) is to be employed. After selection of the scanning mode, instructions are displayed on the display unit 14 at step S2 to tell the operator how to perform the scanning operation. The CPU 60 then enters a wait state to wait form the activation of the start scan button by the operation at step S3. Once the start scan button is activated, the CPU 60 turns the display unit 14 off to conserve power at step S4 and then applies power to the linear scanning unit at step S5. The CPU 60 then activates the DSP 62 at step S6 and loads the DSP 62 with the appropriate OCR program based on the type of scanning mode selected by the user. Digitized image data is downloaded from the image sensor to the DSP 62 at step S7 and the DSP 62 processes the image data and stores the result in the RAM unit 66 at step S8. The CPU 60 turns off the DSP 62 and the linear scanning unit once all the image data is processed at step S9 scan lines have been entered.

FIG. 19 illustrates the entry of data in the write mode of operation in the text input window using the pen input unit 16. At step S1, the DSP 62 is powered up and then loaded with the hand-print OCR software from the ROM unit. At step S2-S3, the DSP 62 is placed in a standby mode and the text entry window is displayed on the display unit 14. At step S4, the operator uses the pen input unit 16 to write a character in a block of the text entry window. At step S5, the DSP 62 is removed from the standby mode and a bit-map representation of the hand-print character is passed to the DSP 62 for processing. The DSP 62 applies the free-hand OCR algorithm to the bit-map representation at to determine the text character represented by the bit-map representation. The identified text character is displayed above the block of the text entry window at step S6 for verification by the operator at step S7. The character is stored in memory if it has been correctly identified at step S8. If the character has not been correctly identified an error message is displayed at step S9 and the operator is required to re-enter the character.

A more complete understanding of the operation of the organizer can be gained through detailed study of the attached Appendix which forms a part of this specification. The attached Appendix contains a detailed program listing of a program which demonstrates the interaction of the various organizer functions described above. The demonstration program is written in the "C" programming language and is intended to be executed on a computer loaded with the BORLAND ™ C compiler. Section A of the appendix contains the main operating program "grScreen". The remaining sections of the appendix contain various program modules, target tables, parameters and definitions that are required to run grScreen.

It should be noted that the Appendix contains material that is subject to copyright protection. The copyright owner has no objection to the facsimile reproduction of this specification as it appears in the files of the United States Patent and Trademark Office for the purposes of studying the invention, but otherwise reserves all copyrights whatsoever.

The above described image based electronic organizer provides an easy to learn and use interface, through the combination of the touch sensitive display unit 14, pen input unit 16 and linear scanning unit, which reduces the amount of effort required to enter and retrieve data into the electronic organizer. It further provides the ability to correlate information from several different sources to permit related information to be quickly and easily reviewed with a minimal amount of effort through the use of a relational database. The organizer can also be customized to fit the needs of a variety of business professions.

Figure 20:
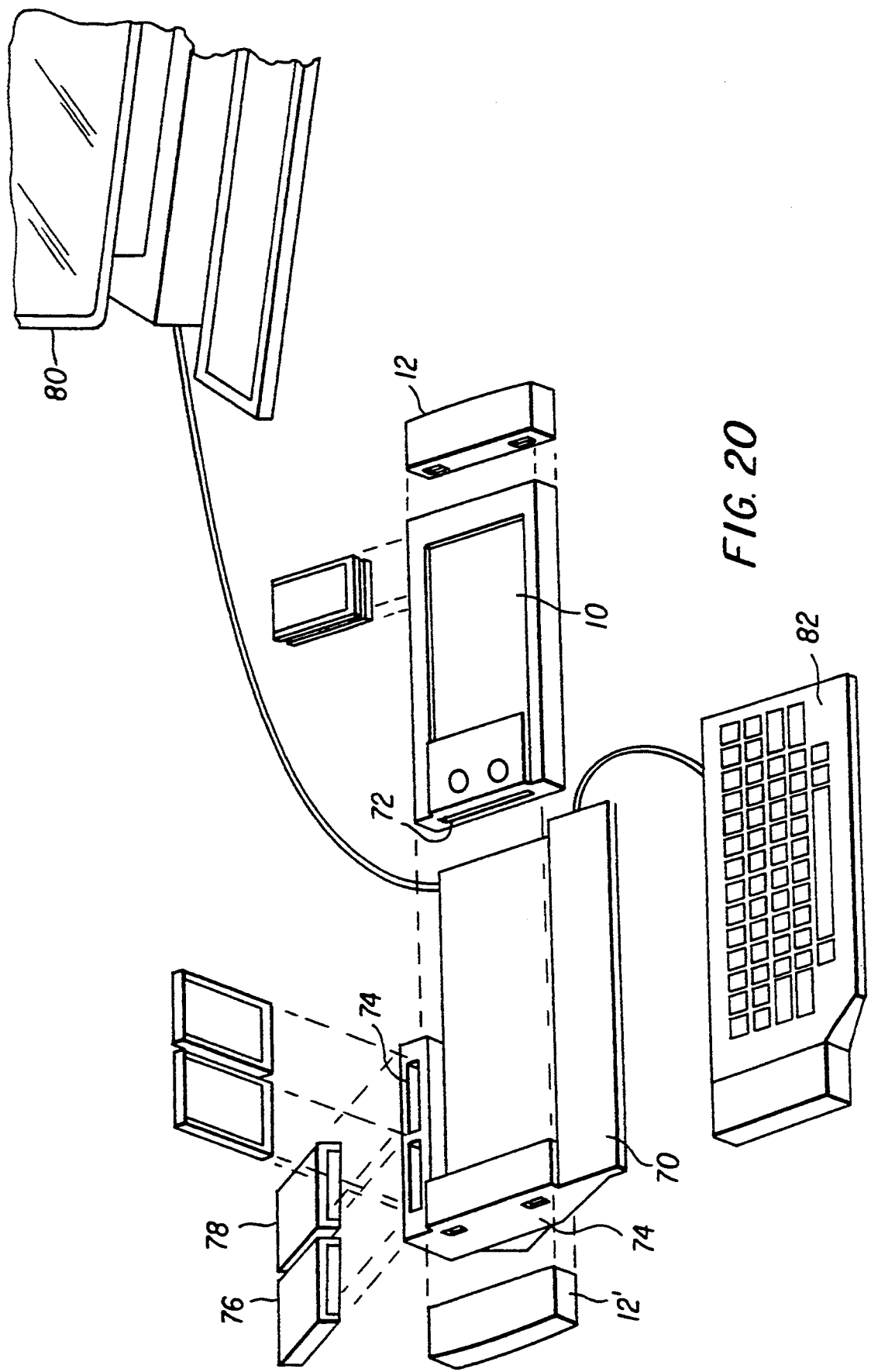
FIG. 20 illustrates an accessory docking station that is used in conjunction with the organizer illustrated in FIG. 1.

The utility of the organizer can further be extended through the use of various accessory devices. FIG. 20, for example, illustrates a docking station 70 that is designed to hold the organizer when the operator is at a desk or workstation. In the illustrated example, the main unit 10 of the organizer is provided with a docking connector 72 that mates with a corresponding docking connector (not shown) located on the docking station 70. The docking station 70 includes additional memory card expansion slots 74 that are accessible by the main unit 10 when the organizer is located in the docking station 70. Alternatively, memory cards located in the expansion slots 74 can be used to store data received from a facsimile conversion module 76, modem module 78 or personal computer 80 (PC) coupled to the docking station 70 when the main unit 10 is not located in the docking station 70. The memory cards are then transferred from the docking station 70 to the main unit 10 to be accessed.

The docking station 70 further includes a recharge station 74 which is used to charge an additional battery unit 12' that replaces the battery unit 12 when it is discharged. The main unit 10, however, does not use battery power when located in the docking station, but instead draws power from a power supply located within the docking station 70. Thus, the battery units 12, 12' can be recharged while the organizer is located in the docking station 70. Additional accessories, such as a keyboard 82 can also be plugged into the docking station 70 for interaction with the main unit 10 of the organizer.

Figure 21:
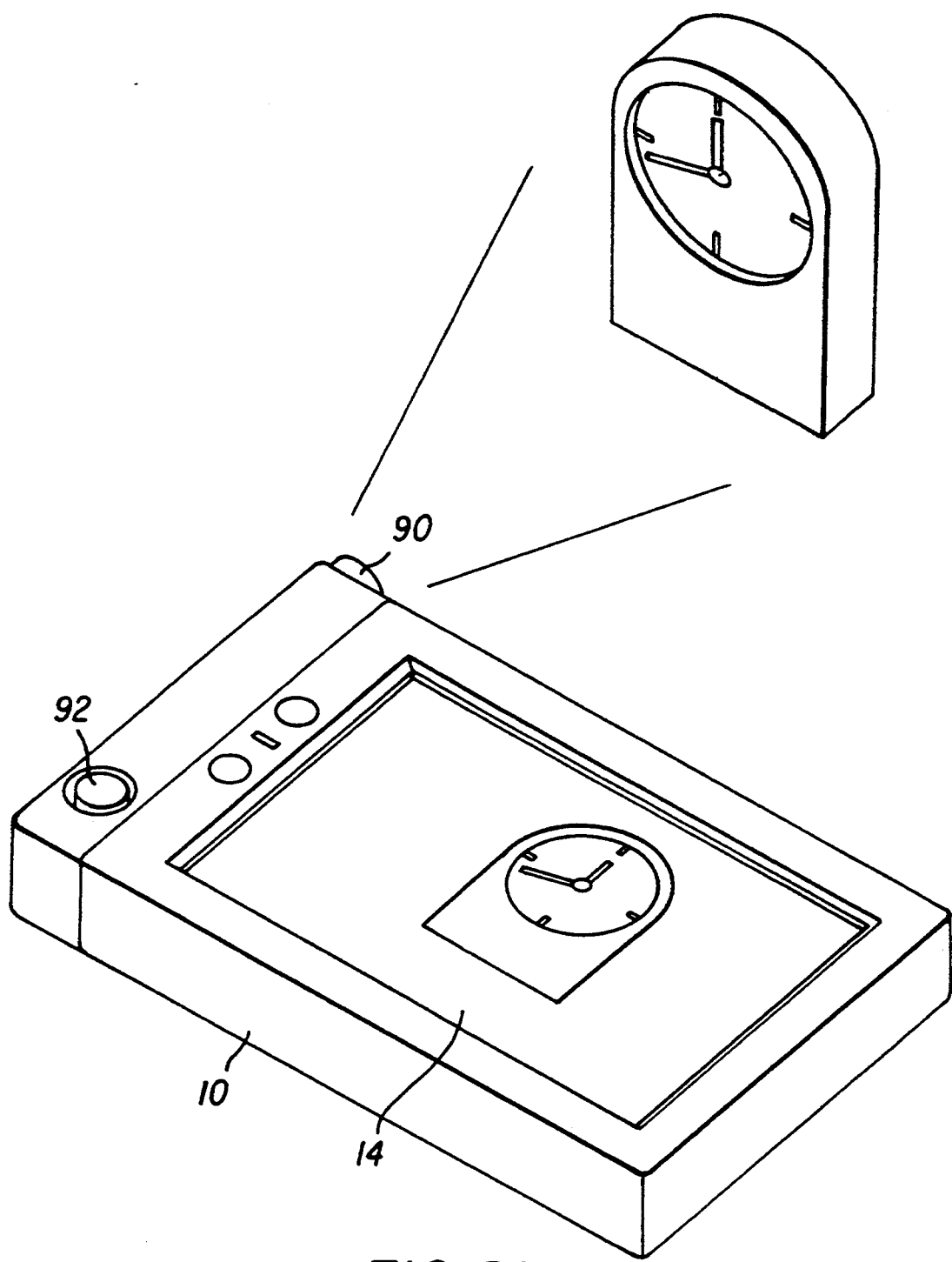
FIG. 21 illustrates an organizer in accordance with the invention that includes an electronic camera unit.

The invention has been described with reference to certain preferred embodiments thereof. It will be understood, however, that modifications and variations are possible. FIG. 21, for example, illustrates an organizer in accordance with the invention that includes an electronic camera unit having a lens 90 that focuses the image of a subject onto an electronic imaging device (not shown) provided within the body of the main unit 10. A shutter release button 92 is provided to activate camera control circuitry (not shown) coupled to the electronic imaging device and the bus 64.

In a preferred mode of operation, partial activation of the shutter release button 92 causes the output from the electronic imaging device to be supplied to the display unit 14 so that the display unit 14 can be used as an active "viewfinder". Once the image of the subject has been properly framed on the display unit 14, the shutter release button 92 is fully depressed in order to capture the image of the subject. Image data from the electronic camera unit is stored as a bit map image in the same manner as image data received from the linear electronic scanning unit 26.

The electronic camera unit can be used in combination with, or in place of, the electronic scanning unit 26 to enter data into the organizer. When used in combination, the electronic camera unit is preferably provided as an accessory module that couples to the docking connector 72 provided on the main unit 10 (See FIG. 20). The provision of a separate accessory module for the electronic camera unit enables the overall size of the main unit 10 to be kept to a minimum.

Other structural variations are also possible other than those specifically set forth above. For example, the small document transport mechanism can be configured such that it does not extend from the main unit 10, but instead, includes a document entry slot on the side of the main unit 10, a document path within the main unit 10 that passes the scanning unit, a document pinch roller driven by the transport wheels in the document path, and a document entry slot past the point of the scanning unit.

Industrial Utility

The invention provides an electronic pocket organizer that is useful in storing information that must be accessed by individual's on a routine basis. The advantages of the organizer are that is can be adapted for a variety of specific uses by modifying the organizer's system software; the user interface employed in the organizer simplifies the entry of both text and image data into the electronic organizer; data is stored in the organizer in a relational database format that further enhances organizer operation by permitting related information to be quickly and easily entered and retrieved from a plurality of databases; and a small document transport mechanism incorporated in the organizer permits small documents to be transported past the linear scanning unit of the organizer without using energy from the organizer's battery unit. The small document transport mechanism, while particularly well suited for use in the organizer, can also be incorporated in any type of hand-held scanner.

A P P E N D I X

Copyright Eastman Kodak Company
1991

S E C T I O N   A

```
 1    #define VERSION "5.3"   /*** grScreen.c              30-OCT-91
 2
 3          This is the first test of a screen method for prototyping
 4          LCD Displays in graphics mode. Borland C++ version.
 5          Last major release 2.00 on 29 Aug 91.
 6
 7    ***/
 8    #include   "GLBdef.h"
 9    #include   "GLBext.h"
10    #include   "GLBerr.h"
11    #include   "TBLext.h"
12
13    #define    TogSize    5000
14
15    extern    void   interrupt   newTICK(void);
16    int       errList(int);
17
18    /************************************************************
19
20                  GrScreen :   MAIN
21
22    ************************************************************/
23
24    void   main(int argc,char *argv[])
25    {
26    void   far *setIcon(int,int,char *[]);
27    void   mouseInit(void);
28    void   InitBezl(void);
29    void   readTime(void);
30    int    initSet(void);
31    int    setGrafMode(void);
32
33    int    rtnVal, nxt, old, status, firstFLG;
34
35    /*
36                  Preliminaries.....
37    */
38    errCount = 0;
39    if(argc == 2)                              //  Initial OCR delay...
40        ocrRate = atoi(argv[1]);               //     as input by user
41    else                                       //     or
42        ocrRate = sRate;                       //     default.
43
44    togSav = farmalloc(TogSize);               //  Toggle buffer for windows
45    togBuf = farmalloc(TogSize);               //  Toggle buffer for screens
46    if((togSav==NULL || togBuf==NULL))
47        {
48        printf("\n\tMemory allocation error (tog) !!!\n");
49        exit(rtnVal);                          //  Unsuccessful graphic setup
50        }
51
```

```
 52    if((rtnVal = setGrafMode()) != 0)    //  Set up graphics mode
 53        {
 54        printf("\n\tCan't initialize graphics !!! Error code: %d\n",rtnVal);
 55        exit(rtnVal);
 56        }
 57
 58    initSet();                             //. Initialize settings
 59    closeIcon = setIcon(CloseSZ,CloseSZ,closeIconText);
 60    if(closeIcon==NULL)
 61        {
 62        printf("\n\tMemory allocation error (icon) !!!\n");
 63        exit(rtnVal);
 64        }
 65
 66    InitBezl();                            //  Initialize information screen
 67
 68    mouseInit();                           //  Initialize the mouse
 69
 70
 71    /*
 72            Fill in the Date & Time Values
 73    */
 74    TimeUp= OFF;
 75    tickCntr = colnCntr = tickLast = 0;
 76    readTime();
 77
 78    oldTICK = getvect(TICK);              //  Save old interrupt
 79    setvect(TICK,newTICK);                //  Set new interrupt vector.
 80
 81
 82    /***************************************************************
 83
 84                        The MAIN LOOP
 85
 86     ***************************************************************/
 87    firstFLG = SKED;
 88    mainStat = ON;
 89    while(mainStat)
 90        {
 91        status = ON;   old = OPR;
 92        while(status)
 93            {
 94            tbl = mainTRG;                 //  Target table for pointer.
 95            /*
 96                    Control is passed back and forth through the return
 97                    indicator: nxt. When control is relinquished (nxt=OPR),
 98                    keyboard or pointer input determines the next action.
 99            */
100            if(firstFLG)                   //  First time through ?
101                {
102                nxt = firstFLG;            //     Yes
103                firstFLG = OFF;            //       use preset
104                }
105            else                           //     No
106                {
107                waitOPR();                 //  Wait for input (type & key).
108                nxt = type;                //  Initial value.
109                }
110            while(nxt != OPR && status)
111                {
112                switch(nxt)
113                    {
114                    case CLSW : nxt=OPR;          status=OFF;  break;
115                    case CARD : nxt=cardScrn(old); status=ON ;
116                                                   old=CARD;  break;
117                    case SKED : nxt=skedScrn(old); status=ON ;
118                                                   old=SKED;  break;
119                    case INFO : nxt=infoScrn(old); status=ON ;
120                                                   old=INFO;  break;
121                    case MEMO : nxt=memoScrn(old); status=ON ;
122                                                   old=MEMO;  break;
```

```
123                 case QUIT : mainStat = status = OFF;
124                                                                 break;
125
126                 default   : nxt=OPR;                            break;
127
128             }   /*  switch(nxt)    */
129
130         }   /*  while(nxt)      */
131
132     }   /*  while(status)    */
133
134   }   /*  while(mainStat)  */
135
136   /*
137             Return to Text Mode
138   */
139   setvect(TICK,oldTICK);              //  Restore old TICK interrupt
140                                       //           vector.
141   PointOFF;                            //  Hide mouse cursor
142   closegraph();                        //  Restore original video mode
143   farfree(togSav);
144   farfree(togBuf);
145   farfree(closeIcon);
146
147   }   /*  main()   */
148
149
150   /*********************************************************************
151
152                        Initiate Graphics Mode
153
154   *********************************************************************/
155
156   int    setGrafMode(void)
157   {
158   void   floodRect(int,int,int,int,int);
159   int    gDriver = vDRIVE;
160   int    color, gMode, errorcode;
161
162   /*
163            Register Video Driver(s)
164   */
165   errorcode = registerbgidriver(EGAVGA_driver);
166   if(errorcode < 0)
167      {
168      printf("\n\tGraphics error: %s\n",grapherrormsg(errorcode));
169      printf("\n\tPress any key to halt...");
170      getch();
171      return(errList(erREGgraf));
172      }
173
174   /*
175            Register Font(s)
176   */
177   errorcode = registerbgifont(sansserif_font);
178   if(errorcode < 0)
179      {
180      printf("\n\tGraphics error: %s\n",grapherrormsg(errorcode));
181      printf("\n\tPress any key to halt...");
182      getch();
183      return(errList(erREGfont));
184      }
185
186   /*
187            Initialize Graphics
188   */
189   if(gDriver!=DETECT)   gMode = EGAHI;   //  VGAMED = EGAHI
190   initgraph(&gDriver, &gMode, "");
191   errorcode = graphresult();
192   if(errorcode != grOk)
193      {
```

```
194        printf("\n\tGraphics error: %s\n",grapherrormsg(errorcode));
195        printf("\n\tPress any key to halt...");
196        getch();
197        return(errList(erDRVdtct));
198        }
199
200     setactivepage(0);
201     cleardevice();
202     setvisualpage(0);
203
204     return(0);                                    //   Successful set up
205
206    }  /*   setGrafMode()  */
207
208
209    /******************************************************************
210
211                     Display a Business Card
212
213     ******************************************************************/
214
215    int    dspBizCard(char *name,int xStr,int yStr)
216    {
217    unsigned  i, j, x, y;
218    FILE      *inFile;
219    BYTE      *byteBits;
220    BYTE       pixMask, pixByte;
221    struct     tagBig    *bitBuffr;
222
223    if((inFile = fopen(name,"r+b")) == NULL)
224        return(errList(erOPNfile));              //   Unable to open file
225    if((byteBits = farmalloc(buffMAX)) == NULL)
226        return(errList(erMEMbuff));              //   Out of memory
227
228    bitBuffr = (struct tagBig *)byteBits;
229                                                 //   Re-use the screen buffer
230
231    /*
232                Read and Process the Entire file
233    */
234    fread(bitBuffr,sizeof(struct tagBig),1,inFile);
235    PointOFF;                                    //   Hide mouse
236    for( j=0 ; j<crdSizeW ; j++ )
237       {
238       y = yStr + crdSizeY -1;
239       for( i=0 ; i<crdSizeY ; i++ )
240          {
241          x = xStr + 8*j;
242          pixMask = 0x80;
243          pixByte = bitBuffr->grid[i][j];
244          while(pixMask)
245             {
246             if(pixByte & pixMask)
247                putpixel(x,y,HiPix);             //   Plot a pixel
248             x++;
249             pixMask >>= 1;                      //   Shift the mask
250             }
251          y--;
252          }
253       }
254
255    PointON;                                     //   Show mouse
256    fclose(inFile);
257    farfree(byteBits);
258    return(0);
259
260    }  /*   dspBizCard()   */
261
```

```
262
263     /****************************************************************
264
265                     Initialize the Bezel Area
266
267     ****************************************************************/
268     char    arro[] = "    ";
269
270     void    InitBezl(void)
271     {
272     void    floodRect(int,int,int,int,int);
273     int     buildButn(int,int,int,int);
274     int     ElvPoint(int,int,int,int);
275     int     l, r, t, b, i, x, y;
276     int     style, size, color;
277     int     sStr, sEnd, aTopSZ;
278
279     /*
280                     Background for Entire Display
281     */
282     color = BaseBACK;
283     setcolor(color);
284     floodRect(0,0,(int)getmaxx,InfoVPy1,color);
285
286     /*
287                     Frame for Simulated LCD
288     */
289     setcolor(WHITE);
290     l = xDspOrg -1;         t = yDspOrg -1;
291     r = xDspEnd +1;         b = yDspEnd +1;
292     rectangle(l,t,r,b);
293
294     /*
295                     Top Bezel Buttons
296     */
297     settextjustify(CENTER_TEXT,CENTER_TEXT);
298     l = xTop0;              t = yTop0;
299     r = l + wTopSZ;         b = t + hTopSZ;
300     setcolor(ButnBACK);
301     floodRect(l,t,r,b,ButnBACK);
302     setcolor(BLACK);
303     l += wTopSZ/2;          t += hTopSZ/2 +1;       // Center
304     outtextxy(l,t,"SCHEDULE");
305     l = xTop1;              t = yTop1;
306     r = l + wTopSZ;
307     setcolor(ButnBACK);
308     floodRect(l,t,r,b,ButnBACK);
309     setcolor(BLACK);
310     l += wTopSZ/2;          t += hTopSZ/2 +1;       // Center
311     outtextxy(l,t,"INFORMATION");
312     l = xTop2;              t = yTop2;
313     r = l + wTopSZ;
314     setcolor(ButnBACK);
315     floodRect(l,t,r,b,ButnBACK);
316     setcolor(BLACK);
317     l += wTopSZ/2;          t += hTopSZ/2 +1;       // Center
318     outtextxy(l,t,"MEMO");
319
320     /*
321                     Directional Arrows
322     */
323     l = xTop3;              t = yTop3;
324     aTopSZ = hTopSZ +4;
325     r = l + aTopSZ;
326     setcolor(ButnBACK);
327     floodRect(l,t,r,b,ButnBACK);
328     setcolor(BLACK);
329     l += aTopSZ/2;          t += hTopSZ/2 +1;       // Center
330     outtextxy(l,t," ");
331
332     l = xTop3 + (aTopSZ+5)*1;
```

```
333    r = 1 + aTopSZ;        t = yTop3;
334    setcolor(ButnBACK);
335    floodRect(l,t,r,b,ButnBACK);
336    setcolor(BLACK);
337    l += aTopSZ/2;         t += hTopSZ/2 +1;    // Center
338    outtextxy(l,t," ");
339
340    l = xTop3 + (aTopSZ+5)*2;
341    r = 1 + aTopSZ;        t = yTop3;
342    setcolor(ButnBACK);
343    floodRect(l,t,r,b,ButnBACK);
344    setcolor(BLACK);
345    l += aTopSZ/2;         t += hTopSZ/2 +1;    // Center
346    outtextxy(l,t," ");
347
348    l = xTop3 + (aTopSZ+5)*3;
349    r = 1 + aTopSZ;        t = yTop3;
350    setcolor(ButnBACK);
351    floodRect(l,t,r,b,ButnBACK);
352    setcolor(BLACK);
353    l += aTopSZ/2;         t += hTopSZ/2 +1;    // Center
354    arro[1] = 26;
355    outtextxy(l,t,arro);
356
357    /*
358            Side Bezel Buttons
359    */
360    ForeColor = BLACK;
361    BackColor = BaseBACK;
362    for( i=0 ; i<13 ; i++ )
363        {
364        l = sideBut[i][0];    t = sideBut[i][1];
365        r = l + wSideSZ -1;   b = t + hSideSZ -1;
366        setcolor(ButnBACK);
367        floodRect(l,t,r,b,ButnBACK);
368        setcolor(BLACK);
369        buildButn(l,t,wSideSZ,hSideSZ);
370        outtextxy(l+wSideSZ/2,t+hSideSZ/2,sideLabel[i]);
371        }
372
373    settextjustify(LEFT_TEXT,TOP_TEXT);    // Restore top-left
374
375    /*
376            The Elevator Bars
377    */
378    x = xElvBotm;  y = yElvBotm;
379    sStr = ElvPoint(x,y,W,ElvSZ);          // Left elevator point
380    x += wElvBotm-ElvSZ;
381    sEnd = ElvPoint(x,y,E,ElvSZ);          // Right elevator point
382    floodRect(sStr+4,y+1,sEnd-4,y+ElvSZ-1,ForeColor);
383                                           // Fill-in elevator bar
384    x = xElvSide;  y = yElvSide;
385    sStr = ElvPoint(x,y,N,ElvSZ);          // Top elevator point
386    y += hElvSide-ElvSZ;
387    sEnd = ElvPoint(x,y,S,ElvSZ);          // Bottom elevator point
388    floodRect(x+1,sStr+4,x+ElvSZ-2,sEnd-4,ForeColor);
389                                           // Fill-in elevator bar
390
391    /*
392            The Information Window
393    */
394    color = InfoBACK;
395    l = InfoVPx1;          t = InfoVPy1;
396    r = InfoVPx2;          b = InfoVPy2;
397    setcolor(InfoFORE);
398    floodRect(l,t,r,b,color);
399    rectangle(l+winGAP,t+winGAP,r-winGAP,b-winGAP);
400
401    /*
402            The Title & Version
403    */
```

```
404     setcolor(InfoFORE);
405     style = SANS_SERIF_FONT;
406     size  = 0;
407     settextstyle(style, HORIZ_DIR, size);
408     setusercharsize(2, 3, 2, 3);
409     sprintf(msg1,"GrScreen Prototype           Ver: %s",VERSION);
410     l = InfoVPx1 + (infoWIDE - textwidth(msg1))/2;    //  Center
411     t = InfoVPy1 + 15;
412     outtextxy(l,t,msg1);
413
414     /*
415                 The OCR Rate
416     */
417     style = DEFAULT_FONT;
418     settextstyle(style, HORIZ_DIR, size);
419     sprintf(msg1,"Initial OCR delay is %d char/sec.",ocrRate);
420     l = InfoVPx1 + (infoWIDE - textwidth(msg1))/2;    //  Center
421     t = InfoVPy2 - 15;
422     outtextxy(l,t,msg1);
423
424     /*
425                 Pointer Hits, Targets & Errors
426     */
427     outtextxy(xHitsTxt,yHitsTxt,HitsTxt);
428     outtextxy(xTargTxt,yTargTxt,TargTxt);
429     outtextxy(xErorTxt,yErorTxt,ErorTxt);
430
431     /*
432                 The EXIT Button
433     */
434     color = ExitBACK;
435     l = ExitVPx1;           t = ExitVPy1;
436     r = ExitVPx2;           b = ExitVPy2;
437     setcolor(InfoFORE);
438     floodRect(l,t,r,b,color);
439     rectangle(l+winGAP,t+winGAP,r-winGAP,b-winGAP);
440
441     setcolor(ExitFORE);
442     sprintf(msg1,"EXIT");
443     l = ExitVPx1 + (exitWIDE - textwidth(msg1))/2;    //  Center
444     t = ExitVPy1 + (exitHIGH - textheight(msg1))/2 -7;
445     outtextxy(l,t,msg1);
446
447     sprintf(msg1,"Ctrl-E");
448     l = ExitVPx1 + (exitWIDE - textwidth(msg1))/2;    //  Center
449     t = ExitVPy1 + (exitHIGH - textheight(msg1))/2 +7;
450     outtextxy(l,t,msg1);
451
452     }  /*  InitBezl()  */
453
454
455
456     /*****************************************************************
457
458                 Initialize Various Values & Settings
459
460     *****************************************************************/
461
462     int     initSet(void)
463     {
464     int     i, j, xStr, yStr;
465     int     temp;
466     unsigned  size;
467
468     /*
469                 Initialize Colors
470     */
471     ForeColor = BLACK;                  //  Foreground Color
472     BackColor = WHITE;                  //  Background Color
473
```

```
474        /*
475                    Initialize the Elements Array
476        */
477        for( j=0 ; j<BNMB ; j++ )
478           for( i=0 ; i<FNMB ; i++ )
479              elems[i][j] = -1;
480
481        for( i=0 ; i<FNMB ; i++ )
482           elemtPnt[i] = 0;
483
484        fieldPnt = -1;
485
486        /*
487                    Initialize Box Status
488        */
489        for( i=0 ; i<BNMB ; i++ )
490           {
491           boxStat[i][TOG] = OFF;            //  Highlight status = OFF
492           temp = (strlen(bizCdBox[i]) *1000)/ocrRate;
493           boxStat[i][DLY] = temp;
494                                             //  OCR delay in 1 mS increments
495           }
496
497        /*
498                    Values used by Assembler Language Subsystems
499        */
500        WIDEtbl = TblWIDE *2;                //  Assembler wants a byte count
501        ENDtbl  = TblEND;
502
503        /*
504                    Miscellaneous
505        */
506        Mssg1 = Mssg2 = Omsg1 = Omsg2 = NULL;
507        clkInvisible = FALSE;                //  Show the clock
508        paintMODE = paintPNTR = FALSE;
509        winFLG = FALSE;
510
511        return(0);
512        }  /*  initSet()  */
513
514
515        /*****************************************************************
516
517                    Set up Window-Close Icon
518
519        *****************************************************************/
520        void far *setIcon(int xIconSZ,int yIconSZ,char *iconHandleText[])
521        {
522        void far *iconHandle;
523        int    xStr, yStr, i, j, size;
524
525        size = imagesize(0,0,xIconSZ-1,yIconSZ-1);    //  Get the image size
526
527        if((iconHandle = farmalloc(size)) == NULL)
528           return(NULL);                     //  Unsuccessful memory alloc
529
530        xStr = getmaxx() - xIconSZ;
531        yStr = getmaxy() - yIconSZ;
532
533        for( j=0 ; j<yIconSZ ; j++ )         //  Create the image
534           for( i=0 ; i<xIconSZ ; i++ )
535              if(*(iconHandleText[j]+i)=='*')
536                 putpixel(xStr+i,yStr+j,WHITE);
537                                             //  Save image for later
538        getimage(xStr,yStr,xStr+xIconSZ-1,yStr+yIconSZ-1,iconHandle);
539
540        return(iconHandle);
541
542        }  /*  setIcon()  */
```

```
#define VERSION  "2.6"   /*** waitOPR() & wordp()              12-SEP-91

Input processing functions for GoScreen Prototyping
        System: waitOPR & wordp. Borland C++ version.
***/ include "GLBdef.h"
include "GLBext.h"

/*****************************************************************

PROCESS   POINTER  &  KEYBOARD  INPUT

*****************************************************************/ void   waitOPR(void)
{
void   sayCords(void), sayTarg(void), clrTarg(void);
int    readPointer(int *,int *);
int    clockHndlr(void);
int    c, rsl, tgt;
int    status, row, col, high;

/*
        First make sure the last mouse button is released
*/
m1 = 3;  m2 = -1;
while(m2 != 0)                          //  Wait for button release
    mouse(&m1, &m2, &m3, &m4);

PointON;                                //  Show mouse cursor status = ON;                            //  Wait until a key is pressed
while(status)                           //    or a pointer target is hit.
  {
    if(tickCntr != tickLast)            //  Clock advance
        clockHndlr();

/*
            Check the Keyboard.
    */
    c = kbhit();                        //  Check the keyboard.
    if(!c)                              //  Nothing waiting at keyboard.
      {
        key = -1;
        type = 0;

/*
                ****  Process the Pointer Input   ****
        */
        cmd = readPointer(&xcor,&ycor);   //  Check status.
        if(cmd)                           //  A HIT !!!
          {
            PointOFF;                     //  Turn off pointer cursor
            if(diagFLG)
                sayCords();
            /*
                Check the Target Table.
            */
            rsl = tgt = -2;                    //  Initial result & target.
            cTarget(&cmd,&rsl,&tgt,&xcor,&ycor,&tbl);
            if(rsl || !tgt)                    //  Not a good target.
              {
                type = OPR;                    //  Check keypad again.
                if(diagFLG)   clrTarg();
              }
            else
              {
                type = tgt;                    //  Type becomes target #
                if(diagFLG)   sayTarg();
```

```
 72            }
 73
 74         }  /*  if(HIT)  */
 75
 76      status = OFF;
 77      break;                            //    Return to calling function.
 78
 79      }  /*  if(c<1)  */
 80
 81   /*
 82                ****    Process the Keyboard Input    ****
 83   */
 84      else
 85      {
 86         c = getch();                   //  Get the waiting character.
 87         /*
 88                Check for function keys and others.
 89         */
 90         if(!(c & 0xFF))                 //  Extended function.
 91            {
 92            switch(high)                 //  Decode High byte (scan code).
 93               {
 94               case 32: type= DIAG  ;
 95                        key = ' '   ; break;    // alt-D   DIAGNOSTIC
 96               case 71: type= PREV  ;
 97                        key = ' '   ; break;    // Home    PREVIOUS
 98               case 72: type= UP    ;
 99                        key = ' '   ; break;    // up      CURSOR UP
100               case 73: type= NEXT  ;
101                        key = ' '   ; break;    // PgUp    NEXT
102               case 75: type= LEFT  ;
103                        key = LEFT  ; break;    // left    CURSOR LT
104               case 77: type= RIGHT ;
105                        key = RIGHT ; break;    // right   CURSOR RHT
106               case 80: type= DOWN  ;
107                        key = ' '   ; break;    // down    CURSOR DN
108
109               default: type = 0;
110                                    key = '?'; break;
111               }  /* switch(high) */
112            }  /* if extended function  */
113
114         else
115            {                            //  NOT extended functions.
116            switch(key = c&0xFF)
117               {
118               case  5:  type = QUIT;   break;     // Ctrl-E
119               case  8:  type = ALPH;   break;     // BACKSPACE
120               case 13:  type = ENTR;   break;     // Enter
121               case 32:  type = ALPH;   break;     //         SPACE
122
123               case '*': type = SLCT;   break;     // *       SELECT
124
125               default:
126                  {
127                  type = ALPH;          //  Assumed to be alpha-numeric.
128                  break;
129                  }
130               }  /* switch (key)  */
131            }  /* else not extended function */
132
133         status = OFF;                  //  Return to calling function.
134         }  /*  else keyboard  */
135
136      }  /*  while(status)  */
137
138   }  /*  waitOPR()  */
```

```
/***************************************************************
            Read the Pointer Device

***************************************************************/ int     readPointer(int *xPoint,int *yPoint)
{
int     cmousel(int *,int *,int *,int *);
int     kbhit(void);
int     target, i, mBut;

/*
            Check for a hit
*/
mButn = *xPoint = *yPoint = 0;

m1 = 5;  m2 = 1;                    //   Right button...
mouse(&m1, &m2, &m3, &m4);          //        ...read hits.
if(m2)
    {
    mButn   = RIGHT;                //   Save results
    *xPoint = m3;
    *yPoint = m4;
    } m1 = 5;  m2 = 0;                    //   Left button...
mouse(&m1, &m2, &m3, &m4);          //        ...read hits.
if(m2)
    {
    mButn |= LEFT;                  //   Include left button
    *xPoint = m3;                   //   Override the
    *yPoint = m4;                   //     right button values.
    } if(mButn)                           //   Count the number of HITS
    clicks += 1;

return(mButn);

}  /*  readPointer()   */

/***************************************************************

This subroutine handles character (input) processing.

***************************************************************/ void   wordp(void)
{
int x, y, c;

switch(key)
    {
      case CR:                      //   CARRIAGE RETURN
        {
        posit = 0;                  //   First position in field.
        break;
        }  /* carriage return */ case BACKSPACE:               //   BACKSPACE
        {
        if(posit)                   //   Not beginning a line.
            {
            posit--;                //   Adjust counter.
            }  /* if (posit != 0) */
```

```
209            break;
210          } /* backspace */
211
212       case TAB:                                  //   TAB
213          {
214             posit = 0;                           //  First position in field.
215          break;
216          } /* tab */
217   */
218       case BACTAB:                               //   BACK TAB
219          {
220             posit = 0;                           //  First position in field.
221          break;
222          } /* btab */
223
224       case RIGHT:                                //   RIGHT  CURSOR
225          {
226          posit++;                                //  Advance counter.
227          break;
228          } /* right */
229
230       case LEFT:                                 //   LEFT   CURSOR
231          {
232          if(posit)                               //  Not beginning a line.
233             {
234             posit--;                             //  Reverse counter.
235             } /* if (posit != 0) */
236          break;
237          } /* left */
238
239       default:
240          {                                       //   DEFAULT
241          /* If at the end of the field tab to next field */
242
243          tex[0] = key;                           //  Normal key character.
244   /*        text(tex);                           /*  Print out to screen.      *
245          posit++;                                //  Go to next position.
246          break;
247          } /* default */
248
249       } /* switch(key) */
250
251    } /* wordp()   */
```

S E C T I O N    B

```
1     #define VERSION "6.1"  /***   skedScrn.c                      18-SEP-91
2
3              This is the Schedule section of the
4                 GoScreen Prototyping System.
5
6     ***/
7     #include   "GLBdef.h"
8     #include   "GLBext.h"
9     #include   "appoint.h"
10
11    int    ySkedWstr, ySkedWend;
12    int    xWhenStr,  xWhenEnd ;
13    int    xWhoStr,   xWhoEnd  ;
14    int    xWhereStr, xWhereEnd;
15    int    xWhyStr,   xWhyEnd  ;
16    int    newRow,    itemSked, lastRow;
17    int    xSkedText, ySkedText;
18    int    xSkedFrStr,ySkedFrStr;
19    int    xSkedFrEnd,ySkedFrEnd;
20    int    lastL, lastT, lastR, lastB, lastCol;
21    int    timeStr = 17;                          // Start time for sked
22    extern    int    targt03[][TblWIDE];
23
```

```
24      char    timeMsg[] = "12:30";
25
26      #define     SkedSZ      17                      //  Height of schedule entry.
27      #define     yEntrySZ    (SkedSZ-4)              //  Height of actual entry.
28      #define     WHO         1
29      #define     WHERE       2
30      #define     WHY         3
31
32      char    *skedTabLabel[] =
33          {
34              " SUN ",
35              " MON ",
36              " TUE ",
37              " WED ",
38              " THU ",
39              " FRI ",
40              " SAT "
41          };
42
43      int     skedTabVal[][3] =
44          {
45              {   TBD,    TBD,    SKEDDAY1    },
46              {   TBD,    TBD,    SKEDDAY2    },
47              {   TBD,    TBD,    SKEDDAY3    },
48              {   TBD,    TBD,    SKEDDAY4    },
49              {   TBD,    TBD,    SKEDDAY5    },
50              {   TBD,    TBD,    SKEDDAY6    },
51              {   TBD,    TBD,    SKEDDAY7    }
52          };
53
54      char    pat1[] =
55          {
56              0x77, 0xFF, 0xBB, 0xFF, 0xDD, 0xFF, 0xEE, 0xFF
57          };
58
59      char    pat2[] =
60          {
61              0x77, 0xFF, 0xFF, 0xFF, 0xDD, 0xFF, 0xFF, 0xFF
62          };
63
64      /***********************************************************************
65
66                          Sked Screen Functions
67
68      ***********************************************************************/
69
70      int     skedScrn(int old)
71      {
72      void    StdHead(char *);
73      void    setSimDsp(void);
74      void    conv2(int);
75      int     keybWind(int);
76      int     SkedTab(int);
77      int     SkedWho(int);
78      int     SkedWhy(int);
79      int     SkedWhere(int);
80      int     listWind(int,int);
81
82      int     firstFLG, trgPos;
83      int     mainStat, status, nxt;
84      int     i, x;
85
86      old++;
87      lastCol = 0;
88
89      /*
90              Build the Screen
91      */
92      ForeColor = BLACK;
93      BackColor = WHITE;
94      setSimDsp();                                    //  Set up simulated LCD
95      StdHead("SCHEDULE");
```

```
 96
 97    xSkedText  = genGAP + 6;            ySkedText  = yBODY + newGAP +35;
 98    xSkedFrStr = genGAP;                 ySkedFrStr = yBODY + newGAP;
 99    xSkedFrEnd = dspWIDE -1 -genGAP;     ySkedFrEnd = dspHIGH-genGAP-1;
100
101    xWhyEnd = xSkedFrEnd -genGAP*2;            // Relative
102
103    /*
104            The Tabs, Labels & Targets
105    */
106    x = xSkedFrStr + 4;
107    for( i=0 ; i<7 ; i++ )
108       {
109       skedTabVal[i][BEG] = x +6;
110       x = makeTab(skedTabVal[i][BEG],ySkedFrStr,skedTabLabel[i]);
111       skedTabVal[i][END] = x;
112       trgPos = trgPosition(skedTRG,skedTabVal[i][TRG]);
113       targt03[trgPos][1] = trgButn.xAbs;
114       targt03[trgPos][2] = trgButn.yAbs;
115       targt03[trgPos][3] = trgButn.xAbs + trgButn.wAbs;
116       targt03[trgPos][4] = trgButn.yAbs + trgButn.hAbs;
117       }
118
119    lastRow = NONE;
120
121
122    /*******************************************************************
123
124            The Main Loop
125
126    *******************************************************************/
127    firstFLG = SKEDDAY2;
128    mainStat = ON;
129    while(mainStat)
130       {
131       status = ON;   old = OPR;
132       while(status)
133          {
134          tbl = skedTRG;                // Target table for pointer.
135          /*
136                  Control is passed back and forth through the return
137                  indicator: nxt. When control is relinquished (nxt=OPR),
138                  keyboard or pointer input determines the next action.
139          */
140          if(firstFLG)                  // First time through ?
141             {
142             nxt = firstFLG;            //    Yes
143             firstFLG = OFF;            //    use preset
144             }
145          else                          //    No
146             {
147             waitOPR();                 // Wait for input (type & key).
148             nxt = type;                // Initial value.
149             }
150
151          while(nxt != OPR && status)
152             {
153             switch(nxt)
154                {
155                case WHENFIELD : nxt=SkedWhen(ycor);
156                                                              break;
157                case WHOFIELD  : nxt=SkedWho(ycor);
158                                                              break;
159                case WHEREFIELD: nxt=SkedWhere(ycor);
160                                                              break;
161                case WHYFIELD  : nxt=SkedWhy(ycor);
162                                                              break;
163                case CARD :
164                case MEMO :
165                case INFO : mainStat = status = OFF;
```

```
166                                                                          break;
167
168                  case LIST :  nxt=listWind(CONTACT,SE);
169                               old=LIST;    status = ON;                  break;
170
171                  case XFER :  nxt=xferSked(old);   status = ON;  break;
172
173                  case EDIT :  nxt=keybWind(SW);    status = ON;  break;
174
175                  case CLDR :                                      // Calendar
176                               nxt=clndWind(old);
177
178                                                                          break;
179                  case TOOL :  nxt=toolWind(old);   status = ON;  break;
180
181                  case QUIT :  mainStat = status = OFF;
182                               nxt=QUIT;
183                                                                          break;
184                  default   :  if(nxt>=SKEDDAY1 && nxt<=SKEDDAY7)
185                                   nxt=SkedTab(nxt-SKEDDAY1);
186                               else
187                                   nxt=OPR;
188                                                                          break;
189
190               }  /* switch(nxt)   */
191
192           }  /* while(nxt)      */
193
194       }  /* while(status)   */
195
196   }  /* while(mainStat)  */
197
198   return(nxt);
199   } /*  skedScrn()   */
200
201
202   /*******************************************************************
203
204              "WHEN" Item Targets
205
206   *******************************************************************/
207
208   int   SkedWhen(int yVector)
209   {
210   int   SkedTarg(int,int,int,int);
211
212   SkedTarg(yVector,xWhenStr,xWhenEnd,TRUE);
213
214   return(OPR);
215
216   }  /*  SkedWhen()  */
217
218
219
220   /*******************************************************************
221
222              "WHO" Item Targets
223
224   *******************************************************************/
225
226   int   SkedWho(int yVector)
227   {
228   int   SkedTarg(int,int,int,int);
229
230   SkedTarg(yVector,xWhoStr,xWhoEnd,WHO);
231   lastCol = WHO;                                      // Update flag.
232
233   return(OPR);
234
235   }  /*  SkedWho()  */
236
```

```
237
238
239    /****************************************************************
240
241                  "WHERE" Item Targets
242
243    ****************************************************************/
244
245    int    SkedWhere(int yVector)
246    {
247    int    SkedTarg(int,int,int,int);
248
249    SkedTarg(yVector,xWhereStr,xWhereEnd,WHERE);
250    lastCol = WHERE;                                  //  Update flag.
251
252    return(OPR);
253
254    }  /*  SkedWhere()  */
255
256
257    /****************************************************************
258
259                  "WHY" Item Targets
260
261    ****************************************************************/
262
263    int    SkedWhy(int yVector)
264    {
265    int    SkedTarg(int,int,int,int);
266
267    SkedTarg(yVector,xWhyStr,xWhyEnd,WHY);
268    lastCol = WHY;                                    //  Update flag.
269
270    return(OPR);
271
272    }  /*  SkedWhy()  */
273
274
275    /****************************************************************
276
277                  TAB Target Hit
278
279    ****************************************************************/
280
281    int    SkedTab(int which)
282    {
283    void   skedFrame(int);
284    int    i, y, offSet;
285    char   **locStr;
286
287    lastRow = NONE;
288    skedFrame(which);                                 //  Complete the tab frame.
289
290    /*
291              Fill-in the Appointments
292    */
293    settextjustify(LEFT_TEXT,CENTER_TEXT);
294    setcolor(ForeColor);
295    locStr = (char **)appTable[which];
296    offSet = timeStr - tableStr;
297    y = ySkedWstr + yEntrySZ/2 +1;
298    for( i=0 ; i<itemSked ; i++,y+=SkedSZ )
299       {
300       if(**(locStr+(i+offSet)*3) != ' ')
301          {
302          outtextxy(xWhoStr  +2, y,*(locStr+(i+offSet)*3   ));
303          outtextxy(xWhereStr+2, y,*(locStr+(i+offSet)*3+1));
304          outtextxy(xWhyStr  +2, y,*(locStr+(i+offSet)*3+2));
305          }
306       }
307    settextjustify(LEFT_TEXT,TOP_TEXT);
```

```
308
309     return(OPR);
310
311     }  /*  SkedTab()  */
312
313
314     /******************************************************************
315
316                     Schedule Item Targets
317
318     ******************************************************************/
319
320     int    SkedTarg(int yVector, int l, int r,int newCol)
321     {
322     int    t, b, offSet;
323
324     vpSET(LCDsSCRN);                          //  Set viewport
325     t = vpVal[LCDsSCRN][1] + ySkedWstr;
326     b = t + yEntrySZ;
327
328     /*
329             Find out if a line has been hit
330     */
331     for( newRow=0 ; newRow<itemSked ; newRow++ )
332         {
333         offSet = SkedSZ * newRow;
334         if(yVector >= (t+offSet) && yVector <= (b+offSet))
335            break;
336         }
337     if(newRow == itemSked)
338        return(OPR);                           //  Line not hit
339
340     /*
341             Remove Old Highlight
342     */
343     PointOFF;
344
345     if(lastRow != NONE)
346        imageToggle(lastL,lastT,lastR,lastB,togBuf);
347
348     /*
349             Set New Highlight
350     */
351     if(lastRow != newRow || newCol != lastCol)
352         {
353         t = ySkedWstr + SkedSZ * newRow;
354         b = t + yEntrySZ;
355         imageToggle(l,t,r,b,togBuf);          //  Highlight new item
356         lastL = l;  lastT = t;  lastR = r;  lastB = b;
357         lastRow = newRow;
358         }
359     else
360        lastRow = NONE;                        //  No cell highlighted
361
362     PointON;
363
364     return(OPR);
365
366     }  /*  SkedTarg()  */
367
368
369
370     /******************************************************************
371
372                    Transfer from the LIST to Schedule
373
374     ******************************************************************/
375
376     int    xferSked(int old)
377     {
378     void   floodRect(int,int,int,int,int);
```

```
379     unsigned size;
380     int    l, t, r, b;
381
382     PointOFF;
383     l = xWhoStr;         t = ySkedWstr + SkedSZ * lastRow;
384     r = xWhoEnd;         b = t + yEntrySZ;
385
386     if(lastRow != NONE && old == LIST)      // Item highlighted
387        {
388        l = lastL;   t = lastT;
389        r = lastR;   b = lastB;
390        floodRect(l,t,r,b,BackColor);           // Clear highlight & item
391
392        l += vpVal[LCDsSCRN][0];    r += vpVal[LCDsSCRN][0];
393        t += vpVal[LCDsSCRN][1];    b += vpVal[LCDsSCRN][1];
394        setviewport(l,t,r,b,CLIP_ON);           // Temporary for clipping
395        settextjustify(LEFT_TEXT,CENTER_TEXT);
396        setcolor(ForeColor);
397        outtextxy(2,yEntrySZ/2+1,itemPntr);     // Display item
398        settextjustify(LEFT_TEXT,TOP_TEXT);
399        vpSET(vpNmb);                           // Restore viewport.
400        lastRow = NONE;
401        }
402
403     PointON;
404     return(OPR);
405
406     }  /*  xferSked()   */
407
408
409     /*****************************************************************
410
411
412                    Complete the TAB Frame
413
414     *****************************************************************/
415
416     void   skedFrame(int tabNmb)
417     {
418     void   floodRect(int,int,int,int,int);
419     void   patrnRect(int,int,int,int,int,char far *);
420     void   conv2(int);
421     int    l, t, r, b, i, j;
422     int    lp, tp, rp, bp;
423     int    items, trgPos;
424
425     l = xSkedFrStr;      t = ySkedFrStr;
426     r = xSkedFrEnd;      b = ySkedFrEnd;
427     PointOFF;
428
429     floodRect(l,t,r,b,BackColor);                    // Clear display area
430
431     settextjustify(LEFT_TEXT,TOP_TEXT);
432     line(l,t,   skedTabVal[tabNmb][BEG],   t  );
433     line(l,t+1,skedTabVal[tabNmb][BEG]-1,t+1);       // Double thickness
434     line(skedTabVal[tabNmb][END],   t,  r,t  );
435     line(skedTabVal[tabNmb][END]+1,t+1,r,t+1);
436     line(l,t,l,b);                                   // Left line
437     line(l,b,r,b);                                   // Bottom line
438     line(r,t,r,b);                                   // Right line
439
440     /*
441              Horizontal Lines
442     */
443     t += 10;                                         // Top line of schedule
444     line(l,t,r,t);
445     line(l,t+1,r,t+1);
446     lp = l +2;    rp = r -2;   tp = t +2;
447     itemSked = items = (b - t)/SkedSZ -1;
448     t += SkedSZ + (b - t)%SkedSZ;                    // Assign leftover space
449     bp = t -2;                                       //    to the label fields.
```

```
450    ySkedWstr = t +2;                                    // Save for later
451    j = timeStr;                                          // Starting time.
452    for( i=0 ; i<items ; i++,t+=SkedSZ,j++ )
453       {
454       if(i==0)
455          {
456          line(l,t-1,r,t-1);
457          line(l,t,r,t);
458          }
459       else
460          line(l+genGAP,t,r-genGAP,t);                     // Leave a gap at the ends
461       if(j%2)     timeMsg[3] = '3';
462       else        timeMsg[3] = '0';
463       conv2(j/2);
464       outtextxy(l+genGAP*2,t+SkedSZ/3,timeMsg);
465       }
466
467    /*
468               Vertical Lines
469    */
470    patrnRect(lp,tp,rp,bp,BackColor,pat2);    // Lay down a pattern.
471    t = ySkedFrStr + 10;      b = ySkedFrEnd;
472    ySkedWend = b -1;                                      // Save for later
473    outtextxy(l+genGAP*3,t+SkedSZ/2,"When");
474    l += (genGAP*4 + textwidth(timeMsg));
475    line(l,bp+2,l,b);
476    xWhenStr = l+genGAP*2;                                 // Save for later
477    l += 15;                                               // Gap for meeting length
478    xWhenEnd = l-genGAP*2;                                 // Save for later
479    line(l,t,l,b);
480    xWhoStr = l+genGAP*2;                                  // Save for later
481    outtextxy(xWhoStr+genGAP*2,t+SkedSZ/2,"Who");
482    l += 175;
483    xWhoEnd = l-genGAP*2;                                  // Save for later
484    line(l,t,l,b);
485    xWhereStr = l+genGAP*2;                                // Save for later
486    outtextxy(l+genGAP*4,t+SkedSZ/2,"Where");
487    l += 75;
488    xWhereEnd = l-genGAP*2;                                // Save for later
489    line(l,t,l,b);
490    xWhyStr = l+genGAP*2;                                  // Save for later
491    outtextxy(l+genGAP*4,t+SkedSZ/2,"Why");
492
493    /*
494               Fill in the Dynamic Targets
495    */
496    trgPos = trgPosition(skedTRG,WHENFIELD);       // Find target position
497    targt03[trgPos][1] = vpVal[LCDsSCRN][0] + xWhenStr ;
498    targt03[trgPos][2] = vpVal[LCDsSCRN][1] + ySkedWstr;
499    targt03[trgPos][3] = vpVal[LCDsSCRN][0] + xWhenEnd ;
500    targt03[trgPos][4] = vpVal[LCDsSCRN][1] + ySkedWend;
501
502    trgPos = trgPosition(skedTRG,WHOFIELD);        // Find target position
503    targt03[trgPos][1] = vpVal[LCDsSCRN][0] + xWhoStr ;
504    targt03[trgPos][2] = vpVal[LCDsSCRN][1] + ySkedWstr;
505    targt03[trgPos][3] = vpVal[LCDsSCRN][0] + xWhoEnd ;
506    targt03[trgPos][4] = vpVal[LCDsSCRN][1] + ySkedWend;
507
508    trgPos = trgPosition(skedTRG,WHEREFIELD);      // Find target position
509    targt03[trgPos][1] = vpVal[LCDsSCRN][0] + xWhereStr;
510    targt03[trgPos][2] = vpVal[LCDsSCRN][1] + ySkedWstr;
511    targt03[trgPos][3] = vpVal[LCDsSCRN][0] + xWhereEnd;
512    targt03[trgPos][4] = vpVal[LCDsSCRN][1] + ySkedWend;
513
514    trgPos = trgPosition(skedTRG,WHYFIELD);        // Find target position
515    targt03[trgPos][1] = vpVal[LCDsSCRN][0] + xWhyStr ;
516    targt03[trgPos][2] = vpVal[LCDsSCRN][1] + ySkedWstr;
517    targt03[trgPos][3] = vpVal[LCDsSCRN][0] + xWhyEnd ;
518    targt03[trgPos][4] = vpVal[LCDsSCRN][1] + ySkedWend;
519
520    PointON;
521    } /*  skedFrame()   */
```

```
522
523
524   /******************************************************************
525
526          Convert an Integer to 2 ASCII Characters in timeMsg
527
528   ******************************************************************/
529
530   void  conv2(int valu)
531   {
532   if(valu > 12)  valu -= 12;
533
534   timeMsg[1] = (valu % 10) + '0';
535   if(valu / 10)  timeMsg[0] = (valu / 10) + '0';
536   else           timeMsg[0] = ' ';
537
538   }  /*  conv2()  */
```

```
1    #define VERSION "5.6"  /***  infoScrn.c              11-SEP-91
2
3            This is the Information screen section of
4                the GoScreen Prototyping System.
5
6    ***/
7    #include    "GLBdef.h"
8    #include    "GLBext.h"
9
10   #define   TextSPACE 13
11
12   extern    int    targt04[][TblWIDE];
13   int    xInfoText,  yInfoText;
14   int    xInfoFrStr, yInfoFrStr;
15   int    xInfoFrEnd, yInfoFrEnd;
16   int    oldInfo,    infoTAB;
17   int    cardFLG = OFF;
18
19   char   *infoTabLabel[] =
20       {
21           "Card File",
22           "Team G",
23           "Family",
24           "Friends",
25           "Vendors"
26       };
27
28   int    infoTabVal[][3] =
29       {
30           { TBD, TBD, INFOTAB1 },
31           { TBD, TBD, INFOTAB2 },
32           { TBD, TBD, INFOTAB3 },
33           { TBD, TBD, INFOTAB4 },
34           { TBD, TBD, INFOTAB5 }
35       };
36
37   char *infoTeam[] =   //         2         3         4
38       { // 012345678901234567890123456789012345678901
39           "    NAME            COMPANY              PHONE        ",
40           "---------------------------------------------------------",
41           "Ms Susan Claris    Eastman KODAK Co     (716) 726-3281",
42           "Mr Joseph Little   Eastman KODAK Co     (716) 726-1553",
43           "Ms Janet Rodgers   Eastman KODAK Co     (716) 781-1147",
44           "Mr Robert Wilson   Eastman KODAK Co     (716) 745-9527",
45           "                                                      "
46       };
47
48   char *infoFmly[] =   //         2         3         4
49       { // 012345678901234567890123456789012345678901
50           "    NAME                                 PHONE        ",
51           "-----------------------------    -----------------",
```

```
 52              " Mother
 53              " Uncle Max                                 (212) 238-3642",
 54              " Cousin Leroy                              (415) 889-0372",
 55              " Wilbur                                    (607) 326-5532",
 56              " Helen                                     (717) 325-8331",
 57        } ;                                                   unlisted  "
 58
 59    char *infoFrnd[] =     //         2         3         4
 60        { //   01234567890123456789012345678901234567890123456789 01
 61              "         NAME                               PHONE       ",
 62              "-----------------------------------------------------",
 63              " Bob                                        (212) 238-3642",
 64              " Jim                                        (315) 648-3452",
 65              " Muffin                                     (716) 512-7348",
 66              " Reggie                                     (503) 746-7451",
 67              "                                                         "
 68        } ;
 69
 70    char *infoVndr[] =     //         2         3         4
 71        { //   01234567890123456789012345678901234567890123456789 01
 72              "    NAME            COMPANY                 PHONE      ",
 73              "-----------------------------------------------------",
 74              " Steve Williams    ChemSol                  (318) 238-3522",
 75              " Jack Reynolds     Bander Machine           (716) 247-4454",
 76              " Milt Collins      InterTel                 (212) 626-1400",
 77              " Ralph LoMesto     Acme Trucking            (315) 221-6111",
 78              " Quincy Mass       CompuJive                (802) 551-4512"
 79        } ;
 80
 81    char   locBuf[50];
 82    BYTE   cardField[InfoCrdCnt];            //  Entry indicator
 83
 84    /***************************************************************
 85
 86                   Info Screen Functions
 87
 88    ***************************************************************/
 89
 90    int    infoScrn(int old)
 91    {
 92    void   StdHead(char *);
 93    void   setSimDsp(void);
 94    int    keybWind(int);
 95    int    listWind(int,int);
 96    int    trgPosition(int,int);
 97    int    makeTab(int,int,char *);
 98    int    mainStat, status, nxt, firstFLG;
 99    int    l, t, i, x, trgPos;
100
101
102    /*
103                   Build the Screen
104    */
105    PointOFF;
106    ForeColor = BLACK;
107    BackColor = WHITE;
108    setSimDsp();                              //  Set up simulated LCD
109    StdHead("INFORMATION");
110
111    xInfoText  = newGAP + 6;                  yInfoText  = yBODY + newGAP +35;
112    xInfoFrStr = newGAP;                      yInfoFrStr = yBODY + newGAP;
113    xInfoFrEnd = dspWIDE -1 -newGAP;          yInfoFrEnd = dspHIGH-newGAP-1;
114
115    /*
116                   The Tabs, Labels & Targets
117    */
118    l = newGAP;                      t = yBODY + newGAP;
119
120    x = l + 10;
121    for( i=0 ; i<5 ; i++ )
122        {
```

```
123          infoTabVal[i][BEG] = x +6;
124          x = makeTab(infoTabVal[i][BEG],t,infoTabLabel[i]);
125          infoTabVal[i][END] = x;
126          trgPos = trgPosition(infoTRG,infoTabVal[i][TRG]);
127          targt04[trgPos][1] = trgButn.xAbs;
128          targt04[trgPos][2] = trgButn.yAbs;
129          targt04[trgPos][3] = trgButn.xAbs + trgButn.wAbs;
130          targt04[trgPos][4] = trgButn.yAbs + trgButn.hAbs;
131          }
132
133     for( i=0 ; i<InfoCrdCnt ; i++ )           // Intialize entry indicators
134        cardField[i] = FALSE;
135
136     /******************************************************************
137
138                    The Main Loop
139
140     ******************************************************************/
141     firstFLG = INFOTAB1;
142     mainStat = ON;
143     while(mainStat)
144        {
145        status = ON;
146        while(status)
147           {
148           tbl = infoTRG;                    // Target table for pointer.
149           /*
150                  Control is passed back and forth through the return
151                  indicator: nxt. When control is relinquished (nxt=OPR),
152                  keyboard or pointer input determines the next action.
153           */
154           if(firstFLG)                      // First time through ?
155              {
156              nxt = firstFLG;                //    Yes
157              firstFLG = OFF;                //       use preset
158              }
159           else                              //    No
160              {
161              waitOPR();                     // Wait for input (type & key).
162              nxt = type;                    // Initial value.
163              }
164
165           while(nxt != OPR && status)
166              {
167              switch(nxt)
168                 {
169                 case CARD :
170                 case MEMO :
171                 case SKED :  mainStat = status = OFF;
172                              break;
173                 case INFOTAB1 : nxt=infoTab1(old);  status = ON;
174                                 old=INFOTAB1;                    break;
175
176                 case INFOTAB2 : nxt=infoTab2(old);  status = ON;
177                                 old=INFOTAB2;                    break;
178
179                 case INFOTAB3 : nxt=infoTab3(old);  status = ON;
180                                 old=INFOTAB3;                    break;
181
182                 case INFOTAB4 : nxt=infoTab4(old);  status = ON;
183                                 old=INFOTAB4;                    break;
184
185                 case INFOTAB5 : nxt=infoTab5(old);  status = ON;
186                                 old=INFOTAB5;                    break;
187
188                 case LIST :  if(oldInfo == INFOCARD4)
189                                 nxt=listWind(TITLE,NW);
190                              else if(oldInfo == INFOCARD5)
191                                 nxt=listWind(COMPANY,NE);
192                              else
```

```
193                              nxt=listWind(CONTACT,SE);
194                              old=LIST;           status = ON;   break;
195
196         case XFER :  nxt=xferInfo(old);          status = ON;   break;
197
198         case TOOL :  nxt=toolWind(old);          status = ON;   break;
199
200         case EDIT :  nxt=keybWind(SW);           status = ON;   break;
201
202         case CLDR :                                      //  Calendar
203                      closTool();
204                      nxt=clndWind(old);
205                                                                 break;
206
207         case QUIT :  mainStat = status = OFF;
208                      nxt=QUIT;                                   break;
209
210         default   :  if(nxt>=INFOCARD1 && nxt<=INFOCARD17)
211                          infoCard(nxt);
212                      nxt=OPR;                                    break;
213
214         }  /*  switch(nxt)    */
215
216       }  /*  while(nxt)       */
217
218     }  /*  while(status)      */
219
220   }  /*  while(mainStat)      */
221
222
223   return(nxt);
224 }  /*  infoScrn()   */
225
226
227
228 /*********************************************************************
229
230                  Card File Field Targets
231
232 *********************************************************************/
233
234 int    infoCard(int InfoNmb)
235 {
236 void   floodPoly(int,int,int,int,int);
237 int    oldPos, newPos;
238 unsigned  size;
239 int    l, t, r, b;
240
241 if(infoTAB != INFOTAB1)
242     return(OPR);
243
244 PointOFF;
245
246 /*
247         Has the highlighted line been hit
248 */
249 if(oldInfo != NONE)
250     {                                           //  Clear last field
251     oldPos = trgPosition(infoTRG,oldInfo);
252     l = targt04[oldPos][1] - vpVal[vpNmb][0];
253     t = targt04[oldPos][2] - vpVal[vpNmb][1];
254     r = targt04[oldPos][3] - vpVal[vpNmb][0] +1;
255     b = targt04[oldPos][4] - vpVal[vpNmb][1] +1;
256     if(cardField[oldInfo-INFOCARD1] == FALSE)   //  Blank field ?
257         {
258         floodPoly(l,t,r,b,BackColor);    //    Yes,
259         setcolor(ForeColor);
260         line(l,b-2,r,b-2);                      //  Restore line.
261         }
262     else
263         {
```

```
264            size = imagesize(l,t,r,b);          //   Get the image size
265            togBuf = farmalloc(size);
266            imageToggle(l,t,r,b,togBuf);        //   Reverse the existing
267            farfree(togBuf);                    //       image.
268            }
269         }
270
271     if(oldInfo != InfoNmb)                      //   Hightlight new field
272        {
273        newPos = trgPosition(infoTRG,InfoNmb);
274        l = targt04[newPos][1] - vpVal[vpNmb][0];
275        t = targt04[newPos][2] - vpVal[vpNmb][1];
276        r = targt04[newPos][3] - vpVal[vpNmb][0] +1;
277        b = targt04[newPos][4] - vpVal[vpNmb][1] +1;
278        if(cardField[InfoNmb-INFOCARD1] == FALSE)      //  Blank field ?
279            floodPoly(l,t,r,b,ForeColor);    //   Yes, blank image.
280        else
281           {
282           size = imagesize(l,t,r,b);           //   Get the image size
283           togBuf = farmalloc(size);
284           imageToggle(l,t,r,b,togBuf);         //   Reverse the existing
285           farfree(togBuf);                     //       image.
286           }
287        oldInfo = InfoNmb;
288        }
289     else
290        oldInfo = NONE;                          //   No field highlighted
291
292     PointON;
293
294     return(OPR);
295
296     }  /*  infoCard()   */
297
298
299
300     /********************************************************************
301
302                  INFOTAB1:   TAB Display
303
304     ********************************************************************/
305
306     int    infoTab1(int old)
307     {
308     void   infoFrame(int);
309     int    blankForm(void);
310     int    l, t, i;
311
312     PointOFF;
313
314     oldInfo = NONE;
315     infoTAB = INFOTAB1;
316     infoFrame(INFOTAB1-INFOTAB1);
317
318     l = xInfoText;     t = yInfoText;
319
320     if(old == CARD)
321         for( i=0 ; i<7 ; i++,t+=(TextSPACE*2) )
322            outtextxy(l,t,dataKenC[i]);          //   Ken's form
323     else
324        blankForm();                             //   Blank form
325
326     PointON;
327
328     return(OPR);
329
330     }  /*  infoTab1()   */
331
332
```

```
333    /******************************************************************
334
335                 INFOTAB2:   TAB Display
336
337    ******************************************************************/
338
339    int    infoTab2(int old)
340    {
341    void   infoFrame(int);
342    int    l, t, i;
343
344    old++;
345    PointOFF;
346
347    infoTAB = INFOTAB2;
348    infoFrame(INFOTAB2-INFOTAB1);
349
350    l = xInfoText;      t = yInfoText;
351
352    for( i=0 ; i<7 ; i++,t+=(TextSPACE*2) )
353       outtextxy(l,t,infoTeam[i]);
354
355    PointON;
356    return(OPR);
357
358    }  /*   infoTab2()   */
359
360
361    /******************************************************************
362
363                 INFOTAB3:   TAB Display
364
365    ******************************************************************/
366
367    int    infoTab3(int old)
368    {
369    void   infoFrame(int);
370    int    l, t, i;
371
372    old++;
373    PointOFF;
374
375    infoTAB = INFOTAB3;
376    infoFrame(INFOTAB3-INFOTAB1);
377
378    l = xInfoText;      t = yInfoText;
379
380    for( i=0 ; i<7 ; i++,t+=(TextSPACE*2) )
381       outtextxy(l,t,infoFmly[i]);
382
383    PointON;
384    return(OPR);
385
386    }  /*   infoTab3()   */
387
388
389    /******************************************************************
390
391                 INFOTAB4:   TAB Display
392
393    ******************************************************************/
394
395    int    infoTab4(int old)
396    {
397    void   infoFrame(int);
398    int    l, t, i;
399
400    old++;
401    PointOFF;
402
```

```
403    infoTAB = INFOTAB4;
404    infoFrame(INFOTAB4-INFOTAB1);
405
406    l = xInfoText;     t = yInfoText;
407
408    for( i=0 ; i<7 ; i++,t+=(TextSPACE*2) )
409        outtextxy(l,t,infoFrnd[i]);
410
411    PointON;
412    return(OPR);
413
414    } /*  infoTab4()  */
415
416
417    /*****************************************************************
418
419                     INFOTAB5:   TAB Display
420
421    *****************************************************************/
422
423    int   infoTab5(int old)
424    {
425    void  infoFrame(int);
426    int   l, t, i;
427
428    old++;
429    PointOFF;
430
431    infoTAB = INFOTAB5;
432    infoFrame(INFOTAB5-INFOTAB1);
433
434    l = xInfoText;      t = yInfoText;
435
436    for( i=0 ; i<7 ; i++,t+=(TextSPACE*2) )
437        outtextxy(l,t,infoVndr[i]);
438
439    PointON;
440    return(OPR);
441
442    } /*  infoTab5()  */
443
444
445
446
447    void  infoFrame(int tabNmb)
448    {
449    void  floodPoly(int,int,int,int,int);
450    int   l, t, r, b;
451
452    l = xInfoFrStr;                 t = yInfoFrStr;
453    r = xInfoFrEnd;                 b = yInfoFrEnd;
454
455    floodPoly(l,t,r,b,BackColor);              // Clear display area
456
457    line(l,t,  infoTabVal[tabNmb][BEG],   t  );
458    line(l,t+1,infoTabVal[tabNmb][BEG]-1,t+1); // Double thickness
459    line(infoTabVal[tabNmb][END],   t,   r,t  );
460    line(infoTabVal[tabNmb][END]+1,t+1,r,t+1);
461    line(l,t,l,b);                             // Left line
462    line(l,b,r,b);                             // Bottom line
463    line(r,t,r,b);                             // Right line
464
465    } /*  infoFrame()  */
466
467
468    /*****************************************************************
469
470              Transfer from LIST to Information Screen
471
472    *****************************************************************/
```

```
473
474     int     xferInfo(int old)
475     {
476     void    floodPoly(int,int,int,int,int);
477     int     trgPosition(int,int);
478     int     i, trgPos;
479     int     l, t, r, b;
480
481
482     if(oldInfo != NONE && old == LIST)
483         {
484         trgPos = trgPosition(infoTRG,oldInfo);        // Remove highlight
485         l = targt04[trgPos][1]-vpVal[vpNmb][0];
486         t = targt04[trgPos][2]-vpVal[vpNmb][1];
487         r = targt04[trgPos][3]-vpVal[vpNmb][0] +1;
488         b = targt04[trgPos][4]-vpVal[vpNmb][1] +1;
489         floodPoly(l,t,r,b,BackColor);
490         cardField[oldInfo-INFOCARD1] = TRUE;
491
492         l += vpVal[vpNmb][0];          r += vpVal[vpNmb][0];
493         t += vpVal[vpNmb][1];          b += vpVal[vpNmb][1];
494         setviewport(l,t,r,b,CLIP_ON);          // Temporary for clipping
495
496         setcolor(ForeColor);
497         if(oldInfo==INFOCARD1 || oldInfo==INFOCARD3)
498             {
499             for( i=0 ; ; i++ )                 // Just the first word.
500                 if((locBuf[i] = *(itemPntr+i)) < 0x30)
501                     break;
502             locBuf[i] = '\0';
503             outtextxy(2,2,locBuf);             // Display first word
504             }
505         else
506             outtextxy(2,2,itemPntr);           // Display entire item.
507
508         vpSET(vpNmb);                          // Restore viewport.
509         oldInfo = NONE;
510         }
511
512     return(OPR);
513
514     } /*  xferInfo()  */
515
516
517     /******************************************************************
518
519             Set up a blank Card Form for Input
520
521     ******************************************************************/
522
523     #define     lOffSet     (vpVal[vpNmb][0]-1)     // Left
524     #define     tOffSet     (vpVal[vpNmb][1]-1)     // Top
525     #define     rOffSet     (vpVal[vpNmb][0]-1)     // Right
526     #define     bOffSet     (vpVal[vpNmb][1]+8)     // Bottom
527
528
529     int     blankForm(void)
530     {
531     int     trgPosition(int,int);
532     int     i, j, k, x, y;
533     int     trgPos;
534
535     y = yInfoText;
536     trgPos = trgPosition(infoTRG, INFOCARD1);
537
538     for( i=0 ; i<7 ; i++,y+=(TextSPACE*2) )
539         {
540         j = 0;
541         x = xInfoText;
542         while(*(dataForm[i]+j)!='\0')      // While not end of line
```

```
543        {
544        /*
545                Label & Text Area
546        */
547        k = 0;
548        while(*(dataForm[i]+j)!='_' && *(dataForm[i]+j)!='\0')
549            locBuf[k++] = *(dataForm[i]+j++);
550        locBuf[k] = '\0';                          // End of string
551        moveto(x,y);
552        outtext(locBuf);                           // Display label/text
553        x = getx();
554        if(*(dataForm[i]+j)=='\0')                 // Check for EOL
555            break;
556        /*
557                Fill-in Area
558        */
559        k = 0;
560        while(*(dataForm[i]+j)=='_')
561            locBuf[k++] = *(dataForm[i]+j++);
562        locBuf[k] = '\0';                          // End of string
563        moveto(x,y);
564        targt04[trgPos][1] = x+lOffSet;            // Target top-left
565        targt04[trgPos][2] = y+tOffSet;
566        outtext(locBuf);                           // Display _____
567        x = getx();
568        targt04[trgPos][3] = x+rOffSet;            // Target low-right
569        targt04[trgPos][4] = y+bOffSet;
570        trgPos++;
571        if(*(dataForm[i]+j)=='\0')                 // Check for EOL
572            break;
573        } /*  while(! EOL)  */
574    }
575
576
577    return(0);
578
579 } /*. blankForm() */
```

```
1   #define VERSION "5.1"  /*** memoScrn.c               11-SEP-91
2
3               This is the MEMO screen section of the
4                   GoScreen Prototyping System.
5
6   ***/
7   #include   "GLBdef.h"
8   #include   "GLBext.h"
9
10  #define    TextSPACE 13
11
12  extern   int    targt05[][TblWIDE];
13  int   xMemoText,   yMemoText;
14  int   xMemoFrStr,  yMemoFrStr;
15  int   xMemoFrEnd,  yMemoFrEnd;
16
17  char  *memoTabLabel[] =
18      {
19          "Conf",
20          "Staff",
21          "Tech",
22          "Vendor"
23      };
24
25  int   memoTabVal[][3] =
26      {
27          { TBD, TBD, MEMOTAB1 },
28          { TBD, TBD, MEMOTAB2 },
29          { TBD, TBD, MEMOTAB3 },
30          { TBD, TBD, MEMOTAB4 },
31      };
```

```
char *memoStaf[] =      //          2         3         4
    { // 01234567890123456789012345678901234567890123456789
        "TO: Entire staff                                  ",
        "--------------------------------------------------",
        " Rumors of a new management change have been highly ",
        " exaggerated. None of the midlevel positions will be",
        " affected. The purchasing department will remain at ",
        " its current efficent best and the data processing  ",
        " will continue to be handled in house.              "
    } ;

char *memoTech[] =      //          2         3         4
    { // 01234567890123456789012345678901234567890123456789
        "TO: Rich Frickis                    Tech Lab      ",
        "--------------------------------------------------",
        " It has come to our attention that the video monitor",
        " in the employee lounge has been set up to view the ",
        " world series during business hours. Top management ",
        " is upset by the possible disruption in production  ",
        " while everyone watches the games.                  "
    } ;

char *memoVndr[] =      //          2         3         4
    { // 01234567890123456789012345678901234567890123456789
        "TO: Jack Reynolds                   (716) 247-4454",
        "--------------------------------------------------",
        " The recent change that your company has made to the",
        " Model x-4 Widget has caused great disruption on our",
        " assembly line. Please return to the former specifi-",
        " cation before shipping the next batch. In future,  ",
        " please don't improve the item without notice.      "
    } ;

/*********************************************************************

Memo Screen Functions

*********************************************************************/ int     memoScrn(int old)
{
void    StdHead(char *);
void    setSimDsp(void);
int     listWind(int,int);
int     mainStat, status, nxt, trgPos;
int     l, t, r, b, i, x, firstFLG;

old++;

/*
            Build the Screen
*/
PointON;
ForeColor = BLACK;
BackColor = WHITE;
setSimDsp();                            // Set up simulated LCD
StdHead("MEMO");

xMemoText  = newGAP + 6;            yMemoText  = yBODY + newGAP +35;
xMemoFrStr = newGAP;                yMemoFrStr = yBODY + newGAP;
xMemoFrEnd = dspWIDE -1 -newGAP;    yMemoFrEnd = dspHIGH-newGAP-1;

/*
            The Tabs, Labels & Targets
*/
l = newGAP;                         t = yBODY + newGAP;
```

```
102     x = 1 + 30;
103     for( i=0 ; i<4 ; i++ )
104         {
105         memoTabVal[i][BEG] = x +10;
106         x = makeTab(memoTabVal[i][BEG],t,memoTabLabel[i]);
107         memoTabVal[i][END] = x;
108         trgPos = trgPosition(memoTRG,memoTabVal[i][TRG]);
109         targt05[trgPos][1] = trgButn.xAbs;
110         targt05[trgPos][2] = trgButn.yAbs;
111         targt05[trgPos][3] = trgButn.xAbs + trgButn.wAbs;
112         targt05[trgPos][4] = trgButn.yAbs + trgButn.hAbs;
113         }
114
115     PointON;
116
117     /******************************************************************
118
119                     The Main Loop
120
121     ******************************************************************/
122     firstFLG = MEMOTAB2;
123     mainStat = ON;
124     while(mainStat)
125         {
126         status = ON;    old = OPR;
127         while(status)
128             {
129             tbl = memoTRG;                  //  Target table for pointer.
130             /*
131                     Control is passed back and forth through the return
132                     indicator: nxt. When control is relinquished (nxt=OPR),
133                     keyboard or pointer input determines the next action.
134             */
135             if(firstFLG)                    //  First time through ?
136                 {
137                 nxt = firstFLG;             //      Yes
138                 firstFLG = OFF;             //        use preset
139                 }
140             else                            //      No
141                 {
142                 waitOPR();                  //  Wait for input (type & key).
143                 nxt = type;                 //  Initial value.
144                 }
145
146             while(nxt != OPR && status)
147                 {
148                 switch(nxt)
149                     {
150                     case CARD :
151                     case SKED :
152                     case INFO :  mainStat = status = OFF;
153                                  break;
154                     case MEMOTAB1 : nxt=memoTab1(old);   status = ON;
155                                     old=MEMOTAB1;                    break;
156
157                     case MEMOTAB2 : nxt=memoTab2(old);   status = ON;
158                                     old=MEMOTAB2;                    break;
159
160                     case MEMOTAB3 : nxt=memoTab3(old);   status = ON;
161                                     old=MEMOTAB3;                    break;
162
163                     case MEMOTAB4 : nxt=memoTab4(old);   status = ON;
164                                     old=MEMOTAB4;                    break;
165
166                     case LIST :  nxt=listWind(CONTACT,SE);
167                                  old=LIST;       status = ON;        break;
168
```

```
169                    case XFER :  nxt=xferMemo(old);   status = ON;   break;
170
171                    case EDIT :  nxt=keybWind(SW);    status = ON;   break;
172
173                    case TOOL :  nxt=toolWind(old);   status = ON;   break;
174
175                    case CLDR :                                      // Calendar
176                                 closTool();
177                                 nxt=clndWind(old);                  break;
178
179                    case QUIT :  mainStat = status = OFF;
180                                 nxt=QUIT;                           break;
181
182                    default   :  nxt=OPR;                            break;
183
184                }   /*  switch(nxt)    */
185
186            }   /*  while(nxt)       */
187
188        .  }   /*  while(status)    */
189
190        }   /*  while(mainStat)   */
191
192  return(nxt);
193  }  /*  memoScrn()  */
194
195
196
197  /*****************************************************************
198
199                   Individual TAB Displays
200
201  *****************************************************************/
202
203  int    memoTab1(int old)
204  {
205  void   memoFrame(int);
206  int    l, t, i;
207
208  PointOFF;
209  old++;
210  memoFrame(MEMOTAB1-MEMOTAB1);
211
212  // l = xMemoText;    t = yMemoText;
213
214
215  PointON;
216
217  return(OPR);
218
219  }  /*  memoTab1()   */
220
221
222  int    memoTab2(int old)
223  {
224  void   memoFrame(int);
225  int    l, t, i;
226
227  old++;
228  PointOFF;
229
230  memoFrame(MEMOTAB2-MEMOTAB1);
231
232  l = xMemoText;    t = yMemoText;
233
234  for( i=0 ; i<7 ; i++,t+=(TextSPACE*2) )
235      outtextxy(l,t,memoStaf[i]);
236
237  PointON;
238  return(OPR);
```

```
239
240      } /* memoTab2() */
241
242
243      int   memoTab3(int old)
244      {
245      void  memoFrame(int);
246      int   l, t, i;
247
248      old++;
249      PointOFF;
250
251      memoFrame(MEMOTAB3-MEMOTAB1);
252
253      l = xMemoText;    t = yMemoText;
254
255      for( i=0 ; i<7 ; i++,t+=(TextSPACE*2) )
256          outtextxy(l,t,memoTech[i]);
257
258      PointON;
259      return(OPR);
260
261      } /* memoTab3() */
262
263
264      int   memoTab4(int old)
265      {
266      void  memoFrame(int);
267      int   l, t, i;
268
269      old++;
270      PointOFF;
271
272      memoFrame(MEMOTAB4-MEMOTAB1);
273
274      l = xMemoText;    t = yMemoText;
275
276      for( i=0 ; i<7 ; i++,t+=(TextSPACE*2) )
277          outtextxy(l,t,memoVndr[i]);
278
279      PointON;
280      return(OPR);
281
282      } /* memoTab4() */
283
284
285
286      void  memoFrame(int tabNmb)
287      {
288      void  floodPoly(int,int,int,int,int);
289      int   l, t, r, b;
290
291      l = xMemoFrStr;              t = yMemoFrStr;
292      r = xMemoFrEnd;              b = yMemoFrEnd;
293
294      vpSET(LCDsSCRN);
295      floodPoly(l,t,r,b,BackColor);             // Clear display area
296
297      line(l,t,   memoTabVal[tabNmb][BEG],   t  );
298      line(l,t+1,memoTabVal[tabNmb][BEG]-1,t+1); // Double thickness
299      line(memoTabVal[tabNmb][END],   t,   r,t  );
300      line(memoTabVal[tabNmb][END]+1,t+1,r,t+1);
301      line(l,t,l,b);                            // Left line
302      line(l,b,r,b);                            // Bottom line
303      line(r,t,r,b);                            // Right line
304
305      } /* memoFrame() */
306
307
308
309
```

```
310    /*********************************************************************
311
312                    Transfer from LIST to Memo Screen
313
314     *********************************************************************/
315
316     int    xferMemo(int old)
317     {
318
319     if(old == LIST)
320         {
321         return(OPR);
322         }
323
324     return(OPR);
325
326     }  /*  xferMemo()  */
  1     #define VERSION "3.8"   /***   cardScrn.c                    30-AUG-91
  2
  3                 This is the interactive Business Card screen handler
  4                 for the GrScreen Prototyping System.
  5
  6     ***/
  7     #include   "GLBdef.h"
  8     #include   "GLBext.h"
  9     #include   "TBLext.h"
 10
 11     /*********************************************************************
 12
 13                    The Scanned-in Business Card Screen
 14
 15     *********************************************************************/
 16     #define    wBcTeSZ    46
 17     #define    hBcTeSZ    17
 18
 19     int    cardScrn(int old)
 20     {
 21     void   msgFonB(int,int,char *,char *);
 22     void   fieldNxt(void), fieldPrv(void);
 23     void   hideElems(void);
 24     void   initSet(void);
 25     void   setSimDsp(void);
 26     int    floodPoly(int,int,int,int,int);
 27     int    scrDsp2(char *,int,int);
 28     int    fieldBox(int);
 29     int    dspDateTime(int,int);
 30     int    trgPosition(int,int);
 31
 32     int    mainStat, status, nxt;
 33     int    rtnVal, boxFlg, crdFlg, i;
 34     int    l, t, r, b;
 35
 36     old++;
 37     /*
 38                 Set Up the Simulated Display
 39     */
 40     setSimDsp();
 41     PointOFF;
 42
 43     ForeColor = BLACK;
 44     BackColor = WHITE;
 45
 46     l = 2;                      t = 9;
 47     r = 477;                    b = 34;
 48     floodPoly(l,t,r,b,BLACK);
 49
 50     l = 33;                     t = 43;
 51     r = 456;                    b = 297;
 52     setcolor(BLACK);
 53     rectangle(l,t,r,b);
 54
```

```
55      /*
56                  Buttons
57      */
58      settextjustify(CENTER_TEXT,CENTER_TEXT);
59      for( i=0 ; i<4 ; i++ )
60         {
61            l = cardBut[i][0];     t = cardBut[i][1];
62            r = l + wCardSZ -1;    b = t + hCardSZ -1;
63            setcolor(ForeColor);
64            buildButn(l,t,wCardSZ,hCardSZ);
65            outtextxy(l+wCardSZ/2,t+hCardSZ/2,cardLabel[i]);
66         }
67
68      ForeColor = WHITE;                          //  Special for dspDateTime
69      BackColor = BLACK;                          //      & upper buttons.
70
71      l = xBCd;              t = yBCd;
72      r = l + wBcTeSZ -1;    b = t + hBcTeSZ -1;
73      setcolor(ForeColor);
74      buildButn(l,t,wBcTeSZ,hBcTeSZ);
75      outtextxy(l+wBcTeSZ/2,t+hBcTeSZ/2,"BCd");
76
77      l = xTel;              t = yTel;
78      r = l + wBcTeSZ -1;    b = t + hBcTeSZ -1;
79      setcolor(ForeColor);
80      buildButn(l,t,wBcTeSZ,hBcTeSZ);
81      outtextxy(l+wBcTeSZ/2,t+hBcTeSZ/2,"Tel");
82
83      dspDateTime(xInd/2,yInd);
84
85      ForeColor = BLACK;
86      BackColor = WHITE;
87
88      vpSET(S1CdSCRN);                            //  Business card Screen
89      clearviewport();                            //  Clear the window
90
91      PointON;
92
93                                                  //  Find target position
94      if((tOff = trgPosition(cardTRG,firstCardTarg))== -1)
95         tOff = tOFFdef;                          //    On error, use default
96
97      fieldPnt = -1;    oldDatPt = NULL;
98      boxFlg = OFF;                               //  Ignore boxes
99      crdFlg = OFF;                               //  No card displayed
100
101
102     /*****************************************************************
103
104                 ***  The Main Loop  ***
105
106     *****************************************************************/
107     mainStat = ON;
108     while(mainStat)
109        {
110        status = ON;    old = CARD;
111        while(status)
112           {
113           tbl = cardTRG;               //  Target table for pointer.
114           waitOPR();                   //  Wait for input (type & key).
115           /*
116                   Control is passed back and forth through the return
117                   indicator: nxt. When control is relinquished (nxt=OPR),
118                   keyboard or pointer input determines the next action.
119           */
120           nxt = type;                  //  Initial value.
121           while(nxt != OPR && status)
122              {
123              switch(nxt)
124                 {
```

```
125         case DONE :   mainStat = status = OFF;
126                       vpSET(LCDsSCRN);
127                       nxt=INFO;                                     break;
128
129         case PREV :   nxt=OPR;            // Previous field
130                       if(!crdFlg)                                   break;
131                       fieldPrv();
132                       nxt=OPR;                                      break;
133
134         case NEXT :   nxt=OPR;            // Next field
135                       if(!crdFlg)                                   break;
136                       fieldNxt();
137                       boxFlg = ON;        // Recognize boxes
138                       nxt=OPR;                                      break;
139
140         case BuCd :                       // Display a business card
141                       vpSET(S1CdSCRN);
142                       rtnVal = scrDsp2(bizCard1,xCRD,yCRD);
143                       if(rtnVal == 4)
144                          {
145                          sprintf(msg1,"Can't open file: %s",bizCard1
146                          outtextxy(xInst,yInst,msg1);
147                          }
148                       else if(rtnVal == 6)
149                          {
150                          sprintf(msg1,"Out of memory in cardScrn.");
151                          outtextxy(xInst,yInst,msg1);
152                          }
153                       fieldPnt = -1;    oldDatPt = NULL;
154                       crdFlg = ON;
155                       vpSET(LCDsSCRN);
156                       ForeColor = BLACK;
157                       BackColor = WHITE;
158                       msgFonB(xFtag,yFtag,NULL,instMsg);
159                       nxt=OPR;                                      break;
160
161         case CNCL :
162                       boxFlg = OFF;       // Ignore boxes
163                       crdFlg = OFF;       // No card displayed
164                       vpSET(LCDsSCRN);
165                       fieldPnt = -1;
166                       ForeColor = BLACK;
167                       BackColor = WHITE;
168                       msgFonB(xFtag,yFtag,oldMesg,NULL);
169                       hideElems();        // Clear text, etc
170                       vpSET(S1CdSCRN);
171                       clearviewport();    // Blank view
172                       initSet();          // Initialize
173                       nxt=OPR;                                      break;
174
175         case SID11:   if(mButn & LEFT)    ocrRate += 2;
176                       else                ocrRate -= 2;
177                       vpSET(LCDsSCRN);
178                       ForeColor = WHITE;
179                       BackColor = BLACK;
180                       msgFonB(xOmsg,yOmsg,ocrMsg,NULL);
181                       sprintf(ocrMsg,"OCR rate: %2d char/sec",ocrRat
182                       msgFonB(xOmsg,yOmsg,NULL,ocrMsg);
183
184                       for( i=0 ; i<BNMB ; i++ )
185                           boxStat[i][DLY] = (strlen(bizCdBox[i]) *100
186                                 // OCR delay in 1 mS increments
187
188                       nxt=OPR;                                      break;
189
190         case QUIT :   mainStat = status = OFF;
191                       nxt=QUIT;                                     break;
192
193         case TOOL :   nxt=toolWind(old);  status = ON;    break;
194
```

```
195              default  :  if( (nxt>=S1xA1) && (nxt<=S1xK3) && boxFlg)
196                              nxt = fieldBox(nxt-vOffSet);
197                         else
198                              nxt = OPR;
199                                                                  break;
200
201         }   /*  switch(nxt)    */
202
203       }   /*  while(nxt)     */
204
205     }   /*  while(status)    */
206
207   }   /*  while(mainStat)   */
208
209   return(nxt);
210   }   /*  cardScrn()  */
211
212
213   /******************************************************************
214
215                  Field Operations for Business Cards
216
217   ******************************************************************/
218
219
220   /******************************************************************
221
222                   ***   The Previous Field   ***
223
224   ******************************************************************/
225   void   fieldPrv(void)
226   {
227   void   msgFonB(int,int,char *,char *);
228   void   showElems(int);
229   void   hideElems(void);
230
231   if((fieldPnt-1) < 0)
232      return;                                    //  No wrap around
233
234   ForeColor = BLACK;
235   BackColor = WHITE;
236
237   vpSET(LCDsSCRN);
238   hideElems();                                  //  Clear last message
239   fieldPnt--;                                   //  Decrement pointer
240
241   vpSET(LCDsSCRN);
242   msgFonB(xFtag,yFtag,oldMesg,bizCrdFl[fieldPnt]);
243   showElems(fieldPnt);                          //  Show current elements
244
245   oldMesg = bizCrdFl[fieldPnt];
246
247   }   /*  fieldPrv()   */
248
249
250   /******************************************************************
251
252                   ***   The Next Field   ***
253
254   ******************************************************************/
255   void   fieldNxt(void)
256   {
257   void   msgFonB(int,int,char *,char *);
258   void   showElems(int);
259   void   hideElems(void);
260
261   if(fieldPnt == -1)
262      oldMesg = instMsg;
263
264   if(bizCrdFl[fieldPnt+1] == NULL)
265      return;                                    //  No wrap around
```

```
266
267     ForeColor = BLACK;
268     BackColor = WHITE;
269
270     vpSET(LCDsSCRN);
271     hideElems();                                    //  Clear last message
272     fieldPnt++;                                     //  Advance   pointer
273
274     vpSET(LCDsSCRN);
275     msgFonB(xFtag,yFtag,oldMesg,bizCrdFl[fieldPnt]);
276     showElems(fieldPnt);                            //  Show current elements
277
278     oldMesg = bizCrdFl[fieldPnt];
279
280     }  /*   fieldNxt()    */
281
282
283     /****************************************************************
284
285                  Set/Clear an Element for Box Selected
286
287     ****************************************************************/
288     int     fieldBox(int target)
289     {
290     void    showElems(int);
291     int     elemtMax, i;
292
293     if(elemtPnt[fieldPnt] == 0)             //  First available slot
294         {
295         elems[fieldPnt][elemtPnt[fieldPnt]] = target;
296         elemtPnt[fieldPnt] += 1;            //  Point to next empty slot
297         }
298     else
299         {
300         elemtMax = elemtPnt[fieldPnt];      //  Set upper limit
301         for( i=0 ; i<elemtMax ; i++ )       //  Search for matching target
302             if(elems[fieldPnt][i] == target)
303                 break;
304         if(i == elemtMax)
305             {                               //  No matching target.
306             elems[fieldPnt][elemtPnt[fieldPnt]] = target;
307             elemtPnt[fieldPnt] += 1;        //  Point to next empty slot
308             }
309         else                                //  Duplicate target found
310             {
311             vpSET(LCDsSCRN);
312             targetToggle(elems[fieldPnt][i],OFF);  //  Turn it off
313             for(     ; i<elemtMax ; i++ )
314                 elems[fieldPnt][i] = elems[fieldPnt][i+1];
315             elemtPnt[fieldPnt] -= 1;        //  Remove the duplicate target
316             }
317         }
318
319     showElems(fieldPnt);                    //  Display all the elements
320
321     return(OPR);
322
323     }  /*   fieldBox()    */
324
325
326     /****************************************************************
327
328             Display the Field Elements & Highlight their Boxes
329
330     ****************************************************************/
331     void    showElems(int field)
332     {
333     int     targetToggle(int,int);
334     void    msgFonB(int,int,char *,char *);
335     int     elemtMax, i;
336
```

```
337     ForeColor = BLACK;
338     BackColor = WHITE;
339
340     if(elemtPnt[field] == 0)
341        {                                        // No elements to display
342        vpSET(LCDsSCRN);                         // Clear any text
343        msgFonB(xFdat,yFdat,oldDatPt,NULL);
344        targetToggle(elems[field][0],OFF);       // Make sure its OFF
345        return;
346        }
347     else
348        elemtMax = elemtPnt[field];              // Set upper limit
349
350     vpSET(LCDsSCRN);
351     msgFonB(xFdat,yFdat,oldDatPt,NULL);
352     moveto(xFdat,yFdat);                        // Text position
353     sprintf(oldDat,"");
354
355     for( i=0 ; i<elemtMax ; i++ )
356        {
357        targetToggle(elems[field][i],ON);        // Reverse video the box
358        msgFonB(-1,-1,NULL,bizCdBox[elems[field][i]]);
359        BLANKSPC;                                // A space at current pointer
360        sprintf(&oldDat[strlen(oldDat)],"%s ",bizCdBox[elems[field][i]]);
361        }
362
363     oldField = field;
364     oldDatPt = oldDat;
365
366     }  /*  showElems()   */
367
368
369     /*****************************************************************
370
371              Remove the Field Elements & their Highlighted Boxes
372
373     *****************************************************************/
374     void   hideElems(void)
375     {
376     int    targetToggle(int,int);
377     void   msgFonB(int,int,char *,char *);
378     int    elemtMax, i;
379
380     if(elemtPnt[oldField] == 0)
381        return;                                  // No elements to remove
382     else
383        elemtMax = elemtPnt[oldField];           // Set upper limit
384
385     vpSET(LCDsSCRN);
386
387     ForeColor = BLACK;
388     BackColor = WHITE;
389     msgFonB(xFdat,yFdat,oldDatPt,NULL);
390                                                 // Clear the text
391     for( i=0 ; i<elemtMax ; i++ )
392        targetToggle(elems[oldField][i],OFF);
393                                                 // Normal  video the box
394     }  /*  hideElems()   */
395
396
397     /*****************************************************************
398
399                    Toggle the Conditon of a Box
400
401     *****************************************************************/
402     int    targetToggle(int t,int way)
403     {
404     void . msgFonB(int,int,char *,char *);
405
406     if(boxStat[t][TOG] != way)       // If current condition is opposite
407        {                             //   of desired condition...toggle.
```

```
408        PointOFF;
409        getimage(TARGT02[t+tOff][1]-xDspOrg,TARGT02[t+tOff][2]-yDspOrg,
410                 TARGT02[t+tOff][3]-xDspOrg,TARGT02[t+tOff][4]-yDspOrg,image
411        putimage(TARGT02[t+tOff][1]-xDspOrg,TARGT02[t+tOff][2]-yDspOrg,image
412        PointON;
413        boxStat[t][TOG] = way;
414        }
415
416    if(boxStat[t][DLY])
417       {
418       msgFonB(xInd,yInd,"Processing...",NULL);   // Indicator ON
419       delay(boxStat[t][DLY]);                    // Simulate OCR time
420       boxStat[t][DLY] = 0;
421       msgFonB(xInd,yInd,NULL,"Processing...");   // Indicator OFF
422       }
423
424    return(0);
425    }  /*  targetToggle()  */
```

SECTION C

```
1      #define VERSION "4.8"   /*** mscScrn.c                     4-SEP-91
2
3              This is a group of miscellaneous screen functions
4                    in the GoScreen Prototyping System.
5
6      ***/
7      #include  "GLBdef.h"
8      #include  "GLBext.h"
9
10
11     /*********************************************************************
12
13                          Standard Header Area
14
15     *********************************************************************/
16     #define    xBase      (dspWIDE-100)
17
18     void  StdHead(char *title)
19     {
20     int    stdButton(int,int,char *);
21     int    ArrowTarg(int,int,int);
22     int    dspDateTime(int,int);
23     int    size, style, x, y;
24     int    l, t, r, b;
25
26     PointOFF;
27     setcolor(ForeColor);
28     /*
29              Lower Frame
30     */
31     l = 0;                            t = yBODY;
32     r = dspWIDE-1;                    b = dspHIGH-1;
33     rectangle(l,t,r,b);
34
35     /*
36              Main Title         Fancy text
37     */
38     x = winGAP*2;
39     y = yBODY/2 -4;
40     dspDateTime(x,y);                          // Date-time
41
42     style = SANS_SERIF_FONT;
43     size  = 0;
44     settextjustify(CENTER_TEXT,CENTER_TEXT);
45     settextstyle(style, HORIZ_DIR, size);
46     setusercharsize(2, 4, 2, 4);
47     moveto(x,y);
48     outtextxy(dspWIDE/2+10,y,title);           // Centered title
```

```
49
50      settextstyle(DEFAULT_FONT, HORIZ_DIR, 0);
51      settextjustify(LEFT_TEXT,TOP_TEXT);       //  Return to default values
52
53      /*
54                      Internal Scrolling Arrows
55      */
56      y += 3;
57      ArrowTarg(xBase   ,y,   LEFT);
58      ArrowTarg(xBase+35,y,   RIGHT);
59      ArrowTarg(xBase+50,y-8,UP);
60      ArrowTarg(xBase+70,y+8,DOWN);
61
62      PointON;
63
64      }  /*  StdHead()  */
65
66
67      /*******************************************************************
68
69                      Button Construction
70
71      *******************************************************************/
72      /***
73                  ***  Standard Button with Label  ***
74      ***/
75      int   stdButton(int x,int y,char *label)
76      {
77      int   buildButn(int,int,int,int);
78
79      setcolor(ForeColor);
80
81      buildButn(x,y,stdBx,stdBy);               //  Draw the button
82
83      settextjustify(CENTER_TEXT,CENTER_TEXT);
84      outtextxy(x+stdBx/2,y+stdBy/2,label);     //  Display the label
85
86      settextjustify(LEFT_TEXT,TOP_TEXT);        //  Restore top-left
87      return(0);
88
89      }  /*  stdButton()  */
90
91      /***
92                  ***  Center a Button with Label  ***
93      ***/
94      int   centerBut(int x,int y,char *label)
95      {
96      int   buildButn(int,int,int,int);
97
98      settextjustify(CENTER_TEXT,CENTER_TEXT);
99      setcolor(ForeColor);
100
101     /*
102                     Fill in the Target Button Structure
103     */
104     trgButn.wAbs = textwidth(label) +12;      //  Calculate width & height
105     trgButn.hAbs = textheight(label) +8;      //    based on label size.
106     trgButn.xRel = x - trgButn.wAbs/2;
107     trgButn.yRel = y - trgButn.hAbs/2;        //  Convert center to origin.
108     trgButn.xAbs = trgButn.xRel + vpVal[vpNmb][0];
109     trgButn.yAbs = trgButn.yRel + vpVal[vpNmb][1];
110
111     buildButn(trgButn.xRel,trgButn.yRel,trgButn.wAbs,trgButn.hAbs);
112                                              //  Draw the button
113     outtextxy(x,y,label);                     //  Display the label
114
115     settextjustify(LEFT_TEXT,TOP_TEXT);        //  Restore top-left
116     return(0);
117
118     }  /*  centerBut()  */
119
```

```
120     /***
121             ***   Build a Button, given place & size   ***
122     ***/
123     int   buildButn(int x,int y,int locBx,int locBy)
124     {
125     int   xBeg, yBeg, xEnd, yEnd;
126
127     xBeg = x;                    yBeg = y;
128     xEnd = x + locBx;            yEnd = y + locBy;
129     rectangle(xBeg,yBeg,xEnd,yEnd);             //   Button outline
130
131     xBeg = x + 1;                yBeg = y + locBy -1;
132     xEnd = x + locBx;            yEnd = yBeg;
133     line(xBeg,yBeg,xEnd,yEnd);                  //   Shadow horizontal
134
135     xBeg = x + 2;                yBeg = y + locBy -2;
136     xEnd = x + locBx;            yEnd = yBeg;
137     line(xBeg,yBeg,xEnd,yEnd);                  //   Shadow horizontal
138
139     xBeg = x + locBx -1;         yBeg = y + 1;
140     xEnd = xBeg;                 yEnd = y + locBy;
141     line(xBeg,yBeg,xEnd,yEnd);                  //   Shadow vertical
142
143     xBeg = x + locBx -2;         yBeg = y + 2;
144     xEnd = xBeg;                 yEnd = y + locBy;
145     line(xBeg,yBeg,xEnd,yEnd);                  //   Shadow vertical
146
147     return(0);
148
149     }  /*  buildButn()  */
150
151
152     /*******************************************************************
153
154                 Set up a Simulated LCD Screen
155
156     *******************************************************************/
157
158     void  setSimDsp(void)
159     {
160     void  floodView(int);
161
162     vpSET(LCDsSCRN);                            //   Simulated LCD Screen
163     setlinestyle(SOLID_LINE,0,NORM_WIDTH);
164     setcolor(BackColor);                        //   Polygon & fill will be
165     floodView(BackColor);                       //      the same color.
166
167     }  /*  setSimDsp()  */
168
169
170     /*******************************************************************
171
172                 Create a Polygon & Fill it with a specified Color
173
174     *******************************************************************/
175     /*
176             Fill the Current Viewport with Specified Color
177     */
178     void  floodView(int color)
179     {
180     void  floodPoly(int,int,int,int,int);
181     int   xMax, yMax;
182     struct viewporttype viewinfo;
183
184     getviewsettings(&viewinfo);
185     xMax = viewinfo.right - viewinfo.left;
186     yMax = viewinfo.bottom - viewinfo.top;
187
188     floodPoly(0,0,xMax,yMax,color);             //   Create & fill a polygon
189
190     }  /*  floodView()  */
```

```
191
192     /*
193                 Create a Polygon given Coordinates & Color
194     */
195     void    floodPoly(int l,int t,int r,int b,int color)
196     {
197     int     oldColor;
198     int     poly[10];
199
200     oldColor = getcolor();                          // Save old color
201     setcolor(color);                                // Set requested color
202
203     poly[0] = poly[6] = poly[8] = l;    poly[1] = poly[3] = poly[9] = t;
204     poly[2] = poly[4] = r;              poly[5] = poly[7] = b;
205
206     PointOFF;
207     setfillstyle(SOLID_FILL,color);
208     fillpoly(5,poly);                               // Fill with color
209     PointON;
210
211     setcolor(oldColor);                             // Restore original color
212
213     }  /*  floodPoly()   */
214
215
216     /******************************************************************
217
218                 Target Arrows
219
220     ******************************************************************/
221
222     int     ArrowTarg(int x,int y,int ori)
223     {
224     int     poly[8][2];
225
226     if(ori == LEFT)
227         {
228         poly[1][xCoOrd] = x +RISE;      poly[1][yCoOrd] = y -RISE;
229         poly[2][xCoOrd] = x +RISE;      poly[2][yCoOrd] = y -RISE +FLANGE;
230         poly[3][xCoOrd] = x +REACH;     poly[3][yCoOrd] = y -RISE +FLANGE;
231         poly[4][xCoOrd] = x +REACH;     poly[4][yCoOrd] = y +RISE -FLANGE;
232         poly[5][xCoOrd] = x +RISE;      poly[5][yCoOrd] = y +RISE -FLANGE;
233         poly[6][xCoOrd] = x +RISE;      poly[6][yCoOrd] = y +RISE;
234         }
235     else if(ori == RIGHT)
236         {
237         poly[1][xCoOrd] = x -RISE;      poly[1][yCoOrd] = y -RISE;
238         poly[2][xCoOrd] = x -RISE;      poly[2][yCoOrd] = y -RISE +FLANGE;
239         poly[3][xCoOrd] = x -REACH;     poly[3][yCoOrd] = y -RISE +FLANGE;
240         poly[4][xCoOrd] = x -REACH;     poly[4][yCoOrd] = y +RISE -FLANGE;
241         poly[5][xCoOrd] = x -RISE;      poly[5][yCoOrd] = y +RISE -FLANGE;
242         poly[6][xCoOrd] = x -RISE;      poly[6][yCoOrd] = y +RISE;
243         }
244     else if(ori == UP)
245         {
246         poly[1][yCoOrd] = y +RISE;      poly[1][xCoOrd] = x -RISE;
247         poly[2][yCoOrd] = y +RISE;      poly[2][xCoOrd] = x -RISE +FLANGE;
248         poly[3][yCoOrd] = y +REACH;     poly[3][xCoOrd] = x -RISE +FLANGE;
249         poly[4][yCoOrd] = y +REACH;     poly[4][xCoOrd] = x +RISE -FLANGE;
250         poly[5][yCoOrd] = y +RISE;      poly[5][xCoOrd] = x +RISE -FLANGE;
251         poly[6][yCoOrd] = y +RISE;      poly[6][xCoOrd] = x +RISE;
252         }
253     else if(ori == DOWN)
254         {
255         poly[1][yCoOrd] = y -RISE;      poly[1][xCoOrd] = x -RISE;
256         poly[2][yCoOrd] = y -RISE;      poly[2][xCoOrd] = x -RISE +FLANGE;
257         poly[3][yCoOrd] = y -REACH;     poly[3][xCoOrd] = x -RISE +FLANGE;
258         poly[4][yCoOrd] = y -REACH;     poly[4][xCoOrd] = x +RISE -FLANGE;
```

```
259        poly[5][yCoOrd] = y -RISE;        poly[5][xCoOrd] = x +RISE -FLANGE;
260        poly[6][yCoOrd] = y -RISE;        poly[6][xCoOrd] = x +RISE;
261        }
262     else
263        return(1);                         //  Orientation unknown
264
265     poly[7][xCoOrd] = x;                  poly[7][yCoOrd] = y;
266     poly[0][xCoOrd] = x;                  poly[0][yCoOrd] = y;
267
268     setcolor(ForeColor);
269     setfillstyle(SOLID_FILL,ForeColor);
270     fillpoly(8,(int far *)poly);                       //  Draw the arrow
271
272     return(0);
273
274     } /*  ArrowTarg()   */
275
276
277     /******************************************************************
278
279                 Generate Tabs & Fill the Target Structure
280
281     ******************************************************************/
282     #define    TabHIGH    15
283     #define    FILLET     4
284     #define    ROUND      2
285
286     int   makeTab(int x,int y,char *label)
287     {
288     int   i, TabWIDE, xCen, yCen;
289
290     trgButn.wAbs = TabWIDE = textwidth(label) +10;
291     trgButn.hAbs = TabHIGH;
292
293     yCen = y;
294     for( i=0 ; i<FILLET ; i++ )              //  Leading fillet
295        putpixel(x++,y--,ForeColor);
296
297     line(x,y,x,y-TabHIGH+FILLET+ROUND);      //  Left vertical
298     xCen = trgButn.xRel = x;
299     y -= (TabHIGH-FILLET-ROUND+1);       x++;
300
301     for( i=0 ; i<ROUND ; i++ )               //  Leading round
302        putpixel(x++,y--,ForeColor);
303
304     trgButn.yRel = y;
305     line(x,y,x+TabWIDE-ROUND*2-1,y);         //  Top line
306     yCen -= (yCen - y)/2;
307     x += TabWIDE-ROUND*2;                y++;
308
309     for( i=0 ; i<ROUND ; i++ )
310        {
311        putpixel(x++,y++,ForeColor);          //  Trailing round
312        putpixel(x   ,y-1,ForeColor);         //     ...shadow.
313        }
314
315     line(x,  y,x,  y+TabHIGH-FILLET-ROUND); //  Right vertical
316     line(x+1,y,x+1,y+TabHIGH-FILLET-ROUND); //     ...shadow.
317     xCen += (x - xCen)/2;
318     y += (TabHIGH-FILLET-ROUND+1);       x++;
319
320     for( i=0 ; i<FILLET ; i++ )
321        {
322        putpixel(x++,y++,ForeColor);          //  Trailing fillet
323        putpixel(x   ,y-1,ForeColor);         //     ...shadow.
324        }
325
326     settextjustify(CENTER_TEXT,CENTER_TEXT);
327     outtextxy(xCen,yCen,label);              //  Display label
328     settextjustify(LEFT_TEXT,TOP_TEXT);
329
```

```
330     /*
331             Fill in the Target Button Structure
332     */
333     trgButn.xAbs = trgButn.xRel + vpVal[vpNmb][0];
334     trgButn.yAbs = trgButn.yRel + vpVal[vpNmb][1];
335
336     return(x);                                  //  Start of next line segment
337
338     }  /*  makeTab()  */
  1     #define VERSION "5.4"  /***  grUtils.c                           24-OCT-91
  2
  3             This is a group of utilities used in the
  4                     GrScreen Prototyping System.
  5
  6     ***/
  7     #include    "GLBdef.h"
  8     #include    "GLBext.h"
  9     #include    "GLBerr.h"
 10
 11     /*****************************************************************
 12
 13                     Set up the Mouse
 14
 15     *****************************************************************/
 16
 17     void    mouseInit(void)
 18     {
 19     int     cursConv(char *[][],int *);
 20     void    msgFonB(int,int,char *,char *);
 21     void    newCurs(int,int,int);
 22     int     x, y, savColor;
 23
 24     /*
 25             Message While Mouse is Initializing
 26     */
 27     sprintf(msg1,"The Pointer is Initializing...");
 28     x = vpVal[LCDsSCRN][0]
 29         + (vpVal[LCDsSCRN][2]-vpVal[LCDsSCRN][0]-textwidth(msg1))/2;
 30     y = vpVal[LCDsSCRN][1]                      //  Center
 31         + (vpVal[LCDsSCRN][3]-vpVal[LCDsSCRN][1]-textheight(msg1))/2;
 32
 33     savColor = ForeColor;                       //  Save foreground color
 34     ForeColor = WHITE;
 35     msgFonB(x,y,NULL,msg1);                     //  Write message
 36     ForeColor = savColor;                       //  Restore foreground color
 37
 38     /*
 39             Mouse Function Calls
 40     */
 41     m1 = 0;                                     //  Initialize mouse
 42     mouse(&m1, &m2, &m3, &m4);
 43
 44     m1 = 4;                                     //  Function call 4
 45     m3 = getmaxx()/2;                           //  Set mouse position at
 46     m4 = getmaxy()/2;                           //  Center of the screen.
 47     mouse(&m1, &m2, &m3, &m4);
 48
 49     m1 = 7;                                     //  Function call 7
 50     m3 = winGAP;                                //  Minimum horizontal value
 51     m4 = getmaxx()-winGAP;                      //  Maximum horizontal value
 52     mouse(&m1, &m2, &m3, &m4);
 53
 54     m1 = 8;                                     //  Function call 8
 55     m3 = winGAP;                                //  Minimum vertical value
 56     m4 = getmaxy()-winGAP;                      //  Maximum vertical value
 57     mouse(&m1, &m2, &m3, &m4);
 58
 59     /*
 60             Build a Mouse Pointer
 61     */
```

```
62    cursConv(curArrowText,curArrowBin);
63    cursConv(curPaintText,curPaintBin);
64    cursConv(curCrossText,curCrossBin);
65    newCurs(curCrossHot[0],curCrossHot[1],(int)curCrossBin);
66
67    pointFLG = -1;
68
69    /*
70              Remove Initialization Message
71    */
72    savColor  = BackColor;              //  Save background color
73    BackColor = BaseBACK;
74    msgFonB(x,y,msg1,NULL);             //  Remove message
75    BackColor = savColor;               //  Restore background color
76
77    }   /* mouseInit() */
78
79
80    void  newCurs(int hcHot,int vcHot,int maskPntr)
81    {
82
83    inregs.x.ax = 9;                    //  Function call 9
84    inregs.x.bx = hcHot;                //  Horizontal Cursor Hot spot
85    inregs.x.cx = vcHot;                //  Vertical Cursor Hot spot
86    inregs.x.dx = maskPntr;             //  Screen & Cursor Mask pointer
87    segread(&segregs);
88    segregs.es = segregs.ds;
89    int86x(MOUSE,&inregs,&outregs,&segregs);
90
91    }   /* newCurs() */
92
93
94    /*******************************************************************
95
96              Text Handling
97
98    *******************************************************************/
99    /*
100             Write Foreground Color on Background Color
101   */
102   void  msgFonB(int xPos,int yPos,char *oldStr,char *newStr)
103   {
104   int    oldColor;
105   BYTE   posFlg;
106
107   if( (xPos<0) || (yPos<0) )
108       posFlg = FALSE;                  //  Print at current position
109   else
110       posFlg = TRUE;                   //  Print at xPos, yPos
111
112   oldColor = getcolor();               //  Save old drawing color
113   setcolor(BackColor);
114   PointOFF;                            //  Hide mouse cursor
115   if(oldStr != NULL)
116      if(posFlg)
117         outtextxy(xPos,yPos,oldStr);   //  Erase last message
118      else
119         outtext(oldStr);
120   setcolor(ForeColor);
121   if(newStr != NULL)
122      if(posFlg)
123         outtextxy(xPos,yPos,newStr);   //  Write new message
124      else
125         outtext(newStr);
126
127   PointON;                             //  Show mouse cursor
128   setcolor(oldColor);                  //  Restore original color
129
130   }   /* msgFonB() */
131
132
133
```

```
134     /*****************************************************************
135
136                                 Diagnostics
137
138     *****************************************************************/
139     /***
140             Display the Co-ordinates of the Last Pointer Hit
141     ***/
142     void    sayCords(void)
143     {
144     void    msgFonB(int,int,char *,char *);
145     int     oldFore, oldBack, oldView;
146
147     oldFore = ForeColor;
148     oldBack = BackColor;                        //  Save current values
149     oldView = vpNmb;
150     ForeColor = InfoXCHG;
151     BackColor = InfoBACK;                       //  Set new colors
152
153     vpSET(MAINSCRN);
154     settextjustify(LEFT_TEXT,TOP_TEXT);
155     msgFonB(xHits,yHits,xySay,NULL);            //  Erase old message
156     sprintf(xySay,"%4d:%-4d",xcor,ycor);
157     msgFonB(xHits,yHits,NULL,xySay);            //  Write new message
158
159     ForeColor = oldFore;
160     BackColor = oldBack;                        //  Restore old values
161     vpSET(oldView);
162
163     }  /*   sayCords()   */
164
165
166     /***
167             Display the Number of the Last Target Hit
168     ***/
169     void    sayTarg(void)
170     {
171     void    msgFonB(int,int,char *,char *);
172     int     oldFore, oldBack, oldView;
173
174     oldFore = ForeColor;
175     oldBack = BackColor;                        //  Save current values
176     oldView = vpNmb;
177     ForeColor = InfoXCHG;
178     BackColor = InfoBACK;                       //  Set new colors
179
180     vpSET(MAINSCRN);
181     settextjustify(LEFT_TEXT,TOP_TEXT);
182     msgFonB(xTarg,yTarg,tgSay,NULL);            //  Erase old message
183     sprintf(tgSay,"%4d",type);
184     msgFonB(xTarg,yTarg,NULL,tgSay);            //  Write new message
185
186     ForeColor = oldFore;
187     BackColor = oldBack;                        //  Restore old values
188     vpSET(oldView);
189
190     }  /*   sayTarg()   */
191
192
193
194     /***
195             Display Information/Diagnostic Messages
196     ***/
197     void    sayMssg(void)
198     {
199     void    msgFonB(int,int,char *,char *);
200     int     oldFore, oldBack, oldView;
201
202     oldFore = ForeColor;
203     oldBack = BackColor;                        //  Save current values
204     oldView = vpNmb;
```

```
205     ForeColor = InfoXCHG;
206     BackColor = InfoBACK;                          //  Set new colors
207
208     vpSET(MAINSCRN);
209     settextjustify(LEFT_TEXT,TOP_TEXT);
210
211     msgFonB(xMssg1,yMssg1,Omsg1,NULL);             //  Erase old message
212     msgFonB(xMssg1,yMssg1,NULL,Mssg1);             //  Write new message
213     Omsg1 = Mssg1;                                 //  Update old pointer
214
215     msgFonB(xMssg2,yMssg2,Omsg2,NULL);             //  Erase old message
216     msgFonB(xMssg2,yMssg2,NULL,Mssg2);             //  Write new message
217     Omsg2 = Mssg2;                                 //  Update old pointer
218
219     ForeColor = oldFore;
220     BackColor = oldBack;                           //  Restore old values
221     vpSET(oldView);
222
223     }  /*  sayMssg()   */
224
225
226     /***
227                Remove Previously Displayed Target Number & Messages
228     ***/
229     void   clrTarg(void)
230     {
231     void   msgFonB(int,int,char *,char *);
232     int    oldFore, oldBack, oldView;
233
234     oldFore = ForeColor;
235     oldBack = BackColor;                           //  Save current values
236     oldView = vpNmb;
237     ForeColor = InfoXCHG;
238     BackColor = InfoBACK;                          //  Set new colors
239
240     vpSET(MAINSCRN);
241     settextjustify(LEFT_TEXT,TOP_TEXT);
242     msgFonB(xTarg,yTarg,tgSay,NULL);               //  Erase old target
243
244     if(Mssg1 != NULL)
245         msgFonB(xMssg1,yMssg1,Mssg1,NULL);         //  Erase old message 1
246     if(Mssg2 != NULL)
247         msgFonB(xMssg2,yMssg2,Mssg2,NULL);         //  Erase old message 2
248
249     ForeColor = oldFore;
250     BackColor = oldBack;                           //  Restore old values
251     vpSET(oldView);
252
253     }  /*  clrTarg()   */
254
255
256     /***
257                Display the Number of Errors
258     ***/
259     void   sayEror(void)
260     {
261     void   msgFonB(int,int,char *,char *);
262     int    oldFore, oldBack, oldView;
263
264     oldFore = ForeColor;
265     oldBack = BackColor;                           //  Save current values
266     oldView = vpNmb;
267     ForeColor = InfoXCHG;
268     BackColor = InfoBACK;                          //  Set new colors
269
270     vpSET(MAINSCRN);
271     settextjustify(LEFT_TEXT,TOP_TEXT);
272     msgFonB(xEror,yEror,erSay,NULL);               //  Erase old message
273     sprintf(erSay,"%3d",errCount);
274     msgFonB(xEror,yEror,NULL,erSay);               //  Write new message
275
```

```
276     ForeColor = oldFore;
277     BackColor = oldBack;                         //  Restore old values
278     vpSET(oldView);
279
280     }  /*  sayEror()  */
281
282
283     /***
284             Display the Latest Error Number
285     ***/
286     void   sayEnmb(int errNumb)
287     {
288     void   msgFonB(int,int,char *,char *);
289     int    oldFore, oldBack, oldView;
290
291     oldFore = ForeColor;
292     oldBack = BackColor;                          //  Save current values
293     oldView = vpNmb;
294     ForeColor = InfoXCHG;
295     BackColor = InfoBACK;                         //  Set new colors
296
297     vpSET(MAINSCRN);
298     settextjustify(LEFT_TEXT,TOP_TEXT);
299     msgFonB(xEnmb,yEnmb,nmSay,NULL);              //  Erase old message
300     sprintf(nmSay,"%3d",errNumb);
301     msgFonB(xEnmb,yEnmb,NULL,nmSay);              //  Write new message
302
303     ForeColor = oldFore;
304     BackColor = oldBack;                          //  Restore old values
305     vpSET(oldView);
306
307     }  /*  sayEnmb()  */
308
309
310     /****************************          ....  .****.......*************
311
312             Calculate the Day Offset for a given Month
313
314     ****************************************************************/
315     /*
316         An offset of 0 means that the first of the month falls on a
317         Sunday, a 1 means Monday, and an offset of 6 means Saturday.
318     */
319
320     int    getMonOff(int mth)
321     {
322     int    i, total;
323
324     for( i=total=0 ; i<mth-1 ; i++ )
325        total += dayMax[i];
326
327     return((total+Jan91off)%7);
328
329     }  /*  getMonOff()  */
330
331
332
333     /*****************************************************************
334
335             Convert Cursor Strings to Cursor Binary
336
337     *****************************************************************/
338
339     int    cursConv(char *inText[CurSIZE][2],int *outBin)
340     {
341     int    i, j;
342     char   *sPntr, *cPntr;
343     int    s=0 , c=1 ;
344     unsigned  sBin, cBin, mask;
345
346     for( i=0 ; i<CurSIZE ; i++ )       //  For each character string
```

```
347        {
348           sPntr = inText[i][s];              // Initialize pointers
349           cPntr = inText[i][c];
350           cBin = sBin = 0;
351           mask = 0x8000;
352           for( j=0 ; j<CurSIZE ; j++ )       // For each character in string
353              {
354              if(*(sPntr+j)=='1')             // If character is ONE...
355                 sBin |= mask;                //    ...set bit.
356              if(*(cPntr+j)=='1')             // If character is ONE...
357                 cBin |= mask;                //    ...set bit.
358              mask >>= 1;                     // Shift mask.
359              }
360           *(outBin+i)         = sBin;
361           *(outBin+i+CurSIZE) = cBin;        // Store binary
362           }
363
364        return(0);
365
366     } /*  cursConv()  */
367
368
369
370     /********************************************************************
371
372                  Generate the Window-Close Target
373
374     ********************************************************************/
375
376     int  winClose(int xCorner,int yCorner)
377     {
378
379     if(ForeColor==WHITE)
380        putimage(xCorner-CloseSZ,yCorner+1,closeIcon,COPY_PUT);
381     else
382        putimage(xCorner-CloseSZ,yCorner+1,closeIcon,NOT_PUT);
383
384     /*
385              Fill in the Target Button Structure
386     */
387     trgButn.wAbs = CloseSZ;
388     trgButn.hAbs = CloseSZ;
389     trgButn.xRel = xCorner-CloseSZ;
390     trgButn.yRel = yCorner+1;
391     trgButn.xAbs = trgButn.xRel + vpVal[vpNmb][0];
392     trgButn.yAbs = trgButn.yRel + vpVal[vpNmb][1];
393
394     return(0);
395     } /*  winClose()  */
396
397
398     /********************************************************************
399
400                  Manipulate the Process & Error Stacks
401
402     ********************************************************************/
403     /*
404              The index always points to the next available slot.
405     */
406
407     int  pushPrcs(int value)                // Push the process stack
408     {
409     int  pushStack(int,unsigned *,int *,int);
410     int  rtnVal;
411
412     rtnVal = pushStack(value,process,&prcs    ,prcsSZ);
413
414     return(rtnVal);
415
416     } /*  pushPrcs()  */
417
```

```
418
419     int    popPrcs(int LdFlg)              //  Pop the process stack
420     {
421     int    popStack(unsigned *,int *,int,int);
422     int    rtnVal;
423
424     rtnVal = popStack(process,&prcsIndex,prcsSZ,LdFlg);
425
426     return(rtnVal);
427
428     }  /*  popPrcs()   */
429
430
431
432     int    pushErrs(int value)              //  Push the errors stack
433     {
434     int    pushStack(int,unsigned *,int *,int);
435     int    rtnVal;
436
437     rtnVal = pushStack(value,errors,&errsIndex,errsSZ);
438
439     return(rtnVal);
440
441     }  /*  pushErrs()   */
442
443
444     int    popErrs(int LdFlg)               //  Pop the errors stack
445     {
446     int    popStack(unsigned *,int *,int,int);
447     int    rtnVal;
448
449     rtnVal = popStack(errors,&errsIndex,errsSZ,LdFlg);
450
451     return(rtnVal);
452
453     }  /*  popErrs()   */
454
455
456
457     int    pushStack(int value,unsigned *lstack,int *ndxPntr,int size)
458     {
459
460     *(lstack + *ndxPntr) = value;        //  Push new value
461     if(++*ndxPntr>=size)
462        *ndxPntr = 0;                     //  Adjust index
463
464     return(*ndxPntr);
465
466     }  /*  pushStack()   */
467
468
469     int    popStack(unsigned *lstack,int *ndxPntr,int size,int LdFlg)
470     {
471     int    index;
472
473     index = *ndxPntr;                    //  Set up local pointer
474     if(--index < 0)
475        index = size -1;                  //  Adjust index
476
477     if(LdFlg == TRUE)
478        *ndxPntr = index;                 //  Change the real index
479
480     return(*(lstack + index));           //  Return the popped value
481
482     }  /*  popStack()   */
483
484
485
486     /*******************************************************************
487
488                    Error Listing
```

```
        **********************************************************/ int     errList(int ecode)
{
int     pushErrs(int);
void    sayEnmb(int);
void    sayEror(void);

errCount++;
sayEror();                                  //  Display error count
sayEnmb(ecode);                             //  Display error number pushErrs(ecode);

return(NONE);

}  /*  errList()  */

/***************************************************************

***  TICK Interrupt Vector  ***

***************************************************************/ void    interrupt  newTICK(void)
{ tickCntr++;                                 //  Increment the tick counter oldTICK();                                  //  Call the old handler }  /*  newTICK()  */

/***************************************************************

Clock Handler

***************************************************************/ int     clockHndlr(void)
{
void    newDateTime(void);
void    newMin(void);
int     toggleColn(BYTE);
int     genCntr;
static  BYTE  colonFLG;

colnCntr += (tickCntr-tickLast);    //  Advance counter
if(colonFLG == ON)          genCntr = colonON;
else                        genCntr = colonOFF;
if(colnCntr >= genCntr)
   {
     colnCntr -= genCntr;                   //  Reset (don't loose any ticks)
     if(colonFLG == ON)
        {
          colonFLG = OFF;
          toggleColn(OFF);
        }
     else
        {
          colonFLG = ON;
          toggleColn(ON);
        }
   } if(tickCntr >= TICKSEC)
    {
```

```
                  tickCntr -= TICKSEC;                  //  Reset (don't loose any ticks)
                  if(++second == 60)
                     {
                     second = 0;                        //  Reset
                     if(++minute == 60)
                        newDateTime();                  //  Change everything
                     else
                        newMin();                       //  Change only the minute
                     }  /*  if(second)  */
                  }  /*  if(tick)     */ tickLast = tickCntr;

return(0);

}  /*  clockHndlr()  */

/*****************************************************************

Read & Store Time & Date

*****************************************************************/ void   readTime(void)
        {
        int    i, dspHour;
        char   ap;

getdate(&today);                                //  Get today's date
        month = calMon  = today.da_mon;
        year  = calYear = today.da_year;
        day   = calDay  = today.da_day;
        i2Ch( day,&dateTime[dayIndx],SPC);
        for( i=0 ; i<3 ; i++ )
           dateTime[monIndx+i] = *(monAbr[month-1]+i);
        i2Ch(year-1900,&dateTime[yearIndx],ZERO);
        MonOff= getMonOff(month);

gettime(&thisTime);                             //  Get the current time
        hour  = thisTime.ti_hour;
        minute= thisTime.ti_min;
        second= thisTime.ti_sec;
        i2Ch(minute,&dateTime[minIndx],ZERO);

if(hour >= 12)                                  //  Morning or Afternoon
           {
           ap = 'P';                                    //  Afternoon
           if(hour != 12)   dspHour = hour -12;
           else             dspHour = hour;
           }
        else
           {                                            //  Morning
           ap = 'A';
           if(hour == 0)    dspHour = 12;               //  First hour after midnight
           else             dspHour = hour;
           } dateTime[anpIndx] = ap;
        i2Ch(dspHour,&dateTime[hourIndx],SPC);

}  /*  readTime()  */

/*****************************************************************

Display Time & Date

*****************************************************************/
```

```
631   int   dspDateTime(int x, int y)
632   {
633   int   oldColor;
634
635       oldColor = getcolor();                      // Save old color
636       setcolor(ForeColor);                        // Set new color
637
638       /*
639              Save Date-Time Locations & Variables
640       */
641       clkBackC = BackColor;                       // Colors
642       clkForeC = ForeColor;
643       clkViewP = vpNmb;                           // Viewport
644       clkTimeX = x;                               // X- for dateTime[]
645       clkTimeY = y;                               // Y- for all values
646
647       /*
648              Display Time, element by element
649       */
650       settextjustify(LEFT_TEXT,TOP_TEXT);
651       settextstyle(DEFAULT_FONT, HORIZ_DIR, 0);
652       PointOFF;
653       moveto(x,y);
654       outtext(dateTime);                          // Day
655       moverel(timeGAP,0);
656       outtext(&dateTime[monIndx]);                // Month
657       moverel(timeGAP,0);
658       outtext(&dateTime[yearIndx]);               // Year
659       moverel(timeGAP,0);
660       outtext(&dateTime[hourIndx]);               // Hour
661       clkColnX = getx();
662       outtext(&dateTime[colnIndx]);               // Colon
663       moverel(colnGAP,0);
664       clkMinsX = getx();
665       outtext(&dateTime[ minIndx]);               // Minute
666       moverel(timeGAP,0);
667       outtext(&dateTime[ anpIndx]);               // AM or PM
668       clkEndX = getx() +1;
669       PointON;
670
671       setcolor(oldColor);                         // Restore original color
672
673       return(0);
674
675   }  /* dspDateTime() */
676
677   /*****************************************************************
678
679              Overwrite the entire Date-Time
680
681   *****************************************************************/
682   void  newDateTime(void)
683   {
684   void  msgFonB(int,int,char *,char *);
685   void  readTime(void);
686   int   vpOld, oldBack, oldFore, oldColor;
687
688       if(clkInvisible)                            // Don't show clock
689           return;
690
691       oldFore = ForeColor;
692       oldBack = BackColor;                        // Save old colors
693       oldColor= getcolor();
694       ForeColor = clkForeC;
695       BackColor = clkBackC;                       // Set new colors.
696       setcolor(ForeColor);
697
698       vpOld = vpNmb;
699       vpSET(clkViewP);                            // Set clock viewport
700
701       PointOFF;
```

```
702     floodRect(clkTimeX,clkTimeY,           //  Clear old date-time
703             clkEndX,clkTimeY+8,BackColor);
704     readTime();                            //  Re-read time
705
706     /*
707             Display Time, element by element
708     */
709     settextjustify(LEFT_TEXT,TOP_TEXT);
710     settextstyle(DEFAULT_FONT, HORIZ_DIR, 0);
711     moveto(clkTimeX,clkTimeY);
712     outtext(dateTime);                     //  Day
713     moverel(timeGAP,0);
714     outtext(&dateTime[monIndx]);           //  Month
715     moverel(timeGAP,0);
716     outtext(&dateTime[yearIndx]);          //  Year
717     moverel(timeGAP,0);
718     outtext(&dateTime[hourIndx]);          //  Hour
719     moverel(colnGAP,0);
720     outtext(&dateTime[colnIndx]);          //  Colon
721     moverel(colnGAP,0);
722     outtext(&dateTime[ minIndx]);          //  Minute
723     moverel(timeGAP,0);
724     outtext(&dateTime[ anpIndx]);          //  AM or PM
725     PointON;
726
727     vpNmb = vpOld;
728     vpSET(vpNmb);                          //  Restore old viewport
729
730     ForeColor = oldFore;
731     BackColor = oldBack;                   //  Restore old colors.
732     setcolor(oldColor);
733
734     }  /*  newDateTime()  */
735
736
737 /*******************************************************************
738
739             Toggle a Colon at an Absolute Position
740
741 *******************************************************************/
742     int     toggleColn(BYTE cFlag)
743     {
744     void    msgFonB(int,int,char *,char *);
745     int     vpOld, colorOld;
746
747     if(clkInvisible)                       //  Don't show clock
748         return(clkInvisible);
749
750     vpOld = vpNmb;
751     vpSET(clkViewP);                       //  Set clock viewport
752     colorOld = getcolor();
753
754     if(cFlag == ON)
755         setcolor(clkForeC);                //  Insert colon
756     else
757         setcolor(clkBackC);                //  Remove colon
758
759     PointOFF;
760     outtextxy(clkColnX,clkTimeY,":");
761     PointON;
762
763     vpNmb = vpOld;
764     vpSET(vpNmb);                          //  Restore old viewport
765     setcolor(colorOld);                    //     & color.
766
767     return(0);
768     }  /*  toggleColn()  */
769
```

```
770    /***************************************************************
771
772                    Display the New Minute
773
774    ***************************************************************/
775    void   newMin(void)
776    {
777    void   msgFonB(int,int,char *,char *);
778    int    vpOld, oldFore, oldBack, oldColor;
779
780    if(clkInvisible)                          //  Don't show clock
781       return;
782
783    oldFore = ForeColor;
784    oldBack = BackColor;                      //  Save old colors
785    oldColor= getcolor();
786    ForeColor = clkForeC;
787    BackColor = clkBackC;                     //  Set new colors.
788    setcolor(ForeColor);
789
790    vpOld = vpNmb;
791    vpSET(clkViewP);                          //  Set clock viewport
792
793    floodRect(clkMinsX,clkTimeY,clkEndX,
794              clkTimeY+8,BackColor);          //  Clear old minute
795    PointOFF;
796    i2Ch(minute,&dateTime[minIndx],ZERO);
797    moveto(clkMinsX,clkTimeY);
798    outtext(&dateTime[ minIndx]);             //  Minute
799    moverel(timeGAP,0);
800    outtext(&dateTime[ anpIndx]);             //  AM or PM
801    PointON;
802
803    vpNmb = vpOld;
804    vpSET(vpNmb);                             //  Restore old viewport
805
806    ForeColor = oldFore;
807    BackColor = oldBack;                      //  Restore old colors.
808    setcolor(oldColor);
809
810    }  /*   newMin()   */
811
812
813    /***************************************************************
814
815             Convert an Integer into 2 ASCII Characters
816
817    ***************************************************************/
818
819    int    i2Ch(int valu,char *ascPntr,int zSup)
820    {
821    int    tens;
822
823    if(valu > 99)
824       return(-1);                            //  Value more than 2 digits
825
826    *(ascPntr +1) = (valu % 10) + '0';  //  Units
827
828    tens =  (valu / 10) + '0';          //  Tens
829    if(tens == '0')
830       if(zSup == SPC)                        //  Optional change of 0 to space.
831          tens = SPC;
832
833    *ascPntr = tens;
834
835    return(0);
836
837    }  /*  i2Ch()   */
```

SECTION D

```
1   #define VERSION "2.6"   /*** toolWind.c                          10-SEP-91
2
3         /*      This is the Tool Selection Window handler
4                 for the GrScreen Prototyping System.
5
6   ***/
7   #include   "GLBdef.h"
8   #include   "GLBext.h"
9
10  #define    TOOLMAX    3              // Maximum number of tools
11  void  far  *tolBuf;                  // Pointer to image under window
12  int        toolNmb, oldTool;         // Toolnumber
13  BYTE       toolFLG;
14  int        toolBack, toolFore;       // Save current colors
15
16  extern     int    targt07[][TblWIDE];
17
18  /*******************************************************************
19
20                  The Tools Window
21
22  *******************************************************************/
23
24  int    toolWind(int old)
25  {
26  int    initTool(void);
27  int    closTool(void);
28  int    toolItem(int);
29  int    mainStat, status, nxt;
30
31  initTool();                          // Initialize the tool window
32
33  /*
34              The Main Loop
35  */
36  mainStat = ON;
37  while(mainStat)
38      {
39      status = ON;
40      while(status)
41          {
42          tbl = toolTRG;               //. Target table for pointer.
43          waitOPR();                   // Wait for input (type & key).
44          /*
45                  Control is passed back and forth through the return
46                  indicator: nxt. When control is relinquished (nxt=OPR),
47                  keyboard or pointer input determines the next action.
48          */
49          nxt = type;                  // Initial value.
50          while(nxt != OPR && status)
51              {
52              switch(nxt)
53                  {
54                  case TOOLFIELD : nxt=toolItem(ycor);
55                                                              break;
56
57                  case CALC :                          // Calculator
58                          closTool();
59                          nxt=calcWind(old);
60                          mainStat = status = OFF;
61                                                              break;
62
63                  case DIAL :                          // Dialer
64                          closTool();
65                          nxt=dialWind(old);
66                          mainStat = status = OFF;
67                                                              break;
68
```

```
            case COMM  :                               //  Communicator
                        closTool();
                        nxt=commWind(old);
                        mainStat = status = OFF;
                                                                        break;

case TOLC  :                               //  Close window
                        mainStat = status = OFF;
                        nxt=OPR;                                        break;

case QUIT  : mainStat = status = OFF;
                         nxt=QUIT;                                      break;

default    :  nxt=OPR;                                      break;

}  /*  switch(nxt)   */

}  /*  while(nxt)     */

}  /*  while(status)   */

}  /*  while(mainStat)  */ closTool();                              // Close window if necessary return(nxt);

}  /*  toolWind()  */

/*****************************************************************

Tool Item Targets

*****************************************************************/
/*
        A tool will be run if a highlighted item is hit. The usual
        procedure is to move the highligh by clicking on an item,
        and hitting the highlighted to run the tool.
*/ int   toolItem(int yVector)
{
unsigned  size;
int   l, r, t, b, nxt, offSet;

t = TlinesY + ToolVPyl;
b = t + 11;

/*
        Find out if a line has been hit
*/
for( toolNmb=0 ; toolNmb<3 ; toolNmb++ )
    {
    offSet = ToolSpc * toolNmb;
    if(yVector >= (t+offSet) && yVector <= (b+offSet))
        break;
    }
if(toolNmb == 3)
    return(OPR);                         //  Line not hit /*
        Has the highlighted line been hit
*/
if(oldTool != toolNmb)
    {
    vpSET(TOOLWIND);                     //  Set viewport
    PointOFF;
    l = winGAP+2;            t = ToolOff+(ToolSpc*oldTool)-2;
    r = TOOLWIDE - winGAP-2; b = ToolOff+(ToolSpc*oldTool)+9;
```

```
140         size = imagesize(l,t,r,b);              // Get the image size
141         togSav = farmalloc(size);
142         imageToggle(l,t,r,b,togSav);            // Remove old highlight
143
144         l = winGAP+2;            t = ToolOff+(ToolSpc*toolNmb)-2;
145         r = TOOLWIDE - winGAP-2;  b = ToolOff+(ToolSpc*toolNmb)+9;
146         imageToggle(l,t,r,b,togSav);            // Highlight new item
147         farfree(togSav);
148
149         oldTool = toolNmb;
150         PointON;
151         return(OPR);                            // Wait for next hit
152         }
153     else
154         return(toolNmb+TOOL0);                  // Return with selected tool
155
156     } /*  toolItem()  */
157
158
159
160
161     /*******************************************************************
162
163                 Initialize the Tools Window
164
165     *******************************************************************/
166
167     int    initTool(void)
168     {
169     void   msgFonB(int,int,char *,char *);
170     int    savePart(int,int,int,int,void far **,int);
171     int    trgPosition(int,int);
172     int    winClose(int,int);
173     int    l, r, t, b, rtnVal, trgPos, i;
174     unsigned  size;
175
176     vpSET(TOOLWIND);                            // Set viewport
177     toolFore = ForeColor;
178     toolBack = BackColor;                       // Save the old
179     ForeColor = WHITE;                          // Set the new
180     BackColor = BLACK;
181
182     l = 0;         t = 0;
183     r = TOOLWIDE;  b = TOOLHIGH;
184     rtnVal = savePart(l,t,r,b,&tolBuf,BackColor);
185                                                 // Save what's under viewport.
186     if(rtnVal)
187         return(rtnVal);                         // No memory available, return.
188
189     setcolor(ForeColor);                        // Outline the Window
190     rectangle(l+=winGAP,t+=winGAP,r-=winGAP,b-=winGAP);
191     l += 13;       t += winGAP+1;
192     r = l + 48;    b = t + 17;
193     rectangle(l,t,r,b);                         // Outer title box
194     l += 2;        t += 2;
195     r -= 2;        b -= 2;
196     rectangle(l,t,r,b);                         Inr   title box
197     l += 3;        t += 4;
198     outtextxy(l,t,"TOOLS");
199
200     /*
201             Set up the Tool List
202     */
203     trgPos = trgPosition(toolTRG,TOOLFIELD);// Find target position
204     l = winGAP+8;
205     targt07[trgPos][1] = vpVal[vpNmb][0] + l -6;
206     targt07[trgPos][2] = vpVal[vpNmb][1] + ToolOff -2;
207     targt07[trgPos][3] = vpVal[vpNmb][0] + l -6 + TOOLWIDE;
208     targt07[trgPos][4] = vpVal[vpNmb][1] + ToolOff+(ToolSpc*(TOOLMAX-1))+9;
209
210     for( i=0 ; i<TOOLMAX ; i++ )                // The tool list
211         msgFonB(l,ToolOff+(ToolSpc*i),NULL,toolType[i]);
```

```
212
213     toolNmb = oldTool = 0;                          //  Set default to calculator
214
215     l = winGAP+2;                    t = ToolOff+(ToolSpc*toolNmb)-2;
216     r = TOOLWIDE - winGAP-2;         b = ToolOff+(ToolSpc*toolNmb)+9;
217     size = imagesize(l,t,r,b);                      //  Get the image size
218     togSav = farmalloc(size);
219     imageToggle(l,t,r,b,togSav);                    //  Highlight default item
220     farfree(togSav);
221
222     /*
223                 Generate the Target for Closing a Window
224     */
225     winClose(TcloseX,TcloseY);                      //  Window close target
226     trgPos = trgPosition(toolTRG,TOLC);             //  Find target position
227     targt07[trgPos][1] = trgButn.xAbs;
228     targt07[trgPos][2] = trgButn.yAbs;
229     targt07[trgPos][3] = trgButn.xAbs + trgButn.wAbs;
230     targt07[trgPos][4] = trgButn.yAbs + trgButn.hAbs;
231
232     toolFLG = ON;                                   //  Set flag.
233     return(0);
234
235     }   /*  initTool()  */
236
237
238
239     /*********************************************************************
240
241                 Close the Tools Window
242
243     *********************************************************************/
244
245     int   closTool(void)
246     {
247
248     if(!toolFLG)                                    //  Tool window open ?
249         return(1);                                  //    No, return.
250     toolFLG = OFF;                                  //    Yes, close it.
251
252     ForeColor = toolFore;
253     BackColor = toolBack;                           //  Restore original colors
254
255     vpSET(TOOLWIND);                                //  Set viewport
256     PointOFF;
257     putimage(0,0,tolBuf,COPY_PUT);                  //  Restore old image
258     vpSET(LCDsSCRN);                                //  Switch back to LCD viewport
259     PointON;
260     farfree(tolBuf);                                //  Free memory
261
262     return(0);
263
264     }   /*  closTool()  */
1       #define VERSION "1.4"   /*** toolUtil.c                    10-SEP-91
2
3                 This is the Tool Window handler's utilities including the
4                 calculator, dialer & communicator for the GrScreen
5                                 Prototyping System.
6
7       ***/
8       #include  "GLBdef.h"
9       #include  "GLBext.h"
10
11      extern    int    targt09[][TblWIDE];
12      extern    int    targt10[][TblWIDE];
13      extern    int    targt11[][TblWIDE];
14
15      void  far *calcBuf, *dialBuf, *commBuf;
16                                                      //  Pointer to image under window
17      int   calcFore, calcBack, dialFore, dialBack, commFore, commBack;
18
```

```
19    BYTE   calcFLG, dialFLG, commFLG;
20
21    #define    ButPitch   35
22    #define    ButSize    25
23
24    char   *calcNmb[] = {"7","8","9","4","5","6","1","2","3","C","0","CE"};
25    char   *dialNmb[] = {"1","2","3","4","5","6","7","8","9","C","0","CE"};
26    char   *calcFunc1[] = { "M+","M-","1/x","=" };
27    char   *calcFunc2[] = { "+", "-", "/", "X" };
28
29    char   *toolMSG   = NULL;
30    char   calcMsg[]  = "Calculator";
31    char   dialMsg[]  = "Dialer";
32    char   commMsg[]  = "Communicator";
33    char   winnMsg[]  = "Window";
34
35
36    /****************************************************************
37
38                           The Calculator Window
39
40    ****************************************************************/
41
42    int    calcWind(int old)
43    {
44    int    initCalc(void);
45    int    closCalc(void);
46    int    mainStat, status, nxt;
47
48    old++;
49    initCalc();                         //  Initialize the calculator.
50
51    /*
52            The Main Loop
53    */
54    mainStat = ON;
55    while(mainStat)
56       {
57       status = ON;   old = OPR;
58       while(status)
59          {
60          tbl = calcTRG;               //  Target table for pointer.
61          waitOPR();                   //  Wait for input (type & key).
62          /*
63                  Control is passed back and forth through the return
64                  indicator: nxt. When control is relinquished (nxt=OPR),
65                  keyboard or pointer input determines the next action.
66          */
67          nxt = type;                  //  Initial value.
68          while(nxt != OPR && status)
69             {
70             switch(nxt)
71                {
72                case CLCC : mainStat = status = OFF;
73                            nxt=OPR;                             break;
74
75                case QUIT : mainStat = status = OFF;
76                            nxt=QUIT;                            break;
77
78                default   : nxt=OPR;                            break;
79
80                } /* switch(nxt)   */
81
82             } /* while(nxt)    */
83
84          } /* while(status)    */
85
86       } /* while(mainStat) */
87
88    closCalc();                         //  Close the calculator.
89
```

```
90      return(nxt);
91
92      }   /*  calcWind()   */
93
94
95
96      /*********************************************************************
97
98                      Initialize the Calculator
99
100     *********************************************************************/
101
102     int     initCalc(void)
103     {
104     int     savePart(int,int,int,int,void  far **,int);
105     int     winClose(int,int);
106     void    touchPad(int,int,int);
107     int     l, r, t, b, i, rtnVal, txtWide, trgPos;
108     int     poly[10];
109
110     /*
111             Set up the Appropriate ViewPort
112     */
113     vpSET(CALCWIND);                        //  Set viewport to calc window
114     calcFore = ForeColor;
115     calcBack = BackColor;                   //  Save the old
116     ForeColor = WHITE;                      //  Set the new
117     BackColor = BLACK;
118
119     l = 0;              t = 0;
120     r = CALCWIDE;       b = CALCHIGH;
121     rtnVal = savePart(l,t,r,b,&calcBuf,BackColor);
122                                             //  Save what's under viewport.
123     if(rtnVal)
124         return(rtnVal);                     //  No memory available, return.
125
126     setcolor(ForeColor);
127     l += winGAP;        t += winGAP;
128     r -= winGAP;        b -= winGAP;
129     rectangle(l,t,r,b);                     //  Put a border around window.
130
131
132     /*
133             Fill in the Window
134     */
135     setfillstyle(SOLID_FILL,ForeColor);
136     settextjustify(CENTER_TEXT,CENTER_TEXT);
137
138     setcolor(ForeColor);
139     rectangle(l+54,t+10,l+54+95,t+10+30);
140
141     poly[0] = poly[6] = poly[8] = l       + 54 + winGAP;
142     poly[2] = poly[4]           = poly[0] + 95 - winGAP*2;
143     poly[1] = poly[3] = poly[9] = t       + 10 + winGAP;
144     poly[5] = poly[7]           = poly[1] + 30 - winGAP*2;
145     fillpoly(5,poly);
146     setcolor(BackColor);
147     outtextxy(poly[0]+(poly[2]-poly[0])/2,
148               poly[1]+(poly[5]-poly[1])/2,
149               "1234.56");
150
151     poly[0] = poly[6] = poly[8] = l       + 8;
152     poly[2] = poly[4]           = poly[0] + ButSize +6;
153     for( i=0 ; i<4 ; i++ )
154         {
155         poly[1] = poly[3] = poly[9] = t + 35 + (ButPitch * i);
156         poly[5] = poly[7]           = poly[1] + ButSize;
157         setcolor(ForeColor);
158         fillpoly(5,poly);
159         setcolor(BackColor);
160         rectangle(poly[0]+winGAP,poly[1]+winGAP,
```

```
161                poly[4]-winGAP,poly[5]-winGAP);
162       outtextxy(poly[0]+(ButSize+6)/2,
163                 poly[1]+ButSize/2,
164                    *(calcFunc1+i));
165       }
166
167    poly[0] = poly[6] = poly[8] = l       + 160;
168    poly[2] = poly[4]            = poly[0] + ButSize -2;
169    for( i=0 ; i<4 ; i++ )
170       {
171       poly[1] = poly[3] = poly[9] = t + 45 + (ButPitch * i);
172       poly[5] = poly[7]           = poly[1] + ButSize;
173       setcolor(ForeColor);
174       fillpoly(5,poly);
175       setcolor(BackColor);
176       rectangle(poly[0]+winGAP,poly[1]+winGAP,
177                 poly[4]-winGAP,poly[5]-winGAP);
178       outtextxy(poly[0]+(ButSize-2)/2,
179                 poly[1]+ButSize/2,
180                    *(calcFunc2+i));
181       }
182
183    settextjustify(LEFT_TEXT,TOP_TEXT);
184
185    touchPad(l+54,t+54,CALC);            // Adding machine touch pad
186
187    /*
188            Generate the Target for Closing a Window
189    */
190    winClose(CalcCzX,CalcCzY);
191    trgPos = trgPosition(calcTRG,CLCC);   // Find target position
192    targt09[trgPos][1] = trgButn.xAbs;
193    targt09[trgPos][2] = trgButn.yAbs;
194    targt09[trgPos][3] = trgButn.xAbs + trgButn.wAbs;
195    targt09[trgPos][4] = trgButn.yAbs + trgButn.hAbs;
196
197
198
199    calcFLG = ON;                         // Set flag.
200    return(0);
201
202    } /*  initCalc()  */
203
204
205    /*****************************************************************
206
207                    Close the Calculator
208
209    *****************************************************************/
210
211    int   closCalc(void)
212    {
213
214    if(!calcFLG)                          //  Calc window open ?
215       return(1);                         //     No, return.
216    calcFLG = OFF;                        //     Yes, close it.
217
218    ForeColor = calcFore;
219    BackColor = calcBack;                 //  Restore original colors
220
221    vpSET(CALCWIND);                      //  Set viewport to calc window
222    PointOFF;
223    putimage(0,0,calcBuf,COPY_PUT);       //  Restore old image
224    vpSET(LCDsSCRN);                      //  Switch back to LCD viewport
225    PointON;
226    farfree(calcBuf);                     //  Free memory
227
228    return(0);
229
230    } /*  closCalc()  */
231
```

```
/****************************************************************
                    The Dialer Window
****************************************************************/
int    dialWind(int old)
{
int    initDial(void);
int    closDial(void);
int    mainStat, status, nxt;

old++;
initDial();                              //  Initialize the dialer.

/*
            The Main Loop
*/
mainStat = ON;
while(mainStat)
    {
    status = ON;   old = OPR;
    while(status)
        {
        tbl = dialTRG;                   //  Target table for pointer.
        waitOPR();                       //  Wait for input (type & key).
        /*
                Control is passed back and forth through the return
                indicator: nxt. When control is relinquished (nxt=OPR),
                keyboard or pointer input determines the next action.
        */
        nxt = type;                      //  Initial value.
        while(nxt != OPR && status)
            {
            switch(nxt)
                {
                case DILC :  mainStat = status = OFF;
                             nxt=OPR;                       break;

case QUIT :  mainStat = status = OFF;
                             nxt=QUIT;                      break;

default   :  nxt=OPR;                       break;

}   /*  switch(nxt)   */

}   /*  while(nxt)    */

}   /*  while(status)   */

}   /*  while(mainStat)  */ closDial();                              //  Close the dialer.

return(nxt);

}  /*  DialWind()  */

/****************************************************************

Initialize the Dialer

****************************************************************/ int    initDial(void)
{
int    savePart(int,int,int,int,void  far **,int);
int    winClose(int,int);
```

```
303     int    l, r, t, b, rtnVal, gap, txtWide, trgPos;
304
305     /*
306             Set up the Appropriate ViewPort
307     */
308     vpSET(DIALWIND);                        // Set viewport to dial window
309     dialFore = ForeColor;
310     dialBack = BackColor;                   // Save the old
311     ForeColor = WHITE;                      // Set the new
312     BackColor = BLACK;
313
314     l = 0;              t = 0;
315     r = DIALWIDE;       b = DIALHIGH;
316     rtnVal = savePart(l,t,r,b,&dialBuf,BackColor);
317                                             // Save what's under viewport.
318     if(rtnVal)
319        return(rtnVal);                      // No memory available, return.
320
321     setcolor(ForeColor);
322     rectangle(l+winGAP,t+winGAP,r-winGAP,b-winGAP);
323                                             // Put a border around window.
324
325     /*
326             Fill in the Window
327     */
328     toolMSG = dialMsg;
329     txtWide = textwidth(toolMSG);
330     l = (DIALWIDE - txtWide)/2;
331     t = DIALHIGH/3;
332     outtextxy(l,t,toolMSG);                 // Display message
333     txtWide = textwidth(winnMsg);
334     l = (DIALWIDE - txtWide)/2;
335     t = t * 2;
336     outtextxy(l,t,winnMsg);                 // Display message
337
338     /*
339             Generate the Target for Closing a Window
340     */
341     winClose(DialCzX,DialCzY);
342     trgPos = trgPosition(dialTRG,DILC);     // Find target position
343     targt10[trgPos][1] = trgButn.xAbs;
344     targt10[trgPos][2] = trgButn.yAbs;
345     targt10[trgPos][3] = trgButn.xAbs + trgButn.wAbs;
346     targt10[trgPos][4] = trgButn.yAbs + trgButn.hAbs;
347
348     dialFLG = ON;                           // Set flag.
349     return(0);
350
351     }  /* initDial() */
352
353
354     /******************************************************************
355
356                     Close the Dialer
357
358     ******************************************************************/
359
360     int    closDial(void)
361     {
362
363     if(!dialFLG)                            // Dial window open ?
364        return(1);                           //    No, return.
365     dialFLG = OFF;                          //    Yes, close it.
366
367     ForeColor = dialFore;
368     BackColor = dialBack;                   // Restore original colors
369
370     vpSET(DIALWIND);                        // Set viewport to calc window
371     PointOFF;
372     putimage(0,0,dialBuf,COPY_PUT);         // Restore old image
373     vpSET(LCDsSCRN);                        // Switch back to LCD viewport
```

```
374     PointON;
375     farfree(dialBuf);                       // Free memory
376
377     return(0);
378
379     } /*  closDial()  */
380
381
382
383     /******************************************************************
384
385                         The Communicator Window
386
387     ******************************************************************/
388
389     int    commWind(int old)
390     {
391     int    initComm(void);
392     int    closComm(void);
393     int    mainStat, status, nxt;
394
395     old++;
396     initComm();                              // Initialize the communicator.
397
398     /*
399             The Main Loop
400     */
401     mainStat = ON;
402     while(mainStat)
403        {
404        status = ON;   old = OPR;
405        while(status)
406           {
407           tbl = commTRG;                    // Target table for pointer.
408           waitOPR();                        // Wait for input (type & key).
409           /*
410                   Control is passed back and forth through the return
411                   indicator: nxt. When control is relinquished (nxt=OPR),
412                   keyboard or pointer input determines the next action.
413           */
414           nxt = type;                       // Initial value.
415           while(nxt != OPR && status)
416              {
417              switch(nxt)
418                 {
419                 case COMC : mainStat = status = OFF;
420                             nxt=OPR;                           break;
421
422                 case QUIT : mainStat = status = OFF;
423                             nxt=QUIT;                          break;
424
425                 default   : nxt=OPR;                           break;
426
427                 } /*  switch(nxt)   */
428
429              } /*  while(nxt)     */
430
431           } /*  while(status)   */
432
433        } /*  while(mainStat)  */
434
435     closComm();                              // Close the communicator.
436
437     return(nxt);
438
439     } /*  commWind()  */
440
441
```

```
/****************************************************************
                Initialize the Communicator

****************************************************************/ int     initComm(void)
{
int     savePart(int,int,int,int,void  far **,int);
int     winClose(int,int);
int     l, r, t, b, rtnVal, txtWide, trgPos;

/*
        Set up the Appropriate ViewPort
*/
vpSET(COMMWIND);                        // Set viewport to comm window
commFore = ForeColor;
commBack = BackColor;                   // Save the old
ForeColor = WHITE;                      // Set the new
BackColor = BLACK;

l = 0;              t = 0;
r = COMMWIDE;       b = COMMHIGH;
rtnVal = savePart(l,t,r,b,&commBuf,BackColor);
                                        // Save what's under viewport.
if(rtnVal)
    return(rtnVal);                     // No memory available, return.

setcolor(ForeColor);
rectangle(l+winGAP,t+winGAP,r-winGAP,b-winGAP);
                                        // Put a border around window.
/*
        Fill in the Window
*/
toolMSG = commMsg;
txtWide = textwidth(toolMSG);
l = (COMMWIDE - txtWide)/2;
t = COMMHIGH/3;
outtextxy(l,t,toolMSG);                 // Display message
txtWide = textwidth(winnMsg);
l = (COMMWIDE - txtWide)/2;
t = t * 2;
outtextxy(l,t,winnMsg);                 // Display message /*
        Generate the Target for Closing a Window
*/
winClose(CommCzX,CommCzY);
trgPos = trgPosition(commTRG,COMC);     // Find target position
targtll[trgPos][1] = trgButn.xAbs;
targtll[trgPos][2] = trgButn.yAbs;
targtll[trgPos][3] = trgButn.xAbs + trgButn.wAbs;
targtll[trgPos][4] = trgButn.yAbs + trgButn.hAbs;

commFLG = ON;                           // Set flag.
return(0);

} /* initComm() */

/****************************************************************
                Close the Communicator

****************************************************************/ int     closComm(void)
{ if(!commFLG)                            // Calc window open ?
    return(1);                          //   No, return.
```

```
513     commFLG = OFF;                              //   Yes, close it.
514
515     ForeColor = commFore;
516     BackColor = commBack;                       // Restore original colors
517
518     vpSET(COMMWIND);                            // Set viewport to calc window
519     PointOFF;
520     putimage(0,0,commBuf,COPY_PUT);             // Restore old image
521     vpSET(LCDsSCRN);                            // Switch back to LCD viewport
522     PointON;
523     farfree(commBuf);                           // Free memory
524
525     return(0);
526
527     }  /*  closComm()   */
528
529
530
531     /*****************************************************************
532
533                     Generate a Touch Pad
534
535     *****************************************************************/
536
537     void  touchPad(int xOrg,int yOrg,int padFLG)
538     {
539     int   i, j;
540     int   poly[10];
541     char  **setNmb;
542
543     if(padFLG == CALC)         setNmb = calcNmb;
544     else                       setNmb = dialNmb;
545
546     setfillstyle(SOLID_FILL,ForeColor);
547     settextjustify(CENTER_TEXT,CENTER_TEXT);
548
549     for( j=0 ; j<4 ; j++ )                      // Vertical
550         {
551         poly[1] = poly[3] = poly[9] = yOrg   + (ButPitch * j);
552         poly[5] = poly[7]           = poly[1] + ButSize -1;
553         for( i=0 ; i<3 ; i++ )                  // Horizontal
554             {
555             poly[0] = poly[6] = poly[8] = xOrg   + (ButPitch * i);
556             poly[2] = poly[4]           = poly[0] + ButSize -1;
557             setcolor(ForeColor);
558             fillpoly(5,poly);
559             setcolor(BackColor);
560             outtextxy(poly[0]+ButSize/2,
561                       poly[1]+ButSize/2,
562                       *(setNmb+(j*3)+i));
563             }
564         }
565     settextjustify(LEFT_TEXT,TOP_TEXT);
566
567     }  /*  touchPad()   */
  1     #define VERSION "2.6"  /***  clndWind.c                    12-AUG-91
  2
  3                 This is the Calendar Tool Window handler
  4                 for the GrScreen Prototyping System.
  5
  6     ***/
  7     #include   "GLBdef.h"
  8     #include   "GLBext.h"
  9
 10     #define    MAIN       2
 11     #define    OVER       4
 12
 13     void  far *savBuf;                          // Pointer to image under window
 14     void  far *ovrBuf;                          // Pointer to image under window
 15     void  far *daySav;                          // Pointer to day cell
```

```
 16   .
 17   BYTE   clndFLG, overFLG, dayFLG;
 18   int    clndFore, clndBack;
 19
 20   char   nmb[] = "              ";
 21
 22   /******************************************************************
 23
 24                         The Calendar Window
 25
 26   ******************************************************************/
 27
 28   int    clndWind(int old)
 29   {
 30   int    initClnd(void);
 31   int    closClnd(void);
 32   int    dayClnd(int);
 33   int    mainStat, status, nxt;
 34
 35   old++;
 36   initClnd();                              //  Initialize the calendar
 37
 38   /*
 39              The Main Loop
 40   */
 41   mainStat = ON;
 42   while(mainStat)
 43       {
 44       status = ON;   old = OPR;
 45       while(status)
 46          {
 47          tbl = clndTRG;                    //  Target table for pointer.
 48          waitOPR();                        //  Wait for input (type & key).
 49          /*
 50                  Control is passed back and forth through the return
 51                  indicator: nxt. When control is relinquished (nxt=OPR),
 52                  keyboard or pointer input determines the next action.
 53          */
 54          nxt = type;                       //  Initial value.
 55          while(nxt != OPR && status)
 56             {
 57             switch(nxt)
 58                {
 59                case CLNC : mainStat = status = OFF;
 60                            nxt=OPR;                              break;
 61
 62                case ClndSL:                  //  Scroll Month left
 63                            if(--calMon<1)
 64                                calMon = 12;
 65                            fillClnd();       //  Redo the calendar
 66                            nxt=OPR;                              break;
 67
 68                case ClndSR:                  //  Scroll Month right
 69                            if(++calMon>12)
 70                                calMon = 1;
 71                            fillClnd();       //  Redo the calendar
 72                            nxt=OPR;                              break;
 73
 74                case ClndYL:                  //  Scroll Year left
 75                            --calYear;
 76                            fillClnd();       //  Redo the calendar
 77                            nxt=OPR;                              break;
 78
 79                case ClndYR:                  //  Scroll Year right
 80                            ++calYear;
 81                            fillClnd();       //  Redo the calendar
 82                            nxt=OPR;                              break;
 83
 84                case CALREG:                  //  A day target hit
 85                            dayClnd(MAIN);
 86                            nxt=OPR;                              break;
```

```
 87
 88                case CALOVR:                         //  An overhang target
 89                         dayClnd(OVER);
 90                         nxt=OPR;                                  break;
 91
 92                case QUIT :  mainStat = status = OFF;
 93                         nxt=QUIT;        -                        break;
 94
 95                default   :  nxt=OPR;                              break;
 96
 97             }    /*  switch(nxt)    */
 98
 99          }   /*  while(nxt)       */
100
101       }   /*  while(status)    */
102
103    }   /*  while(mainStat)  */
104
105  closClnd();                            //  Close the calendar.
106
107  return(nxt);
 08
 09   }  /*  clndWind()   */
110
111
 12  /*********************************************************************
 13
114              Initialize the Calendar
115
116  *********************************************************************/
117
118   int   initClnd(void)
119   {
120   int   savePart(int,int,int,int,void far **,int);
121   int   scrolTarg(int,int,int);
122   int   fillClnd(void);
123   int   winClose(int,int);
124   int   l, r, t, b, rtnVal, i, y, gap;
125
126   /*
127          Set up the Appropriate ViewPort
128   */
129   vpSET(CLNDWIND);                       //  Set viewport to calendar window
130   clndFore = ForeColor;
131   clndBack = BackColor;                  //  Save the old
132   ForeColor = WHITE;                     //  Set the new
133   BackColor = BLACK;
134
135   l = 0;              t = 0;
136   r = CLNDWIDE;       b = CLNDHIGH;
137   rtnVal = savePart(l,t,r,b,&savBuf,BackColor);
 38                                         //  Save what's under viewport.
139   if(rtnVal)
140      return(rtnVal);                     //  No memory available, return.
141
142   /*
143          Draw the Calendar Grid & Outline
144   */
145   setcolor(ForeColor);
146   l = winGAP;             t = winGAP;
147   r = CLNDWIDE-winGAP;    b = t+headHIGH;
148   rectangle(l,t,r,b);                    //  Header block area
149
150   l = winGAP;
151   r = l + 7*cellWIDE -1;
152   t = winGAP + headHIGH;
153   for( i=1 ; i<=5 ; i++ )                //  Horizontal lines
154      {
155      t += cellHIGH;
156      b = t;
```

```
157         line(l,t,r,b);
158         }
159
160     l = winGAP - cellWIDE;
161     t = winGAP + headHIGH;
162     b = t + 5*cellHIGH;
163     gap = (cellWIDE-24)/2;                    //  Centering for days
164     y = winGAP + headHIGH -10;
165     for( i=0 ; i<=7 ; i++ )                   //  Vertical Lines
166         {
167         l += cellWIDE;
168         r = l;
169         outtextxy(l+gap,y,days[i]);           //  Abbreviations for days
170         line(l,t,r,b);
171         }
172
173     /*
174             The Scroll Markers
175     */
176     scrolTarg(xScrMonL,yScrMonL,LEFT);
177     scrolTarg(xScrMonR,yScrMonR,RIGHT);
178     scrolTarg(xScrYrsL,yScrYrsL,LEFT);
179     scrolTarg(xScrYrsR,yScrYrsR,RIGHT);
180
181     /*
182             Generate the Target for Closing a Window
183     */
184     winClose(DcloseX,DcloseY);
185
186     fillClnd();                               //  Put in month name & days
187
188     clndFLG = ON;                             //  Set flag.
189     return(0);
190
191     }  /*  initClnd()  */
192
193
194
195     /*****************************************************************
196
197             Fill in the Month Name and the Days
198
199     *****************************************************************/
200
201     int     fillClnd(void)
202     {
203     int     overHang(int);
204     int     closOver(void);
205     int     getMonOff(int);
206     int     highDay(int);
207     int     poly[10];
208     int     row, col, x, y, xStr, yStr;
209     int     NmbOff, ChrOff, i;
210     int     rtnVal;
211
212     vpSET(CLNDWIND);                          //  Set the calendar ViewPort
213     PointOFF;
214     dayFLG = OFF;
215     setfillstyle(SOLID_FILL,BackColor);
216
217     /*
218             The Month Name
219     */
220     poly[1] = poly[3] = poly[9] = yMONname-1;
221     poly[5] = poly[7]           = yMONname+7;
222     poly[0] = poly[6] = poly[8] = xMONname-36;
223     poly[2] = poly[4]           = xMONname+36;
224     setcolor(BackColor);
225     fillpoly(5,poly);                         //  Clear last entry
226
227     x = xMONname - textwidth(months[calMon-1])/2 + 2;
```

```
228        y = yMONname;
229        setcolor(ForeColor);
230        outtextxy(x,y,months[calMon-1]);
231
232        /*
233                The Year
234        */
235        poly[1] = poly[3] = poly[9] = yYRSname-1;
236        poly[5] = poly[7]           = yYRSname+7;
237        poly[0] = poly[6] = poly[8] = xYRSname-17;
238        poly[2] = poly[4]           = xYRSname+17;
239        setcolor(BackColor);
240        fillpoly(5,poly);                       //  Clear last entry
241
242        x = xYRSname - textwidth("1991")/2 + 2;
243        y = yYRSname;
244        setcolor(ForeColor);
245        itoa(calYear,nmb,10);
246        outtextxy(x,y,nmb);
247
248        /*
249                The Days of the Month
250        */
251        xStr = winGAP + (cellWIDE/2) - xCellOff;
252        yStr = winGAP + (cellHIGH/2) - yCellOff + headHIGH;
253
254        poly[1] = poly[3] = poly[9] = yDAYstr;
255        poly[5] = poly[7]           = yDAYstr+hDAY;
256
257        NmbOff = getMonOff(calMon);        //  Get the offset
258
259        i = 1;                             //  Day counter
260        y = yStr;
261        for( row=0 ; row<5 ; row++ )
262           {
263           x = xStr;
264           poly[0] = poly[6] = poly[8] = xDAYstr;
265           poly[2] = poly[4]           = xDAYstr+wDAY;
266           for( col=0 ; col<7 ; col++ )
267              {
268              setcolor(BackColor);
269              fillpoly(5,poly);            //  Clear last entry
270              if(NmbOff)
271                 NmbOff--;
272              else if(i<=dayMax[calMon-1])
273                 {
274                 itoa(i,nmb,10);           //  Convert to ASCII
275                 if(i++>9)
276                    ChrOff = 0;
277                 else                      //  Center the number
278                    ChrOff = 4;
279                 setcolor(ForeColor);
280                 outtextxy(x+ChrOff,y,nmb);
281                 }
282              x                         += cellWIDE;
283              poly[0] = poly[6] = poly[8] += cellWIDE;
284              poly[2] = poly[4]           += cellWIDE;
285              } /*   columns   */
286
287           y                            += cellHIGH;
288           poly[1] = poly[3] = poly[9]  += cellHIGH;
289           poly[5] = poly[7]            += cellHIGH;
290           } /*   rows     */
291
292        /*
293                Overhang - More Days than Cells
294        */
295        if(i<(dayMax[calMon-1]+1))          //  Extra days ?
296           {
297           if((rtnVal=overHang(i))!=0)      //    Yes, open overhang.
298              return(rtnVal);
```

```
299        }
300     else
301        closOver();                            //    No, close overhang.
302
303     if(calDay <= dayMax[calMon-1])
304        highDay(calDay);                       //    Highlight the day
305
306     PointON;
307     return(0);
308
309     }  /*   fillClnd()    */
310
311
312
313     /******************************************************************
314
315                Open an Overhang on the Calendar
316
317     ******************************************************************/
318     /*
319                Sometimes the arrangement of days in the month requires
320                more than five rows (weeks). Then part of a sixth row
321                (an overhang) is needed.
322     */
323     int    overHang(int i)
324     {
325     int    l, t, r, b;
326     int    rtnVal, x, y;
327
328     vpSET(OVERWIND);                           //    The overhang ViewPort
329
330     l = 0;                  t = 0;
331     r = OVERWIDE;           b = OVERHIGH;
332     rtnVal = savePart(l,t,r,b,&ovrBuf,BackColor);
333                                                //    Save what's under viewport.
334     if(rtnVal)
335        return(rtnVal);                         //    No memory available, return.
336
337     overFLG = ON;                              //    Set flag.
338
339     /*
340                Build two Extra Cells
341     */
342     setcolor(ForeColor);
343     l = winGAP;             t = 0;
344     r = l + cellWIDE;       b = t + cellHIGH;
345     rectangle(l,t,r,b);                        //    First
346     r += cellWIDE;
347     rectangle(l,t,r,b);                        //    Second
348     r += winGAP;            b = t;
349     line(l,t,r,b);                             //    Fill-in the gap.
350
351     /*
352                Fill the Cells
353     */
354     x = (cellWIDE/2) - xCellOff + winGAP ;
355     y = (cellHIGH/2) - yCellOff;
356
357     while(i<=dayMax[calMon-1])
358        {
359        itoa(i++,nmb,10);                       //    Convert to ASCII
360        setcolor(ForeColor);
361        outtextxy(x,y,nmb);
362        }
363
364     return(0);
365
366     }  /*   overHang()   */
367
368
```

```
/****************************************************************

Close the Calendar

****************************************************************/ int    closClnd(void)
{
int    closOver(void);

if(!clndFLG)                          //  Calendar window open ?
    return(1);                        //     No, return.
clndFLG = OFF;                        //     Yes, close it.

closOver();                           //  Close overhang if necessary

ForeColor = clndFore;
BackColor = clndBack;                 //  Restore original colors vpSET(CLNDWIND);                      //  Set viewport to calendar window
PointOFF;
putimage(0,0,savBuf,COPY_PUT);        //  Restore old image
vpSET(LCDsSCRN);                      //  Switch back to LCD viewport
PointON;
farfree(savBuf);                      //  Free memory return(0);

} /*  closClnd()  */

/****************************************************************

Close the Calendar Overhang

****************************************************************/ int    closOver(void)
{ if(!overFLG)                          //  Calendar window overhung ?
    return(1);                        //     No, return.
overFLG = OFF;                        //     Yes, close it.

vpSET(OVERWIND);                      //  Set viewport to overhang
PointOFF;
putimage(0,0,ovrBuf,COPY_PUT);        //  Restore old image
vpSET(CLNDWIND);                      //  Switch back to LCD viewport
PointON;
farfree(ovrBuf);                      //  Free memory return(0);

} /*  closOver()  */

/****************************************************************

Find Which Day Has Been Hit

****************************************************************/ int    dayClnd(int way)
{
int    cell, xCell, yCell;
int    xStr, xEnd, yStr, yEnd, tDay;
int    xRange, yRange, yStart;

if(way == MAIN)                       //  Main part of calendar
```

```
440         {
441         xStr = ClndVPx1 + xDAYstr;
442         yStr = ClndVPy1 + yDAYstr;
443         xRange = 7;
444         yRange = 5;
445         yStart = 0;
446         }
447      else if(way == OVER)                    //  Calendar overhang
448         {
449         xStr = OverVPx1 + xDAYstr;
450         yStr = OverVPy1 + ((cellHIGH - hDAY)/2);
 51         xRange = 2;
452         yRange = 6;
453         yStart = 5;
454         }
455      else
456         return(4);                           //  Mode unknown !!!
457
458      /*
459              Find the Column
460      */
461      xEnd = xStr + wDAY;
462      for( xCell=0 ; xCell<xRange ; xCell++ )
463         {
464         if(xcor > xStr && xcor < xEnd)
465            break;
466         xStr += cellWIDE;
467         xEnd += cellWIDE;
468         }
469
470      /*
471              Find the Row
472      */
473      yEnd = yStr + hDAY;
474      for( yCell=yStart ; yCell<yRange ; yCell++ )
475         {
'76         if(ycor > yStr && ycor < yEnd)
477            break;
478         yStr += cellHIGH;
479         yEnd += cellHIGH;
480         }
481
482      if(xCell>=xRange || yCell>=yRange)
483         return(1);                           //  Out of range
484
485      /*
486              Calculate the Day
487      */
488      tDay = xCell + yCell*7 - getMonOff(calMon) +1;
489      if(tDay > dayMax[calMon-1] || tDay < 1)
490         return(2);                           //  Out of range
491
492      if(dayFLG)
493         highDay(calDay);                     //  Remove previous highlight
494      calDay = tDay;
495      highDay(calDay);                        //  Highligh new day.
496
497      return(0);
498
499      }  /*  dayClnd()  */
500
501
502
503      /*********************************************************************
504
505                    Toggle the Highlight of a Selected Day
506
 07      *********************************************************************/
508
509      int    highDay(int tDay)
510      {
```

```
511     int   cell, xCell, yCell;
512     int   l, t, r, b;
513     unsigned  size;
514
515     cell = tDay + getMonOff(calMon) -1;
516     yCell = cell / 7;
517     xCell = cell % 7;
518
519     if(yCell >= 5 && overFLG == OFF)
520        return(1);                              // Out of range.
521
522     l = xDAYstr + xCell*cellWIDE;
523     t = yDAYstr + yCell*cellHIGH +1;
524     r = l + wDAY;
525     b = t + hDAY -2;
526
527     size = imagesize(l,t,r,b);                 // Get the image size
528     if((daySav = farmalloc(size)) == NULL)
529        return(2);                              // Unsuccessful memory alloc
530
531     vpSET(CLNDWIND);
532     PointOFF;
533     imageToggle(l,t,r,b,daySav);               // Toggle the highlight
534     farfree(daySav);                           // Free memory
535     PointON;
536
537     dayFLG = ON;                               // Set flag.
538     return(0);
539
540     }  /*  highDay()  */
541
542
543     /*******************************************************************
544
545                        Scroll Markers
546
547     *******************************************************************/
548
549     int   scrolTarg(int x,int y,int ori)
550     {
551     int   poly[12][2];
552
553     if(ori == LEFT)
554        {
555        poly[ 1][xCoOrd]=x+SLOPE;          poly[ 1][yCoOrd]=y-SLOPE;
556        poly[ 2][xCoOrd]=x+SLOPE;          poly[ 2][yCoOrd]=y-SLOPE+DROP;
557        poly[ 3][xCoOrd]=x+SLOPE+DROP;     poly[ 3][yCoOrd]=y-SLOPE;
558        poly[ 4][xCoOrd]=x+SLOPE+DROP;     poly[ 4][yCoOrd]=y-SLOPE+DROP;
559        poly[ 5][xCoOrd]=x+SLOPE+DROP*2;   poly[ 5][yCoOrd]=y-SLOPE;
560        poly[ 6][xCoOrd]=x+SLOPE+DROP*2;   poly[ 6][yCoOrd]=y+SLOPE;
561        poly[ 7][xCoOrd]=x+SLOPE+DROP;     poly[ 7][yCoOrd]=y+SLOPE-DROP;
562        poly[ 8][xCoOrd]=x+SLOPE+DROP;     poly[ 8][yCoOrd]=y+SLOPE;
563        poly[ 9][xCoOrd]=x+SLOPE;          poly[ 9][yCoOrd]=y+SLOPE-DROP;
564        poly[10][xCoOrd]=x+SLOPE;          poly[10][yCoOrd]=y+SLOPE;
565        }
566     else if(ori == RIGHT)
567        {
568        poly[ 1][xCoOrd]=x-SLOPE;          poly[ 1][yCoOrd]=y-SLOPE;
569        poly[ 2][xCoOrd]=x-SLOPE;          poly[ 2][yCoOrd]=y-SLOPE+DROP;
570        poly[ 3][xCoOrd]=x-SLOPE-DROP;     poly[ 3][yCoOrd]=y-SLOPE;
571        poly[ 4][xCoOrd]=x-SLOPE-DROP;     poly[ 4][yCoOrd]=y-SLOPE+DROP;
572        poly[ 5][xCoOrd]=x-SLOPE-DROP*2;   poly[ 5][yCoOrd]=y-SLOPE;
573        poly[ 6][xCoOrd]=x-SLOPE-DROP*2;   poly[ 6][yCoOrd]=y+SLOPE;
574        poly[ 7][xCoOrd]=x-SLOPE-DROP;     poly[ 7][yCoOrd]=y+SLOPE-DROP;
575        poly[ 8][xCoOrd]=x-SLOPE-DROP;     poly[ 8][yCoOrd]=y+SLOPE;
576        poly[ 9][xCoOrd]=x-SLOPE;          poly[ 9][yCoOrd]=y+SLOPE-DROP;
577        poly[10][xCoOrd]=x-SLOPE;          poly[10][yCoOrd]=y+SLOPE;
578        }
579     else
580        return(1);                              // Orientation unknown
581
```

```
582     poly[11][xCoOrd] = x;              poly[11][yCoOrd] = y;
583     poly[ 0][xCoOrd] = x;              poly[ 0][yCoOrd] = y;
584
585     setcolor(ForeColor);
586     setfillstyle(SOLID_FILL,ForeColor);
587     fillpoly(12,(int far *)poly);                       // Draw the marker
588
589     return(0);
590
591     } /* scrolTarg() */
```

S E C T I O N     E

```
1    #define VERSION "4.7". /*** listWind.c                          30-OCT-91
2
3              This is the interactive List Window handler
4                 for the GrScreen Prototyping System.
5
6    ***/
7    #include   "GLBdef.h"
8    #include   "GLBext.h"
9    #include   "GLBerr.h"
10
11   void   far *lstBuf;                   // Pointer to image under window
12   BYTE   listFLG;
13
14   int    listFore, listBack, listColor, listView;
15   int    ListNmb, firstFLG;
16
17   extern     int    listBlck;           // Block currently shown
18   extern     int    targt06[][TblWIDE];
19
20   /*****************************************************************
21
22                         The List Window
23
24   *****************************************************************/
25
26   int    listWind(int list,int corner)
27   {
28   int    initList(int);
29   int    closList(void);
30   int    showMain(int);
31   int    companyList(void);
32   int    contactList(void);
33   int    titleList(void);
34   int    firstList(void);
35   int    lastList(void);
36   int    cityList(void);
37   int    stateList(void);
38   int    akaList(void);
39   int    mainStat, status, nxt;
40   int    l, r, t, b, rtnVal, old;
41
42   initList(corner);
43
44   PointON;
45
46   /*****************************************************************
47
48                         The Main Loop
49
50   *****************************************************************/
51   firstFLG = list;
52   mainStat = ON;
53   while(mainStat)
54      {
55      status = ON;
56      while(status)
```

```
57          {
58          tbl = listTRG;                    //  Target table for pointer.
59          /*
60                  Control is passed back and forth through the return
61                  indicator: nxt. When control is relinquished (nxt=OPR),
62                  keyboard or pointer input determines the next action.
63          */
64          if(firstFLG)                      //  First time through ?
65             {
66             nxt = firstFLG;                //    Yes
67             firstFLG = OFF;                //      use preset
68             }
69          else                              //    No
70             {
71             waitOPR();                     //  Wait for input (type & key).
72             nxt = type;                    //  Initial value.
73             }
74
75          while(nxt != OPR && status)
76             {
77             switch(nxt)
78                {
79                case CONTACT :
80                   nxt=contactList();                                 break;
81
82                case TITLE :
83                   nxt=titleList();                                   break;
84
85                case LAST :
86                   nxt=lastList();                                    break;
87
88                case FIRST :
89                   nxt=firstList();                                   break;
90
91                case AKA :
92                   nxt=akaList();                                     break;
93
94                case COMPANY :
95                   nxt=companyList();                                 break;
96
97                case CITY :
98                   nxt=cityList();                                    break;
99
100               case STATE :
101                  nxt=stateList();                                   break;
102
103               case LISTFIELD :
104                  nxt=listItem(ycor);                                break;
105
106               case LSTC :
107                  mainStat = status = OFF;
108                  nxt=OPR;                                           break;
109
110               case LST1 :
111                  if(listBlck==CONTACT)
112                     showMain(LST1);
113                  nxt=OPR;                                           break;
114
115               case LST2 :
116                  if(listBlck==CONTACT)
117                     showMain(LST2);
118                  nxt=OPR;                                           break;
119
120               case LST3 :
121                  if(listBlck==CONTACT)
122                     showMain(LST3);
123                  nxt=OPR;                                           break;
124
125               case XFER :
126                  mainStat = status = OFF;
127                  nxt=XFER;                                          break;
```

```
128
129                     case QUIT :
130                         mainStat = status = OFF;
131                         nxt=QUIT;                                          break;
132
133                     default   :   nxt=OPR;                                break;
134
135                 }   /*  switch(nxt)   */
136
137             }   /*  while(nxt)    */
138
139         }   /*  while(status)   */
140
141     }   /*  while(mainStat)   */
142
143     closList();
144     return(nxt);
145
146 }   /*  listWind()   */
147
148
149 /*******************************************************************
150
151                 List Item Targets
152
153 *******************************************************************/
154 /*
155     An item will be transfered if a highlighted item is hit.
156     The usual procedure is to move the highlight by clicking
157     on an item, and hitting the highlighted item to transfer.
158 */
159
160 int   listItem(int yVector)
161 {
162 int   l, r, t, b, nxt, offSet;
163
164 t = vpVal[LISTSCRN][1];
165 b = t + 10;
166
167 /*
168         Find out if a line has been hit
169 */
170 for( ListNmb=0 ; ListNmb<itemNumb ; ListNmb++ )
171     {
172     offSet = ListSpc * ListNmb;
173     if(yVector >= (t+offSet) && yVector <= (b+offSet))
174        break;
175     }
176 if(ListNmb == itemNumb)
177     return(OPR);                            //  Line not hit
178
179 /*
180         Has the highlighted line been hit?
181 */
182 if(oldList != ListNmb)
183     {                                       //  Not hit
184     vpSET(LISTSCRN);                        //  Set viewport
185     PointOFF;
186     l = 0;                       r = xEndList-xStrList;
187     t = ListSpc * oldList;       b = t + 10;
188     imageToggle(l,t,r,b,togSav);            //  Restore old item
189
190     t = ListSpc * ListNmb;       b = t + 10;
191     imageToggle(l,t,r,b,togSav);            //  Highlight new item
192
193     oldList = ListNmb;
194     itemPntr= NULL;                         //  Nothing yet
195     PointON;
196     vpSET(LISTWIND);                        //  Set viewport
197     return(OPR);                            //  Wait for next hit
```

```
198          }
199     else                                      //  YES
200         {
201         itemPntr = *(listPntr+ListNmb);  // Pointer to transfer item
202         return(XFER);                    //  Return & transfer item
203         }
204
205     }   /*   ListItem()   */
206
207
208     /******************************************************************
209
210                 Initialize the Lists Window
211
212     ******************************************************************/
213
214     int    initList(int corner)
215     {
216     int    errList(int);
217     int    centerBut(int,int,char *);
218     int    savePart(int,int,int,int,void  far **,int);
219     int    elvBars(int,int,int,int,int,int);
220     int    setWindow(int,int,int,int);
221     int    winClose(int,int);
222     int    l, r, t, b, rtnVal, trgPos;
223     unsigned   size;
224
225     listFore = ForeColor;
226     listBack = BackColor;                     //  Save the old
227     listView = vpNmb;
228     listColor= getcolor();
229     ForeColor = WHITE;                        //  Set the new
230     BackColor = BLACK;
231
232     /*
233              Set up the Viewport
234     */
235     setWindow(LISTWIND,LISTWIDE,LISTHIGH,corner);
236
237     vpSET(LISTWIND);                          //  Set viewport to list window
238     l = 0;                     t = 0;
239     r = LISTWIDE;              b = LISTHIGH;
240     rtnVal = savePart(l,t,r,b,&lstBuf,BackColor);
241                                               //  Save what's under viewport.
242     if(rtnVal == NONE)
243         return(errList(erMEMlist));    //  No memory available, return.
244
245     PointOFF;
246     setcolor(ForeColor);
247     l += winGAP;               t += winGAP;
248     r -= winGAP;               b -= winGAP;
249     rectangle(l,t,r,b);                       //  Outline the Window
250
251     l += 10;                   t += 50;
252     r -= 20;                   b -= 20;
253     rectangle(l,t,r,b);                       //  Outline the list
254     elvBars(l,b+5,r-1,r+5,t,b-t);             //  Scroll bars for list
255
256     xStrList = l +5;
257     yStrList = t +8;                          //  A viewport for the list
258     xEndList = r -5;
259     yEndList = b -4;
260
261     /*
262              Fill in the values for the text listing viewport
263     */
264     vpVal[LISTSCRN][0] = xStrList + vpVal[LISTWIND][0];
265     vpVal[LISTSCRN][1] = yStrList + vpVal[LISTWIND][1];    //  Absolute
266     vpVal[LISTSCRN][2] = xEndList + vpVal[LISTWIND][0];
267     vpVal[LISTSCRN][3] = yEndList + vpVal[LISTWIND][1];
268
```

```
269     trgPos = trgPosition(listTRG,LISTFIELD);      // Find target position
270     targt06[trgPos][1] = vpVal[LISTSCRN][0];
271     targt06[trgPos][2] = vpVal[LISTSCRN][1];      // Field target is the
272     targt06[trgPos][3] = vpVal[LISTSCRN][2];      //   same as viewport.
273     targt06[trgPos][4] = vpVal[LISTSCRN][3];
274
275     itemPntr= NULL;
276
277     vpSET(LISTSCRN);                              // Set viewport to list screen
278     l = 0;                        t = 0;
279     r = xEndList - xStrList;      b = t + 10;
280     size = imagesize(l,t,r,b);                    // Get the image size
281     if((togSav = farmalloc(size)) == NULL)
282         return(errList(erMEMltog));               // Unsuccessful memory alloc
283
284     vpSET(LISTWIND);
285
286     /*
287             Generate the Target for Closing a Window
288     */
289     winClose(LcloseX,LcloseY);                    // Window close target
290     trgPos = trgPosition(listTRG,LSTC);           // Find target position
291     targt06[trgPos][1] = trgButn.xAbs;
292     targt06[trgPos][2] = trgButn.yAbs;
293     targt06[trgPos][3] = trgButn.xAbs + trgButn.wAbs;
294     targt06[trgPos][4] = trgButn.yAbs + trgButn.hAbs;
295
296     listFLG = ON;
297     PointON;
298     settextjustify(LEFT_TEXT,TOP_TEXT);           // Restore top-left
299     return(0);
300
301     } /* initList() */
302
303
304     /******************************************************************
305
306                     The Elevator Bars
307
308     ******************************************************************/
309     #define   lstSZ    8
310
311     int    elvBars(int xBotm,int yBotm,int wBotm,
312                    int xSide,int ySide,int hSide)
313     {
314     int    ElvPoint(int,int,int,int);
315     int    floodRect(int,int,int,int,int);
316     void   sayMssg(void);
317     int    x, y, sStr, sEnd, trgPos;
318
319     /*
320             The Horizontal Elevator Bar
321     */
322     x = xBotm;     y = yBotm;
323     sStr = ElvPoint(x,y,W,lstSZ);                 // Left elevator point
324     x += wBotm-lstSZ;
325     sEnd = ElvPoint(x,y,E,lstSZ);                 // Right elevator point
326     floodRect(sStr+3,y+1,sEnd-3,y+lstSZ-1,ForeColor);
327                                                   // Fill-in elevator bar
328     /*
329             The Vertical Elevator Bar
330     */
331     x = xSide;     y = ySide;
332     sStr = ElvPoint(x,y,N,lstSZ);                 // Top elevator point
333     y += hSide-lstSZ;
334     sEnd = ElvPoint(x,y,S,lstSZ);                 // Bottom elevator point
335     floodRect(x+1,sStr+3,x+lstSZ-2,sEnd-3,ForeColor);
336                                                   // Fill-in elevator bar
337     /*
338             The Elevator Bar Targets
339     */
```

```
340     trgPos = trgPosition(listTRG,LstElvLF);      //  Find target position
341     targt06[trgPos][1] = vpVal[LISTWIND][0] + xBotm;
342     targt06[trgPos][2] = vpVal[LISTWIND][1] + yBotm;
343     targt06[trgPos][3] = vpVal[LISTWIND][0] + xBotm + wBotm/2 -1;
344     targt06[trgPos][4] = vpVal[LISTWIND][1] + yBotm + lstSZ   -1;
345
346     trgPos = trgPosition(listTRG,LstElvRT);      //  Find target position
347     targt06[trgPos][1] = vpVal[LISTWIND][0] + xBotm + wBotm/2 +1;
348     targt06[trgPos][2] = vpVal[LISTWIND][1] + yBotm;
349     targt06[trgPos][3] = vpVal[LISTWIND][0] + xBotm + wBotm   -1;
350     targt06[trgPos][4] = vpVal[LISTWIND][1] + yBotm + lstSZ   -1;
351
352     trgPos = trgPosition(listTRG,LstElvUP);      //  Find target position
353     targt06[trgPos][1] = vpVal[LISTWIND][0] + xSide;
354     targt06[trgPos][2] = vpVal[LISTWIND][1] + ySide;
355     targt06[trgPos][3] = vpVal[LISTWIND][0] + xSide + lstSZ   -1;
356     targt06[trgPos][4] = vpVal[LISTWIND][1] + ySide + hSide/2 -1;
357
358     trgPos = trgPosition(listTRG,LstElvDN);      //  Find target position
359     targt06[trgPos][1] = vpVal[LISTWIND][0] + xSide;
360     targt06[trgPos][2] = vpVal[LISTWIND][1] + ySide + hSide/2 +1;
361     targt06[trgPos][3] = vpVal[LISTWIND][0] + xSide + lstSZ   -1;
362     targt06[trgPos][4] = vpVal[LISTWIND][1] + ySide + hSide   -1;
363
364     return(0);
365
366     }  /*  elvBars()  */
367
368
369     /*******************************************************************
370
371                     Close the List Window
372
373     *******************************************************************/
374
375     int    closList(void)
376     {
377
378     if(!listFLG)                          //  List window open ?
379         return(1);                        //     No, return.
380     winFLG = listFLG = OFF;               //     Yes, close it.
381
382     vpSET(LISTWIND);                      //  Set viewport to list window
383     PointOFF;
384     putimage(0,0,lstBuf,COPY_PUT);        //  Restore old image
385     PointON;
386
387     ForeColor = listFore;
388     BackColor = listBack;                 //  Restore original colors
389     setcolor(listColor);
390     vpSET(listView);                      //  Switch back to old viewport
391     farfree(lstBuf);                      //  Free memory
392     clkInvisible = FALSE;                 //  Show the clock
393
394     return(0);
395     }  /*  closList()  */
1       #define VERSION "1.6"  /***  listShow.c              30-OCT-91
2
3                       All database activity for the GrScreen
4                       Prototyping System is handled here.
5
6       ***/
7       #include   "GLBdef.h"
8       #include   "GLBext.h"
9       #include   "GLBerr.h"
10      #include   <pxengine.h>                   //  Paradox Engine.
11
12      #define    Head1     15
13      #define    Head2     40
14      #define    HeadC     28
```

```
 15
 16     int     listBlck;                           //  Block currently shown
 17     char    *listMain[listMAX];                 //  The master list
 18     char    lineMain[listMAX][BUFSIZ];          //  The lines in the list
 19
 20     extern     int    targt06[][TblWIDE];
 21
 22     /***************************************************************
 23
 24                     The CONTACT List
 25
 26     ***************************************************************/
 27
 28     int     contactList(void)
 29     {
 30     int     trgPosition(int,int);
 31     int     centerBut(int,int,char *);
 32     int     showMain(int);
 33     int     x, y, trgPos;
 34     int     l, t, r, b;
 35
 36     /*
 37             Header and Buttons
 38     */
 39     y = Head1;
 40     x = (LISTWIDE - CloseSZ)/2;
 41     settextjustify(CENTER_TEXT,CENTER_TEXT);
 42     outtextxy(x,y,"Contacts");                  //  Header
 43
 44     y = Head2;
 45     x = LISTWIDE/6 +4;
 46     centerBut(x,y,"Last");                      //  Create a button and fill
 47                                                 //     in trgButn structure.
 48     trgPos = trgPosition(listTRG,LST1);         //  Find target position
 49     targt06[trgPos][1] = trgButn.xAbs;
 50     targt06[trgPos][2] = trgButn.yAbs;
 51     targt06[trgPos][3] = trgButn.xAbs + trgButn.wAbs;
 52     targt06[trgPos][4] = trgButn.yAbs + trgButn.hAbs;
 53
 54     x = LISTWIDE/2 +3;
 55     centerBut(x,y,"First");                     //  Create a button and fill
 56                                                 //     in trgButn structure.
 57     trgPos = trgPosition(listTRG,LST2);         //  Find target position
 58     targt06[trgPos][1] = trgButn.xAbs;
 59     targt06[trgPos][2] = trgButn.yAbs;
 60     targt06[trgPos][3] = trgButn.xAbs + trgButn.wAbs;
 61     targt06[trgPos][4] = trgButn.yAbs + trgButn.hAbs;
 62
 63     x = (5*LISTWIDE)/6;
 64     centerBut(x,y,"AKA");                       //  Create a button and fill
 65                                                 //     in trgButn structure.
 66     trgPos = trgPosition(listTRG,LST3);         //  Find target position
 67     targt06[trgPos][1] = trgButn.xAbs;
 68     targt06[trgPos][2] = trgButn.yAbs;
 69     targt06[trgPos][3] = trgButn.xAbs + trgButn.wAbs;
 70     targt06[trgPos][4] = trgButn.yAbs + trgButn.hAbs;
 71
 72
 73     itemNumb = showMain(LST1);                  //  Display a list (will reset
 74                                                 //     viewport to LISTWIND).
 75     return(OPR);
 76
 77     }  /*  contactList()   */
 78
 79
 80     /***************************************************************
 81
 82                     The TITLE List
 83
 84     ***************************************************************/
 85
```

```
 86    int    titleList(void)
 87    {
 88    int    showMain(int);
 89    int    x, y;
 90
 91    y = HeadC;
 92    x = (LISTWIDE - CloseSZ)/2;
 93    settextjustify(CENTER_TEXT,CENTER_TEXT);
 94    outtextxy(x,y,"Titles");                 //   Header
 95
 96    itemNumb = showMain(TITLE);              //   Display a list (will reset
 97                                             //      viewport to LISTWIND).
 98
 99    return(OPR);
100
101    }  /*  titleList()  */
102
103
104
105    /****************************************************************
106
107                   The First Name List
108
109    ****************************************************************/
110
111    int    firstList(void)
112    {
113    int    showMain(int);
114    int    x, y;
115
116    y = HeadC;
117    x = (LISTWIDE - CloseSZ)/2;
118    settextjustify(CENTER_TEXT,CENTER_TEXT);
119    outtextxy(x,y,"First Names");             //   Header
120
121    itemNumb = showMain(FIRST);               //   Display a list (will reset
122                                              //      viewport to LISTWIND).
123
124    return(OPR);
125
126    }  /*  firstList()  */
127
128
129
130    /****************************************************************
131
132                   The Last Name List
133
134    ****************************************************************/
135
136    int    lastList(void)
137    {
138    int    showMain(int);
139    int    x, y;
140
141    y = HeadC;
142    x = (LISTWIDE - CloseSZ)/2;
143    settextjustify(CENTER_TEXT,CENTER_TEXT);
144    outtextxy(x,y,"Last Names");              //   Header
145
146    itemNumb = showMain(LAST);                //   Display a list (will reset
147                                              //      viewport to LISTWIND).
148
149    return(OPR);
150
151    }  /*  lastList()  */
152
153
154
```

```
155     /*******************************************************************
156
157                     The A.K.A. (Also Known As) List
158
159     *******************************************************************/
160
161     int     akaList(void)
162     {
163     int     showMain(int);
164     int     x, y;
165
166     y = HeadC;
167     x = (LISTWIDE - CloseSZ)/2;
168     settextjustify(CENTER_TEXT,CENTER_TEXT);
169     outtextxy(x,y,"Also Known As");         //  Header
170
171     itemNumb = showMain(AKA);               //  Display a list (will reset
172                                             //    viewport to LISTWIND).
173
174     return(OPR);
175
176     }  /*  akaList()  */
177
178
179
180     /*******************************************************************
181
182                     The COMPANY List
183
184     *******************************************************************/
185
186     int     companyList(void)
187     {
188     int     showMain(int);
189     int     x, y;
190
191     y = HeadC;
192     x = (LISTWIDE - CloseSZ)/2;
193     settextjustify(CENTER_TEXT,CENTER_TEXT);
194     outtextxy(x,y,"Companies");             //  Header
195
196     itemNumb = showMain(COMPANY);           //  Display a list (will reset
197                                             //    viewport to LISTWIND).
198
199     return(OPR);
200
201     }  /*  companyList()  */
202
203
204     /*******************************************************************
205
206                     The CITY List
207
208     *******************************************************************/
209
210     int     cityList(void)
211     {
212     int     showMain(int);
213     int     trgPosition(int,int);
214     int     centerBut(int,int,char *);
215     int     x, y, trgPos;
216
217     y = Head1;
218     x = (LISTWIDE - CloseSZ)/2;
219     settextjustify(CENTER_TEXT,CENTER_TEXT);
220     outtextxy(x,y,"Cities");                //  Header
221
222     y = Head2;
223     x = LISTWIDE/2;
224     centerBut(x,y,"With States");           //  Create a button and fill
225                                             //    in trgButn structure.
```

```
226     trgPos = trgPosition(listTRG,LST1);     // Find target position
227     targt06[trgPos][1] = trgButn.xAbs;
228     targt06[trgPos][2] = trgButn.yAbs;
229     targt06[trgPos][3] = trgButn.xAbs + trgButn.wAbs;
230     targt06[trgPos][4] = trgButn.yAbs + trgButn.hAbs;
231
232
233     itemNumb = showMain(CITY);              // Display a list (will reset
234                                             //    viewport to LISTWIND).
235
236     return(OPR);
237
238     } /*   cityList()   */
239
240
241     /*****************************************************************
242
243                     The STATE List
244
245     *****************************************************************/
246
247     int    stateList(void)
248     {
249     int    showMain(int);
250     int    x, y;
251
252     y = HeadC;
253     x = (LISTWIDE - CloseSZ)/2;
254     settextjustify(CENTER_TEXT,CENTER_TEXT);
255     outtextxy(x,y,"States");                // Header
256
257     itemNumb = showMain(STATE);             // Display a list (will reset
258                                             //    viewport to LISTWIND).
259
260     return(OPR);
261
262     } /*   stateList()   */
263
264
265     /*****************************************************************
266
267                     Set Up the Main List
268
269     *****************************************************************/
270
271     int   showMain(int listNmb)
272     {
273     TABLEHANDLE     tblHndl;
274     RECORDHANDLE    recHndl;
275     FIELDHANDLE     fldHndl, fldHndl2;
276     void   chkErr(int);
277     int    errList(int);
278     int    poly[10];
279     int    i, x, y, len;
280     int    l, t, r, b;
281     char   pMark;
282     char   *fldName, *fldNam2, *tblName;
283     BYTE   nextFlg;
284
285     /*
286              Choose which List
287     */
288     listBlck = listNmb;
289     fldNam2 = NULL;     pMark = 0;
290     switch(listNmb)
291         {
292         case  LST1:     listBlck = CONTACT;
293                         tblName="contact";      fldName="Last";
294                         pMark = ',';            fldNam2="First";    break;
295         case  LST2:     listBlck = CONTACT;
296                         tblName="contact";      fldName="First";
```

```
297                                                              fldNam2="Last";    break;
298        case   LST3:       listBlck = CONTACT;
299                           tblName="contact";                fldName="A.K.A.";  break;
300        case   AKA :       tblName="contact";                fldName="A.K.A.";  break;
301        case   LAST:       tblName="contact";                fldName="Last";    break;
302        case   FIRST:      tblName="contact";                fldName="First";   break;
303        case   TITLE:      tblName="titles";                 fldName="Name";    break;
304        case   COMPANY:    tblName="company";                fldName="Name";    break;
305        case   CITY:       tblName="cities";                 fldName="Name";    break;
306        case   STATE:      tblName="states";                 fldName="Abrev";   break;
307        case   COUNTRY:    tblName="country";                fldName="Name";    break;
308        case   INDUSTRY:   tblName="industry";               fldName="Name";    break;
309        default:           return(errList(erRNGlist));
310        } /* switch(listNmb) */
311
312    if(fldNam2 != NULL)       nextFlg = TRUE;
313    else                      nextFlg = FALSE;
314
315    /*
316               Access the Paradox Data Base
317    */
318    chkErr(PXInit());
319    chkErr(PXTblOpen(tblName, &tblHndl, 0,0));          // Open table
320    chkErr(PXFldHandle(tblHndl, fldName, &fldHndl));    // Get field handle
321    if(nextFlg)
322       {                                                // Second reference
323       chkErr(PXFldHandle(tblHndl, fldNam2, &fldHndl2));
324       }
325    chkErr(PXTblClose(tblHndl));                        // Close table
326    chkErr(PXKeyAdd(tblName,1,&fldHndl,SECONDARY));     // Add index
327    chkErr(PXTblOpen(tblName, &tblHndl, fldHndl,0));    // Re-open table
328    chkErr(PXRecBufOpen(tblHndl, &recHndl));            // Open buffer
329
330    /*
331               Transfer the First Field to the Main List
332    */
333    i = 0;
334    chkErr(PXRecGet(tblHndl,recHndl));              // Get 1st record
335    listMain[i] = &lineMain[i][0];                  // Set pntr table
336    chkErr(PXGetAlpha(recHndl,fldHndl,BUFSIZ,listMain[i]));
337                                                    // Get a field
338    if(nextFlg)
339       {                                            // Second reference
340       len = strlen(listMain[i]);
341       if(pMark)
342          *(listMain[i]+len++) = pMark;             // Punctuation
343       *(listMain[i]+len++) = SPC;                  // Space
344       chkErr(PXGetAlpha(recHndl,fldHndl2,BUFSIZ-len,listMain[i]+len));
345       }                                            // Append a field
346    chkErr(PXRecNext(tblHndl));
347    if(lineMain[i][0] != '\0')                      // Ignore blank fields
348       i++;
349
350    /*
351               Transfer the Remaining Fields to the Main List
352    */
353    for(   ; i<listMAX ; i++ )
354       {
355       PXRecGet(tblHndl,recHndl);                   // Get next record
356       listMain[i] = &lineMain[i][0];               // Set pntr table
357       PXGetAlpha(recHndl,fldHndl,BUFSIZ,listMain[i]);// Get a field
358       if(nextFlg)
359          {                                         // Second reference
360          len = strlen(listMain[i]);
361          if(pMark)
362             *(listMain[i]+len++) = pMark;          // Punctuation
363          *(listMain[i]+len++) = SPC;               // Space
364          PXGetAlpha(recHndl,fldHndl2,BUFSIZ-len,listMain[i]+len);
365          }                                         // Append a field
366       if(lineMain[i][0] == '\0') i--;              // Ignore blank fields
```

```
367        if(PXRecNext(tblHndl)==PXERR_ENDOFTABLE)   // Advance record
368           break;                                  //   Last record
369        }
370
371     chkErr(PXRecBufClose(recHndl));               // Close buffer
372     chkErr(PXTblClose(tblHndl));                  // Close table
373     chkErr(PXKeyDrop(tblName,fldHndl));           // Remove index
374     chkErr(PXExit());
375
376     /*
377             Fill in the Window
378     */
379     vpSET(LISTWIND);                              // Set viewport to list window
380     setfillstyle(SOLID_FILL,BackColor);
381     setcolor(BackColor);
382
383     poly[0] = poly[6] = poly[8] = xStrList;
384     poly[2] = poly[4]           = xEndList;
385     poly[1] = poly[3] = poly[9] = yStrList;
386     poly[5] = poly[7]           = yEndList;
387     fillpoly(5,poly);                             // Clear old list
388
389     /*
390             Display List, One row at a Time
391     */
392     vpSET(LISTSCRN);                              // Set viewport to list screen
393     setcolor(ForeColor);
394     settextjustify(LEFT_TEXT,TOP_TEXT);
395     for( i=0,x=y=1 ; *(listMain+i)!=NULL ; i++,y+=ListSpc )
396        outtextxy(x,y,*(listMain+i));
397
398     /*
399             Select & Highlight an Item
400     */
401     oldList = (i-1)/3;                            // Select a default
402
403     l = 0;                          t = ListSpc * oldList;
404     r = xEndList - xStrList;        b = t + 10;
405     imageToggle(l,t,r,b,togSav);                  // Highlight default item
406     vpSET(LISTWIND);                              // Set viewport to list window
407
408     listPntr = listMain;
409
410     return(i);                                    // Return with # of items in list
411
412     }  /*  showMain()  */
413
414
415     void  chkErr(int rc)
416     {
417
418     if(rc != PXSUCCESS)                           // Error ?
419        {                                          //   Yes
420        errList(-rc);
421        // printm("Error: %s\n",PXErrMsg(rc));
422        }
423
424     }  /*  chkErr()  */

1       #define VERSION "1.4"   /***  keybWind.c                    12-SEP-91
2
3                This is the editing keyboard Window handler
4                    for the GrScreen Prototyping System.
5
6       ***/
7       #include  "GLBdef.h"
8       #include  "GLBext.h"
9
10
11      #define    xKeyStr    (winGAP*3)
12      #define    yKeyStr    (winGAP*3)
```

```
13      #define     KeySZ       19
14      #define     KeyROWS     4
15
16      #define     TabKey      0
17      #define     CapLock     1
18      #define     LfShift     2
19      #define     RtShift     3
20      #define     EntrKey     4
21      #define     BackKey     5
22
23      int     extraKey[6][4];                     // Position of special keys
24
25      int     KeybCzX, KeybCzY;
26
27      void    far *keyBuf;                        // Pointer to image under window
28      BYTE    keybFLG;
29      int     keybFore, keybBack, keybColor, keybView;
30      int     xStrKeyb, yStrKeyb, xEndKeyb, yEndKeyb;
31      int     KeybWide, KeybHigh;
32      int     wShift;                             // Width of the shift keys
33      int     shiftable[KeyROWS][3];              // Column offsets
34
35      extern      int     targtl2[][TblWIDE];
36
37      /*******************************************************************
38
39                          The Keyb Window
40
41      *******************************************************************/
42
43      int     keybWind(int corner)
44      {
45      int     initKeyb(int);
46      int     closKeyb(void);
47      int     showKeyb(int);
48      int     mainStat, status, nxt;
49      int     l, r, t, b, rtnVal, old;
50
51      initKeyb(corner);
52
53      PointON;
54
55      /*******************************************************************
56
57                          The Main Loop
58
59      *******************************************************************/
60
61      mainStat = ON;
62      while(mainStat)
63          {
64          status = ON;    old = OPR;
65          while(status)
66              {
67              tbl = keybTRG;                      // Target table for pointer.
68              waitOPR();                          // Wait for input (type & key).
69              /*
70                      Control is passed back and forth through the return
71                      indicator: nxt. When control is relinquished (nxt=OPR),
72                      keyboard or pointer input determines the next action.
73              */
74              nxt = type;                         // Initial value.
75              while(nxt != OPR && status)
76                  {
77                  switch(nxt)
78                      {
79                      case KEYBFIELD :    nxt=keybItem(ycor);                 break;
80
81                      case KEYC :     mainStat = status = OFF;
82                                      nxt=OPR;                                break;
83
```

```
 84                    case XFER :   mainStat = status = OFF;
 85                                  nxt=XFER;                               break;
 86
 87                    case QUIT :   mainStat = status = OFF;
 88                                  nxt=QUIT;                               break;
 89
 90                    default   :   nxt=OPR;     old++;old--;              break;
 91
 92                 }   /*  switch(nxt)    */
 93
 94             }   /*  while(nxt)      */
 95
 96         }   /*  while(status)    */
 97
 98     }   /*  while(mainStat)  */
 99
100     closKeyb();
101     return(nxt);
102
103     }   /*  keybWind()   */
104
105
106
107
108     /***********************************************************************
109
110                    Initialize the Keyboard Window
111
112     ***********************************************************************/
113
114     char  *keyChar[] =
115         {
116             "`1234567890-=\\",
117             "qwertyuiop[]",
118             "asdfghjkl;'",
119             "zxcvbnm,./"
120         };
121
122     char  *keyShift[] =
123         {
124             "~!@#$%^&*()_+",
125             "QWERTYUIOP{}",
126             "ASDFGHJKL:\"",
127             "ZXCVBNM<>?"
128         };
129
130     int   initKeyb(int corner)
131     {
132     int   savePart(int,int,int,int,void  far **,int);
133     int   setWindow(int,int,int,int);
134     int   winClose(int,int);
135     int   keyLabels(char **);
136     int   genKey(int,int,int,int);
137     int   l, r, t, b, rtnVal, trgPos, colCnt;
138     int   i, j, x, y, xStr, lastX;
139     unsigned  size;
140
141     keybFore = ForeColor;
142     keybBack = BackColor;                    //  Save the old
143     keybView = vpNmb;
144     keybColor= getcolor();
145     ForeColor = WHITE;                        //  Set the new
146     BackColor = BLACK;
147
148     /*
149                 Set up the Viewport
150     */
151     KeybWide = (KeySZ+1) * 15  + winGAP * 6;
152     KeybHigh = (KeySZ+1) * 4   + winGAP * 5;
153
154     setWindow(KEYBWIND,KeybWide,KeybHigh,corner);
```

```
155
156     vpSET(KEYBWIND);                              //  Set viewport to list window
157     l = 0;                  t = 0;
158     r = KeybWide;           b = KeybHigh;
159     rtnVal = savePart(l,t,r,b,&keyBuf,BackColor);
160                                                   //  Save what's under viewport.
161     if(rtnVal)
162        return(rtnVal);                            //  No memory available, return.
163
164     PointOFF;
165     setcolor(ForeColor);
166     l += winGAP;            t += winGAP;
167     r -= winGAP;            b -= winGAP;
168     rectangle(l,t,r,b);                           //  Outline the Window
169
170     /*
171              Generate the Keyboard
172     */
173     x = xStr = xKeyStr;
174     y = yKeyStr;
175
176     for( j=0 ; j<KeyROWS ; j++,y+=KeySZ+1,xStr+=KeySZ/2 )
177         {
178         if(j==1)   xStr+=KeySZ;
179         shiftable[j][0] = x       = xStr;         //  Start of row x value
180         shiftable[j][1] = colCnt = strlen(keyChar[j]); // # of keys
181         for( i=0 ; i<colCnt ; i++,x += KeySZ+1 )
182             lastX = genKey(x,y,KeySZ,KeySZ);
183         shiftable[j][2] = lastX;                  //  End of row x value
184         }
185     keyLabels(keyChar);                           //  Fill-in the labels
186
187     /*
188              Extra Keys
189     */
190     settextjustify(CENTER_TEXT,CENTER_TEXT);
191
192     l = xKeyStr;
193     t = yKeyStr + (KeySZ+1)*1;
194     r = shiftable[1][0]-2;
195     genKey(l,t,r-l,KeySZ);                        //  TAB
196     outtextxy(l+(r-l)/2,t+KeySZ/2,"Tab");
197     extraKey[TabKey][0] = l;
198     extraKey[TabKey][1] = t;
199     extraKey[TabKey][2] = r;
200     extraKey[TabKey][3] = t + KeySZ -1;
201
202     t = yKeyStr + (KeySZ+1)*2;
203     r = shiftable[2][0]-2;
204     genKey(l,t,r-l,KeySZ);                        //  Shift Lock
205     outtextxy(l+(r-l)/2,t+KeySZ/2,"Lock");
206     extraKey[CapLock][0] = l;
207     extraKey[CapLock][1] = t;
208     extraKey[CapLock][2] = r;
209     extraKey[CapLock][3] = t + KeySZ -1;
210
211     t = yKeyStr + (KeySZ+1)*3;
212     r = shiftable[3][0]-2;
213     wShift = r-l;
214     genKey(l,t,r-l,KeySZ);                        //  Shift (Left);
215     outtextxy(l+(r-l)/2,t+KeySZ/2,"");
216     extraKey[LfShift][0] = l;
217     extraKey[LfShift][1] = t;
218     extraKey[LfShift][2] = r;
219     extraKey[LfShift][3] = t + KeySZ -1;
220
221     l = shiftable[1][2] +KeySZ/2;
222     t = yKeyStr + (KeySZ+1)*1;
223     r = KeybWide - winGAP*2;
224     genKey(l,t,r-l,KeySZ);                        //  Backspace
225     outtextxy(l+(r-l)/2,t+KeySZ/2,"");
```

```
226     extraKey[BackKey][0] = l;
227     extraKey[BackKey][1] = t;
228     extraKey[BackKey][2] = r;
229     extraKey[BackKey][3] = t + KeySZ -1;
230
231     l = shiftable[2][2] +3;
232     t = yKeyStr + (KeySZ+1)*2;
233     genKey(l,t,r-l,KeySZ);                    //  ENTER
234     outtextxy(l+(r-l)/2,t+KeySZ/2,"Enter");
235     extraKey[EntrKey][0] = l;
236     extraKey[EntrKey][1] = t;
237     extraKey[EntrKey][2] = r;
238     extraKey[EntrKey][3] = t + KeySZ -1;
239
240     l = shiftable[3][2] +3;
241     t = yKeyStr + (KeySZ+1)*3;
242     r = l + wShift;
243     genKey(l,t,wShift,KeySZ);                 //  Shift (right)
244     outtextxy(l+wShift/2,t+KeySZ/2,"");
245     settextjustify(LEFT_TEXT,TOP_TEXT);
246     extraKey[RtShift][0] = l;
247     extraKey[RtShift][1] = t;
248     extraKey[RtShift][2] = r;
249     extraKey[RtShift][3] = t + KeySZ -1;
250
251     /*
252              Full Keyboard Target
253     */
254     trgPos = trgPosition(keybTRG,KEYBFIELD);   //  Find target position
255     targtl2[trgPos][1] = vpVal[KEYBWIND][0] + xKeyStr;
256     targtl2[trgPos][2] = vpVal[KEYBWIND][1] + yKeyStr;
257     targtl2[trgPos][3] = vpVal[KEYBWIND][2] - winGAP*2;
258     targtl2[trgPos][4] = vpVal[KEYBWIND][3] - winGAP*2;
259
260
261     /*
262              Generate the Target for Closing a Window
263     */
264     KeybCzX = KeybWide - winGAP;
265     KeybCzY = winGAP;
266     winClose(KeybCzX,KeybCzY);                 //  Window close target
267     trgPos = trgPosition(keybTRG,KEYC);        //  Find target position
268     targtl2[trgPos][1] = trgButn.xAbs;
269     targtl2[trgPos][2] = trgButn.yAbs;
270     targtl2[trgPos][3] = trgButn.xAbs + trgButn.wAbs;
271     targtl2[trgPos][4] = trgButn.yAbs + trgButn.hAbs;
272
273     keybFLG = ON;
274     PointON;
275     return(0);
276
277     }  /*  initKeyb()  */
278
279
280
281     /******************************************************************
282
283                    Close the Keyboard Window
284
285     ******************************************************************/
286
287     int   closKeyb(void)
288     {
289
290     if(!keybFLG)                               //  Window open ?
291        return(1);                              //     No, return.
292     keybFLG = OFF;                             //     Yes, close it.
293
294     vpSET(KEYBWIND);                           //  Set viewport to keyb window
295     PointOFF;
```

```
296     putimage(0,0,keyBuf,COPY_PUT);       // Restore old image
297     PointON;
298
299     ForeColor = keybFore;
300     BackColor = keybBack;                // Restore original colors
301     setcolor(keybColor);
302     vpSET(keybView);                     // Switch back to old viewport
303     farfree(togSav);
304     farfree(keyBuf);                     // Free memory
305     clkInvisible = FALSE;                // Show the clock
306
307     return(0);
308     } /* closKeyb() */
309
310
311
312     /*********************************************************************
313
314                 Generate a Keyboard Key
315
316     *********************************************************************/
317     int   genKey(int x,int y,int xKeySize,int yKeySize)
318     {
319
320     line(x+2,y,   x+xKeySize-3,y );                              // Top
321     line(x+1,y+1,x+xKeySize-2,y+1);
322
323     line(x+xKeySize-1,y+2,x+xKeySize-1,y+yKeySize-3); // Right
324     line(x+xKeySize-2,y+1,x+xKeySize-2,y+yKeySize-2);
325
326     line(x,   y+2,x,   y+yKeySize-3);                            // Left
327     line(x+1,y+1,x+1,y+yKeySize-2);
328
329     line(x+2,y+yKeySize-1,x+xKeySize-3,y+yKeySize-1); // Bottom
330     line(x+1,y+yKeySize-2,x+xKeySize-2,y+yKeySize-2);
331
332     putpixel(x+2,           y+2,           ForeColor);   // Inside
333     putpixel(x+2,           y+yKeySize-3,ForeColor);     //   corner
334     putpixel(x+xKeySize-3,y+2,             ForeColor);   //    pixels.
335     putpixel(x+xKeySize-3,y+yKeySize-3,ForeColor);
336
337     return(x+xKeySize-1);
338
339     } /* genKey() */
340
341
342
343     /*********************************************************************
344
345                 Fill In the Keys
346
347     *********************************************************************/
348
349     int   keyLabels(char **labelStr)
350     {
351     int    x, y, i, j;
352     int    colCnt;
353     int    floodPoly(int,int,int,int,int);
354     char   *rowChar, thisBuf[2];
355
356     settextjustify(CENTER_TEXT,CENTER_TEXT);
357     thisBuf[1] = '\0';
358     y = yKeyStr;
359     for( j=0 ; j<KeyROWS ; j++,y+=KeySZ+1 )
360        {
361        rowChar = *(labelStr+j);
362        x = shiftable[j][0];                    // X-offset
363        colCnt = shiftable[j][1];               // Character count
364        for( i=0 ; i<colCnt ; i++,x+=KeySZ+1 )
365           {                                    // Blank last label
366           floodPoly(x+3,y+3,x+KeySZ-4,y+KeySZ-4,BackColor);
367           thisBuf[0] = *(rowChar+i);
```

```
368         outtextxy(x+KeySZ/2,y+KeySZ/2,thisBuf);
369      }                                           // Display new label
370    }
371    settextjustify(LEFT_TEXT,TOP_TEXT);
372
373    return(0);
374
375 }  /* keyLabels()  */
376
377
378 /******************************************************************
379
380                    Keyboard Item Targets
381
382 ******************************************************************/
383 int    toggle = 0;
384
385 int    keybItem(int yVector)
386 {
387 int    t, b, i, xVector;
388
389    yVector -= vpVal[vpNmb][1];
390    xVector  = xcor - vpVal[vpNmb][0];
391
392    t = yKeyStr +2;
393    b = yKeyStr + KeySZ -3;
394
395    /*
396           Find out if a line has been hit
397    */
398    for( i=0 ; i<KeyROWS ; i++ )
399       if(yVector >= (t+(KeySZ+1)*i) && yVector <= (b+(KeySZ+1)*i))
400          break;
401
402    if(i == KeyROWS)
403       return(OPR);                          // Line not hit
404
405    if(xVector>=extraKey[LfShift][0] && xVector<=extraKey[LfShift][2])
406       if(++toggle%2)
407          keyLabels(keyShift);
408       else
409          keyLabels(keyChar);
410
411    return(0);
412
413 }  /*  keybItem()  */
```

S E C T I O N     F

```
 1    #define  VERSION   21*       /*** targets.c              11-SEP-91
 2
 3              All of the Target Tables for Pointer Inputs.
 4
 5    ***/
 6    #include   "GLBdef.h"
 7    #include   "TARGxy.h"
 8
 9    /*
10    ;
```

```
;-----------------------------------------------------------------;
; PSEUDO-TARGET TABLE FORMAT:        Each entry is five (5) words. ;
;                                                                  ;
;       Tgt#, H0,V0, H1,V1           H0,V0 is the upper-left       ;
;       Tgt#, H0,V0, H1,V1           corner of the PSEUDO-TARGET.  ;
;       Tgt#, H0,V0, H1,V1                0<=H0<H1<=640            ;
;        . . . . .                 - H1,V1 is the lower-right      ;
;        . . . . .                   corner of the PSEUDO-TARGET.  ;
;        . . . . .                        0<=V0<V1<=350            ;
;       Tgt#, H0,V0, H1,V1                                         ;
;       TblEND                      END MARKER   (full word)       ;
;                                                                  ;
;                  Tgt# is a one-word Target Number                ;
;                       between 1 & 65k.                           ;
;-----------------------------------------------------------------;
*/ int    tarVer   =   VERSION;
/*
*/

/***********************************************************************

Table 1

***********************************************************************/ int    targt01[][TblWIDE] =
    {
#include         "topBut.h"                    //  Top row targets.
#include         "sideBut.h"                   //  Side row targets.

};
int    end01 = 0xFFFF;                         //  End marker

/***********************************************************************

Table 2

***********************************************************************/ int    targt02[][TblWIDE] =
    {
#include         "topBut.h"                    //  Top row targets.
#include         "sideBut.h"                   //  Side row targets.

S1cnc,    lCnc,    tCnc,    rCnc,    bCnc,
     S1prv,    lPrv,    tPrv,    rPrv,    bPrv,
     S1nxt,    lNxt,    tNxt,    rNxt,    bNxt,
     S1don,    lDon,    tDon,    rDon,    bDon,
     S1bcd,    lBCd,    tBCd,    rBCd,    bBCd,
     S1tel,    lTel,    tTel,    rTel,    bTel, S1xA1,    lA1,     tA1,     rA1,     bA1,
     S1xA2,    lA2,     tA2,     rA2,     bA2,
     S1xA3,    lA3,     tA3,     rA3,     bA3, S1xB1,    lB1,     tB1,     rB1,     bB1,
     S1xB2,    lB2,     tB2,     rB2,     bB2, S1xC1,    lC1,     tC1,     rC1,     bC1,
     S1xC2,    lC2,     tC2,     rC2,     bC2,
     S1xC3,    lC3,     tC3,     rC3,     bC3, S1xD1,    lD1,     tD1,     rD1,     bD1,
```

```
 79
 80        S1xF1,     1F1,     tF1,     rF1,     bF1,
 81        S1xF2,     1F2,     tF2,     rF2,     bF2,
 82        S1xF3,     1F3,     tF3,     rF3,     bF3,
 83
 84        S1xG1,     1G1,     tG1,     rG1,     bG1,
 85        S1xG2,     1G2,     tG2,     rG2,     bG2,
 86        S1xG3,     1G3,     tG3,     rG3,     bG3,
 87
 88        S1xH1,     1H1,     tH1,     rH1,     bH1,
 89        S1xH2,     1H2,     tH2,     rH2,     bH2,
 90        S1xH3,     1H3,     tH3,     rH3,     bH3,
 91        S1xH4,     1H4,     tH4,     rH4,     bH4,
 92
 93        S1xJ1,     1J1,     tJ1,     rJ1,     bJ1,
 94        S1xJ2,     1J2,     tJ2,     rJ2,     bJ2,
 95
 96        S1xK1,     1K1,     tK1,     rK1,     bK1,
 97        S1xK2,     1K2,     tK2,     rK2,     bK2,
 98        S1xK3,     1K3,     tK3,     rK3,     bK3,
 99
100        };
101   int    end02 = TblEND;                              // End marker.
102   /*
 02   */
103
104   /*******************************************************************
105
106                Table 3
107
108   *******************************************************************/
109
110   int    targt03[][TblWIDE] =
111        {
112   #include         "topBut.h"                          // Top row targets.
113   #include         "sideBut.h"                         // Side row targets.
114        WHENFIELD,  TBD,     TBD,     TBD,     TBD,
115        WHOFIELD,   TBD,     TBD,     TBD,     TBD,
116        WHEREFIELD, TBD,     TBD,     TBD,     TBD,
117        WHYFIELD,   TBD,     TBD,     TBD,     TBD,
118        };
119   int    end03 = TblEND;                              // End marker.
120   /*
 20   */
121
122   /*******************************************************************
123
124                Table 4
125
126   *******************************************************************/
127
128   int    targt04[][TblWIDE] =
129        {
130   #include         "topBut.h"                          // Top row targets.
131   #include         "sideBut.h"                         // Side row targets.
132
133        INFOTAB1,   TBD,     TBD,     TBD,     TBD,
134        INFOTAB2,   TBD,     TBD,     TBD,     TBD,
135        INFOTAB3,   TBD,     TBD,     TBD,     TBD,
136        INFOTAB4,   TBD,     TBD,     TBD,     TBD,
137        INFOTAB5,   TBD,     TBD,     TBD,     TBD,
138
139        INFOCARD1, TBD,     TBD,     TBD,     TBD,
140        INFOCARD2, TBD,     TBD,     TBD,     TBD,
141        INFOCARD3, TBD,     TBD,     TBD,     TBD,
142        INFOCARD4, TBD,     TBD,     TBD,     TBD,
143        INFOCARD5, TBD,     TBD,     TBD,     TBD,
144        INFOCARD6, TBD,     TBD,     TBD,     TBD,
145        INFOCARD7, TBD,     TBD,     TBD,     TBD,
 46        INFOCARD8, TBD,     TBD,     TBD,     TBD,
147        INFOCARD9, TBD,     TBD,     TBD,     TBD,
```

```
148        INFOCARD10,  TBD,       TBD,      TBD,       TBD,
149        INFOCARD11,  TBD,       TBD,      TBD,       TBD,
150        INFOCARD12,  TBD,       TBD,      TBD,       TBD,
151        INFOCARD13,  TBD,       TBD,      TBD,       TBD,
152        INFOCARD14,  TBD,       TBD,      TBD,       TBD,
153        INFOCARD15,  TBD,       TBD,      TBD,       TBD,
154        INFOCARD16,  TBD,       TBD,      TBD,       TBD,
155        INFOCARD17,  TBD,       TBD,      TBD,       TBD,
156        };
157    int    end04 = TblEND ;                      //  End marker.
158
159
160
161    /************************************************************
162
163                   Table 5
164
165    ************************************************************/
166
167    int    targt05[][TblWIDE] =
168        {
169    #include          "topBut.h"                  //  Top row targets.
170    #include          "sideBut.h"                 //  Side row targets.
171
172        MEMOTAB1,    TBD,       TBD,      TBD,       TBD,
173        MEMOTAB2,    TBD,       TBD,      TBD,       TBD,
174        MEMOTAB3,    TBD,       TBD,      TBD,       TBD,
175        MEMOTAB4,    TBD,       TBD,      TBD,       TBD,
176
177        };
178    int    end05 = TblEND ;                      //  End marker.
179
180
181    /************************************************************
182
183                   Table 6
184
185    ************************************************************/
186
187    int    targt06[][TblWIDE] =
188        {
189    #include          "topBut.h"                  //  Top row targets.
190    #include          "sideBut.h"                 //  Side row targets.
191        LST1,        TBD,       TBD,      TBD,       TBD,
192        LST2,        TBD,       TBD,      TBD,       TBD,
193        LST3,        TBD,       TBD,      TBD,       TBD,
194        LISTFIELD,   TBD,       TBD,      TBD,       TBD,
195        LSTC,        TBD,       TBD,      TBD,       TBD,
196        };
197    int    end06 = TblEND ;                      //  End marker.
198    /*
198    */
199
200    /************************************************************
201
202                   Table 7
203
204    ************************************************************/
205
206    int    targt07[][TblWIDE] =
207        {
208    #include          "topBut.h"                  //  Top row targets.
209    #include          "sideBut.h"                 //  Side row targets.
210
211        TOLC,        TBD,       TBD,      TBD,       TBD,
212        TOOLFIELD,   TBD,       TBD,      TBD,       TBD,
213        };
214    int    end07 = TblEND ;                      //  End marker.
215    /*
```

```
/******************************************************************

Table 8

******************************************************************/ int     targt08[][TblWIDE] =
    {
#include            "topBut.h"                  //  Top row targets.
#include            "sideBut.h"                 //  Side row targets.

ClndSL,     ClndSL_l,   ClndSL_t,   ClndSL_r,   ClndSL_b,
    ClndSR,     ClndSR_l,   ClndSR_t,   ClndSR_r,   ClndSR_b,
    ClndYL,     ClndYL_l,   ClndYL_t,   ClndYL_r,   ClndYL_b,
    ClndYR,     ClndYR_l,   ClndYR_t,   ClndYR_r,   ClndYR_b, CALREG,     calDay_l,   calDay_t,   calDay_r,   calDay_b,
    CALOVR,     calOvr_l,   calOvr_t,   calOvr_r,   calOvr_b, CLNC,       TBD,        TBD,        TBD,        TBD,
    };
int     end08 = TblEND ;                        //  End marker.
/*

/******************************************************************

Table 9

******************************************************************/ int     targt09[][TblWIDE] =
    {
#include            "topBut.h"                  //  Top row targets.
#include            "sideBut.h"                 //  Side row targets.

CLCC,       TBD,        TBD,        TBD,        TBD,
    };
int     end09 = TblEND ;                        //  End marker.
/*
/******************************************************************

Table 10

******************************************************************/ int     targt10[][TblWIDE] =
    {
#include            "topBut.h"                  //  Top row targets.
#include            "sideBut.h"                 //  Side row targets.

DILC,       TBD,        TBD,        TBD,        TBD,
    };
int     end10 = TblEND ;                        //  End marker.
/*
/******************************************************************

Table 11

******************************************************************/ int     targt11[][TblWIDE] =
    {
#include            "topBut.h"                  //  Top row targets.
#include            "sideBut.h"                 //  Side row targets.

COMC,       TBD,        TBD,        TBD,        TBD,
    };
int     end11 = TblEND ;                        //  End marker.
/*
```

```
/****************************************************************
            Table 12

****************************************************************/ int    targt12[][TblWIDE] =
    {
#include        "topBut.h"                  //  Top row targets.
#include        "sideBut.h"                 //  Side row targets.

KEYC,       TBD,        TBD,        TBD,        TBD,
    KEYBFIELD,  TBD,        TBD,        TBD,        TBD,
    };
int    end12 = TblEND ;                     //  End marker.
/*
/****************************************************************
            Table 13

****************************************************************/
int    targt13[][TblWIDE] =
    {
#include        "topBut.h"                  //  Top row targets.
#include        "sideBut.h"                 //  Side row targets.

};
int    end13 = TblEND ;                     //  End marker.

/*
        Connections to Assembler
*/
int     vecNumb =13;
int far *vecTable[13] =
    {                                       //  This table is used by the
        (int far *)targt01,                 //     assembler language
        (int far *)targt02,                 //        subsystem.
        (int far *)targt03,
        (int far *)targt04,
        (int far *)targt05,
        (int far *)targt06,
        (int far *)targt07,
        (int far *)targt08,
        (int far *)targt09,
        (int far *)targt10,
        (int far *)targt11,
        (int far *)targt12,
        (int far *)targt13
    } ;

/****************************************************************

Find the Position in a Target Table

****************************************************************/
/*
        Given table number and target number
*/
int    trgPosition(int targTbl,int targNmb)
    {
int    rtnVal = 0;
int    * far *targPntr;
int    *table;

/*
            Find the Correct Table
*/
if(targTbl>vecNumb)                         //  Table dosen't exist
    return(-1);
```

```
357     targPntr = (int * far *)&vecTable;      // Addr of first target table
358     targPntr += targTbl -1;                 // Pointer to requested
359                                             //       target table.
360     table = *targPntr;
361
362     /*
363             Find the Correct Target
364     */
365     rtnVal = 0;
366     while(*(table+(rtnVal*TblWIDE)) != TblEND)
367        if(*(table+(rtnVal*TblWIDE)) == targNmb)
368           break;                             // Matching target.
369        else
370           rtnVal++;
371
372     if(*(table+(rtnVal*TblWIDE)) == TblEND)
373        return(-1);                           // End without a match
374     else
375        return(rtnVal);
376
377     }  /*  trgPosition()  */
378
```

```
1   /***    VERSION "8.8".      TARGxy.h                        12-SEP-91
2
3           Target coordinates for the GrScreen Prototype System.
4
5   ***/
6
7   /*
8           Top Row Button Targets
9   */
10  #define    Top0_l        xTop0                // Top-Left X-value
11  #define    Top0_t        yTop0                // Top-Left Y-value
12  #define    Top0_r        (Top0_l+wTopSZ-1)    // Botton-Right X
13  #define    Top0_b        (Top0_t+hTopSZ-1)    // Botton-Right Y
14
15  #define    Top1_l        xTop1                // Top-Left X-value
16  #define    Top1_t        yTop1                // Top-Left Y-value
17  #define    Top1_r        (Top1_l+wTopSZ-1)    // Botton-Right X
18  #define    Top1_b        (Top1_t+hTopSZ-1)    // Botton-Right Y
19
20  #define    Top2_l        xTop2                // Top-Left X-value
21  #define    Top2_t        yTop2                // Top-Left Y-value
22  #define    Top2_r        (Top2_l+wTopSZ-1)    // Botton-Right X
23  #define    Top2_b        (Top2_t+hTopSZ-1)    // Botton-Right Y
24
25
26  /*
27          Side Row Button Targets
28  */
29  #define    Side1_l       xSide01
30  #define    Side1_t       ySide01
31  #define    Side1_r       (Side1_l+wSideSZ-1)
32  #define    Side1_b       (Side1_t+hSideSZ-1)
33
34  #define    Side2_l       xSide02
35  #define    Side2_t       ySide02
36  #define    Side2_r       (Side2_l+wSideSZ-1)
37  #define    Side2_b       (Side2_t+hSideSZ-1)
38
39  #define    Side3_l       xSide03
40  #define    Side3_t       ySide03
41  #define    Side3_r       (Side3_l+wSideSZ-1)
42  #define    Side3_b       (Side3_t+hSideSZ-1)
43
44  #define    Side4_l       xSide04
45  #define    Side4_t       ySide04
46  #define    Side4_r       (Side4_l+wSideSZ-1)
47  #define    Side4_b       (Side4_t+hSideSZ-1)
48
```

```
49    #define    Side5_l    xSide05
50    #define    Side5_t    ySide05
51    #define    Side5_r    (Side5_l+wSideSZ-1)
52    #define    Side5_b    (Side5_t+hSideSZ-1)
53
54    #define    Side7_l    xSide07
55    #define    Side7_t    ySide07
56    #define    Side7_r    (Side7_l+wSideSZ-1)
57    #define    Side7_b    (Side7_t+hSideSZ-1)
58
59    #define    Side8_l    xSide08
60    #define    Side8_t    ySide08
61    #define    Side8_r    (Side8_l+wSideSZ-1)
62    #define    Side8_b    (Side8_t+hSideSZ-1)
63
64    #define    Side9_l    xSide09
65    #define    Side9_t    ySide09
66    #define    Side9_r    (Side9_l+wSideSZ-1)
67    #define    Side9_b    (Side9_t+hSideSZ-1)
68
69    #define    Sid10_l    xSide10
70    #define    Sid10_t    ySide10
71    #define    Sid10_r    (Sid10_l+wSideSZ-1)
72    #define    Sid10_b    (Sid10_t+hSideSZ-1)
73
74    #define    Sid11_l    xSide11
75    #define    Sid11_t    ySide11
76    #define    Sid11_r    (Sid11_l+wSideSZ-1)
77    #define    Sid11_b    (Sid11_t+hSideSZ-1)
78
79    #define    Sid12_l    xSide12
80    #define    Sid12_t    ySide12
81    #define    Sid12_r    (Sid12_l+wSideSZ-1)
82    #define    Sid12_b    (Sid12_t+hSideSZ-1)
83
84    #define    Sid13_l    xSide13
85    #define    Sid13_t    ySide13
86    #define    Sid13_r    (Sid13_l+wSideSZ-1)
87    #define    Sid13_b    (Sid13_t+hSideSZ-1)
88
89    #define    Sid14_l    xSide14
90    #define    Sid14_t    ySide14
91    #define    Sid14_r    (Sid14_l+wSideSZ-1)
92    #define    Sid14_b    (Sid14_t+hSideSZ-1)
93
94    /*
95             Elevator Bars
96    */
97    #define    ElvLF_l    xElvBotm
98    #define    ElvLF_t    yElvBotm
99    #define    ElvLF_r    (ElvLF_l+wElvBotm/2)
100   #define    ElvLF_b    (ElvLF_t+ElvSZ-1)
101
102   #define    ElvUP_l    xElvSide
103   #define    ElvUP_t    yElvSide
104   #define    ElvUP_r    (ElvUP_l+ElvSZ-1)
105   #define    ElvUP_b    (ElvUP_t+hElvSide/2)
106
107   #define    ElvRT_t    yElvBotm
108   #define    ElvRT_r    (xElvBotm+wElvBotm-1)
109   #define    ElvRT_b    (ElvLF_t+ElvSZ-1)
110   #define    ElvRT_l    (ElvRT_r-wElvBotm/2)
111
112   #define    ElvDN_l    xElvSide
113   #define    ElvDN_t    (ElvDN_b-hElvSide/2)
114   #define    ElvDN_r    (ElvUP_l+ElvSZ-1)
115   #define    ElvDN_b    (yElvSide+hElvSide-1)
116
117   /*
118             EXIT Button
119   */
```

```
120   #define   exit_l      ExitVPx1
121   #define   exit_t      ExitVPy1
122   #define   exit_r      ExitVPx2
123   #define   exit_b      ExitVPy2
124
125   /*
126              Button Targets for Business Card Screen
127   */
128   #define   lBCd        (xBCd+xDspOrg)          //  Bus Cd Button
129   #define   tBCd        (yBCd+yDspOrg)
130   #define   rBCd        (lBCd+wSelc-1)
131   #define   bBCd        (tBCd+hSelc-1)
132
133   #define   lTel        (xTel+xDspOrg)          //  Tel   Button
134   #define   tTel        (yTel+yDspOrg)
135   #define   rTel        (lTel+wSelc-1)
136   #define   bTel        (tTel+hSelc-1)
137
138   #define   lCnc        (xCnc+xDspOrg)          //  Cancel Button
139   #define   tCnc        (yCnc+yDspOrg)
140   #define   rCnc        (lCnc+wCardSZ-1)
141   #define   bCnc        (tCnc+hCardSZ-1)
142
143   #define   lPrv        (xPrv+xDspOrg)          //  Prev Button
144   #define   tPrv        (yPrv+yDspOrg)
145   #define   rPrv        (lPrv+wCardSZ-1)
146   #define   bPrv        (tPrv+hCardSZ-1)
147
148   #define   lNxt        (xNxt+xDspOrg)          //  Next Button
149   #define   tNxt        (yNxt+yDspOrg)
150   #define   rNxt        (lNxt+wCardSZ-1)
151   #define   bNxt        (tNxt+hCardSZ-1)
152
153   #define   lDon        (xDon+xDspOrg)          //  Done Button
154   #define   tDon        (yDon+yDspOrg)
155   #define   rDon        (lDon+wCardSZ-1)
156   #define   bDon        (tDon+hCardSZ-1)
157
158
159   /*
160              Target Fields on the Business Cards
161   */
162   #define   tAz         (yDspOrg+60)
163   #define   bAz         (yDspOrg+70)
164   #define   tBz         (yDspOrg+71)
165   #define   bBz         (yDspOrg+82)
166   #define   tCz         (yDspOrg+84)
167   #define   bCz         (yDspOrg+94)
168   #define   tDz         (yDspOrg+95)
169   #define   bDz         (yDspOrg+106)
170
171   #define   tFz         (yDspOrg+129)
172   #define   bFz         (yDspOrg+139)
173   #define   tGz         (yDspOrg+140)
174   #define   bGz         (yDspOrg+151)
175   #define   tHz         (yDspOrg+152)
176   #define   bHz         (yDspOrg+163)
177
178   #define   tJz         (yDspOrg+198)
179   #define   bJz         (yDspOrg+208)
180   #define   tKz         (yDspOrg+209)
181   #define   bKz         (yDspOrg+220)
182
183   #define   xAK         (xDspOrg+224)
184
185   #define   lA1         xAK
186   #define   tA1         tAz
187   #define   rA1         (lA1+66)
188   #define   bA1         bAz
189
190   #define   lA2         (rA1+1)
```

```
191     #define     tA2         tAz
192     #define     rA2         (lA2+15)
193     #define     bA2         bAz
194
195     #define     lA3         (rA2+1)
196     #define     tA3         tAz
197     #define     rA3         (lA3+41)
198     #define     bA3         bAz
199
200     #define     lB1         xAK
201     #define     tB1         tBz
202     #define     rB1         (lB1+45)
203     #define     bB1         bBz
204
205     #define     lB2         (rB1+1)
206     #define     tB2         tBz
207     #define     rB2         (lB2+48)
208     #define     bB2         bBz
209
210     #define     lC1         xAK
211     #define     tC1         tCz
212     #define     rC1         (lC1+44)
213     #define     bC1         bCz
214
215     #define     lC2         (rC1+1)
216     #define     tC2         tCz
217     #define     rC2         (lC2+60)
218     #define     bC2         bCz
219
220     #define     lC3         (rC2+1)
221     #define     tC3         tCz
222     #define     rC3         (lC3+43)
223     #define     bC3         bCz
224
225     #define     lD1         xAK
226     #define     tD1         tDz
227     #define     rD1         (lD1+56)
228     #define     bD1         bDz
229
230     #define     lF1         (xAK+1)
231     #define     tF1         tFz
232     #define     rF1         (lF1+65)
233     #define     bF1         bFz
234
235     #define     lF2         (rF1+1)
236     #define     tF2         tFz
237     #define     rF2         (lF2+48)
238     #define     bF2         bFz
239
240     #define     lF3         (rF2+1)
241     #define     tF3         tFz
242     #define     rF3         (lF3+68)
243     #define     bF3         bFz
244
245     #define     lG1         (xAK+1)
246     #define     tG1         tGz
247     #define     rG1         (lG1+23)
248     #define     bG1         bGz
249
250     #define     lG2         (rG1+1)
251     #define     tG2         tGz
252     #define     rG2         (lG2+61)
253     #define     bG2         bGz
254
255     #define     lG3         (rG2+1)
256     #define     tG3         tGz
257     #define     rG3         (lG3+36)
258     #define     bG3         bGz
259
260     #define     lH1         (xAK+1)
261     #define     tH1         tHz
```

```
262    #define    rH1         (lH1+67)
263    #define    bH1         bHz
264
265    #define    lH2         (rH1+1)
266    #define    tH2         tHz
267    #define    rH2         (lH2+31)
268    #define    bH2         bHz
269
270    #define    lH3         (rH2+1)
271    #define    tH3         tHz
272    #define    rH3         (lH3+32)
273    #define    bH3         bHz
274
275    #define    lH4         (rH3+1)
276    #define    tH4         tHz
277    #define    rH4         (lH4+71)
278    #define    bH4         bHz
279
280    #define    lJ1         (xAK+2)
281    #define    tJ1         tJz
282    #define    rJ1         (lJ1+20)
283    #define    bJ1         bJz
284
285    #define    lJ2         (rJ1+1)
286    #define    tJ2         tJz
287    #define    rJ2         (lJ1+44)
288    #define    bJ2         bJz
289
290    #define    lK1         (xAK+2)
291    #define    tK1         tKz
292    #define    rK1         (lK1+22)
293    #define    bK1         bKz
294
295    #define    lK2         (rK1+1)
296    #define    tK2         tKz
297    #define    rK2         (lK2+18)
298    #define    bK2         bKz
299
300    #define    lK3         (rK2+1)
301    #define    tK3         tKz
302    #define    rK3         (lK3+44)
303    #define    bK3         bKz
304
305    /*
306               Calendar
307    */
308    #define    ClndSL_l    (ClndVPx1+xScrMonL)
309    #define    ClndSL_t    (ClndVPy1+yScrMonL-SLOPE)
310    #define    ClndSL_r    (ClndSL_l+SLOPE+DROP*2)
311    #define    ClndSL_b    (ClndVPy1+yScrMonL+SLOPE)
312    #define    ClndSR_r    (ClndVPx1+xScrMonR)
313    #define    ClndSR_b    ClndSL_b
314    #define    ClndSR_l    (ClndSR_r-SLOPE-DROP*2)
315    #define    ClndSR_t    ClndSL_t
316
317    #define    ClndYL_l    (ClndVPx1+xScrYrsL)
318    #define    ClndYL_t    ClndSL_t
319    #define    ClndYL_r    (ClndYL_l+SLOPE+DROP*2)
320    #define    ClndYL_b    ClndSL_b
321    #define    ClndYR_r    (ClndVPx1+xScrYrsR)
322    #define    ClndYR_b    ClndYL_b
323    #define    ClndYR_l    (ClndYR_r-SLOPE-DROP*2)
324    #define    ClndYR_t    ClndYL_t
325
326    #define    calDay_l    (ClndVPx1+xDAYstr)
327    #define    calDay_t    (ClndVPy1+yDAYstr)
328    #define    calDay_r    (calDay_l+cellWIDE*6+wDAY)
329    #define    calDay_b    (calDay_t+cellHIGH*4+hDAY)
330
331    #define    calOvr_l    (OverVPx1+xDAYstr)
332    #define    calOvr_t    (OverVPy1+((cellHIGH-hDAY)/2))
```

```
333    #define    cal0vr_r    (cal0vr_l+cellWIDE+wDAY)
334    #define    cal0vr_b    (cal0vr_t+hDAY)
335

1    /*   topBut.h                                                    12-SEP-91   */
  2    /* Target         Left         Top         Right        Lower               */
  3       TOP0      ,    Top0_l   ,   Top0_t  ,   Top0_r   ,   Top0_b   ,
  4       TOP1      ,    Top1_l   ,   Top1_t  ,   Top1_r   ,   Top1_b   ,
  5       TOP2      ,    Top2_l   ,   Top2_t  ,   Top2_r   ,   Top2_b   ,
  6
  7       ElevLF    ,    ElvLF_l  ,   ElvLF_t ,   ElvLF_r  ,   ElvLF_b  ,
  8       ElevRT    ,    ElvRT_l  ,   ElvRT_t ,   ElvRT_r  ,   ElvRT_b  ,
  9       ElevUP    ,    ElvUP_l  ,   ElvUP_t ,   ElvUP_r  ,   ElvUP_b  ,
 10       ElevDN    ,    ElvDN_l  ,   ElvDN_t ,   ElvDN_r  ,   ElvDN_b  ,
 11
 12       QUIT      ,    exit_l   ,   exit_t  ,   exit_r   ,   exit_b   ,
 13

1    /*   sideBut.h                                                   29-JUN-91   */
  2    /* Target         Left         Top         Right        Lower               */
  3       SIDE1     ,    Side1_l  ,   Side1_t ,   Side1_r  ,   Side1_b  ,
  4       SIDE2     ,    Side2_l  ,   Side2_t ,   Side2_r  ,   Side2_b  ,
  5       SIDE3     ,    Side3_l  ,   Side3_t ,   Side3_r  ,   Side3_b  ,
  6       SIDE4     ,    Side4_l  ,   Side4_t ,   Side4_r  ,   Side4_b  ,
  7       SIDE5     ,    Side5_l  ,   Side5_t ,   Side5_r  ,   Side5_b  ,
  8
  9       SIDE7     ,    Side7_l  ,   Side7_t ,   Side7_r  ,   Side7_b  ,
 10       SIDE8     ,    Side8_l  ,   Side8_t ,   Side8_r  ,   Side8_b  ,
 11       SIDE9     ,    Side9_l  ,   Side9_t ,   Side9_r  ,   Side9_b  ,
 12       SID10     ,    Sid10_l  ,   Sid10_t ,   Sid10_r  ,   Sid10_b  ,
 13       SID11     ,    Sid11_l  ,   Sid11_t ,   Sid11_r  ,   Sid11_b  ,
 14       SID12     ,    Sid12_l  ,   Sid12_t ,   Sid12_r  ,   Sid12_b  ,
 15       SID13     ,    Sid13_l  ,   Sid13_t ,   Sid13_r  ,   Sid13_b  ,
 16       SID14     ,    Sid14_l  ,   Sid14_t ,   Sid14_r  ,   Sid14_b  , 1    /***    VERSION "1.2".        TBLext.h                           7-AUG-91
  2
  3           Global externals for targets.c in the GrScreen Prototype System
  4
  5    ***/
  6
  7    extern    int   far   vecTable;
  8    extern    int   far   vecNumb;
  9    extern    int   far   WIDEtbl;
 10    extern    int   far   ENDtbl;
 11
 12    /*
 13
 14           --- VECTORS TO THE TARGET LOOK-UP TABLES ---
 15    */
 16    extern    int   TARGT01[][TblWIDE],TARGT02[][TblWIDE],TARGT03[][TblWIDE];
 17    extern    int   TARGT04[][TblWIDE],TARGT05[][TblWIDE],TARGT06[][TblWIDE];
 18    extern    int   TARGT07[][TblWIDE],TARGT08[][TblWIDE],TARGT09[][TblWIDE];
 19    extern    int   TARGT10[][TblWIDE],TARGT11[][TblWIDE],TARGT12[][TblWIDE];
 20    extern    int   TARGT13[][TblWIDE];
 21
```

S E C T I O N   G

```
  1    #define VERSION "8.7"  /***   GLBpar.c                           30-OCT-91
  2
  3           Global parameters for the GrScreen Prototype System.
  4
  5    ***/
  6    #include  "GLBdef.h"
  7
  8
  9    char    tmpBuf[10];                    // Temporary Buffer
 10    char    fcb[fcbMAX];                   // File Control Block
 11    union REGS    inregs, outregs;
 12    struct SREGS  segregs;
 13
 14    /*
```

```
15              Globals
16      */
17      int     one=1, two=2, three=3, m1, m2, m3, m4;
18      int     clicks, mButn;
19
20      int     ForeColor;                          // Current foreground color
21      int     BackColor;                          // Current background color
22      char    **listPntr;                         // Pointer to current list
23      char    *itemPntr;                          // Points to current transfer item
24      int     itemNumb;                           // Number of items in a list
25      int     pointFLG;                           // Pointer ON or OFF
26      int     xStrList, yStrList, xEndList, yEndList, oldList;
27      int     winFLG;
28      int     HiLiL, HiLiT, HiLiR, HiLiB;         // Border of highlighted text area
29
30      struct  tagHead   bigHead;
31      struct  butVALs   trgButn;                  // Button values
32
33      void far *togSav;                           // Buffer for windows
34      void far *togBuf;                           // Buffer for screens
35
36      /*****************************************************************
37
38                      PARAMETERS with Defaults.
39
40      *****************************************************************/
41
42      int     sec2      = 100     ;   // Three second delay
43      int     key       = 1       ;   // Keyboard entry
44      int     type      = 1       ;   // Type of key
45      int     cmd       = 0       ;   // Command for mouse
46      int     rsl       = 0       ;   // Result code from target
47      int     tgt       = 0       ;   // target number
48      int     tbl       = 0       ;   // Table number for target
49      int     xcor      = 0       ;   // X coordinate of mouse
50      int     ycor      = 0       ;   // Y coordinate of mouse
51      int     stats     = 0       ;   // Status of mouse
52      int     posit     = 0       ;   // Position of character
53      int     unFlg     = 0       ;   // Notes counter.
54      int     urFlg     = 0       ;   // Reminder Counter.
55      int     tOff      = 16      ;   // Offset to first Biz Card field
56      char    match     = NO      ;   // Flag matching search criteria
57      char    logFlag   = NO      ;   // Open DATA LOGGING FILE
58      char    mainStat  = ON      ;   // Flag for end of Program
59
60      int     save_b              ;   // Image of port "B".
61      int     atrTm               ;   // Color attribute for TIME.
62
63      int     xRef, yRef          ;   // Reference co-ordinates
64      int     xRel, yRel          ;   // Relative  co-ordinates
65
66      char    *Mssg1, *Mssg2      ;   // Info/Diag message pointers
67      char    *Omsg1, *Omsg2      ;   // Old Info/Diag message pointers
68      char    msg1[40]            ;   // General message
69      char    msg2[40]            ;   // General message
70      char    tgSay[16]           ;   // Diagnostic message
71      char    xySay[16]           ;   // Diagnostic message
72      char    erSay[16]           ;   // Error count
73      char    nmSay[16]           ;   // Error number
74      char    HitsTxt[] = "Hit at:" ;
75      char    TargTxt[] = "Target:" ;
76      char    ErorTxt[] = "Errors:" ;
77      char    tex[4]              ;   // Text for output.
78      char    blank[4]            ;   // Blank character.
79      char    box1[4]             ;   // Box character.
80      char    box2[4]             ;   // Suspended box character.
81      char    box3[4]             ;   // Filled in box character.
82
83      int     index     = 0       ;   // Page start: 0, 20, 40, etc.
84      int     curpos    = 0       ;   // Page position: 0 to 19.
85      int     curs      = 0       ;   // Absolute doc. pos: 0-219.
```

```
 86
 87    int       plotClr              ;    // Drawing Color.
 88    int       foregrnd, backgrnd   ;    // Text colors.
 89
 90    char      based[6] = "...."    ;    // Month & Day of base date.
 91
 92    char      diagFlg              ;    // Diagnostic System Flag.
 93
 94   /****************************************************************
 95
 96                    Parameters for ViewPort MACROs
 97
 98    ****************************************************************/
 99
100    int    vpNmb;                              // Current viewport
101    int    vpVal[][5] =                        // Parameters for viewports
102       {
103          {  0        , 0        , maxX     , maxY     , CLIP_ON  },
104          {  xDspOrg  , yDspOrg  , xDspEnd  , yDspEnd  , CLIP_ON  },
105          {  xCrdOrg  , yCrdOrg  , xCrdEnd  , yCrdEnd  , CLIP_ON  },
106          {  ListVPx1 , ListVPy1 , ListVPx2 , ListVPy2 , CLIP_ON  },
107          {  ToolVPx1 , ToolVPy1 , ToolVPx2 , ToolVPy2 , CLIP_ON  },
108          {  ClndVPx1 , ClndVPy1 , ClndVPx2 , ClndVPy2 , CLIP_ON  },
109          {  OverVPx1 , OverVPy1 , OverVPx2 , OverVPy2 , CLIP_ON  },
110          {  CalcVPx1 , CalcVPy1 , CalcVPx2 , CalcVPy2 , CLIP_ON  },
111          {  DialVPx1 , DialVPy1 , DialVPx2 , DialVPy2 , CLIP_ON  },
112          {  CommVPx1 , CommVPy1 , CommVPx2 , CommVPy2 , CLIP_ON  },
113          {  TBD      , TBD      , TBD      , TBD      , CLIP_ON  },
114          {  TBD      , TBD      , TBD      , TBD      , CLIP_ON  },
115          {  TBD      , TBD      , TBD      , TBD      , CLIP_ON  },
116          {  TBD      , TBD      , TBD      , TBD      , CLIP_ON  },
117          {  TBD      , TBD      , TBD      , TBD      , CLIP_ON  }
118       };
119
120
121   /****************************************************************
122
123                    Strings & Things for Business Cards
124
125    ****************************************************************/
126
127    int    boxStat[BNMB][2];           //  ON/OFF indicator for boxes
128    int    fieldPnt;                   //  Pointer to current field
129    int    oldField;                   //  Field last displayed
130    int    elemtPnt[FNMB];             //  "  to element of field
131    int    elems[FNMB][BNMB];          //  Elements for all fields
132
133    char   bizCard1[] = "bizCard1.bml"; // Business card (Ken C.)
134    char   *bizCrdFl[FNMB+1] =
135       {
136          "first name: ",
137          " last name: ",
138          "     title: ",
139          "   company: ",
140          "    street: ",
141          "      city: ",
142          "     state: ",
143          "       zip: ",
144          " telephone: ",
145          "       fax: ",
146                NULL                          // End marker
147       };
148
149    char   *bizCdBox[BNMB] =
150       {
151          "KENNETH","G.","CORL",              // A
152          "Human","Factors",                  // B
153          "Design","Resource","Center",       // C
154          "CISG-RL",                          // D
155          "EASTMAN","KODAK","COMPANY",        // F
156          "901","Elmgrove","Road",            // G
```

```
157          "Rochester","New","York","14653-5812",     // H
158          "716","726-0944",                           // J
159          "FAX","716","726-4902"                      // K
160       };
161
162     int   cardBut[][2] =
163       {
164          {  xCnc,      yCnc     },
165          {  xPrv,      yPrv     },
166          {  xNxt,      yNxt     },
167          {  xDon,      yDon     }
168       };
169
170     char  *cardLabel[] =
171       {
172          "Cancel",
173          "Prev",
174          "Next",
175          "Done"
176       };
177
178     char  instMsg[] = "Fill your data file by touching box(s). Press NEXT."
179     char  oldDat[60];
180     char  *oldDatPt, *oldMesg;
181     BYTE  imageSav[imageMAX];                  // Buffer for image toggle
182     int   ocrRate;                             // OCR scan rate, char/sec
183     char  ocrMsg[30] = "";
184
185     /*****************************************************************
186
187                   Tool Window
188
189     *****************************************************************/
190
191     char  *toolType[] =
192       {
193          "Calculator",
194          "Dialer",
195          "Comm"
196       };
197
198     /*****************************************************************
199
200                   Calendar  &  Clock
201
202     *****************************************************************/
203     //                        1
204     //          012 3456 7890 123 456 78
205     char  dateTime[] = "dd\0mth\0yr\0 hr\0mm\0xM";
206     void  interrupt far (*oldTICK)();
207     unsigned   colnCntr ;
208     unsigned   tickCntr ;
209     unsigned   tickLast ;
210     unsigned   secCount ;
211
212     BYTE       TimeUp     ;                // Time update flag
213     BYTE       clkInvisible;               // Don't show the clock flag
214
215     unsigned   clkForeC ;
216     unsigned   clkBackC ;
217     unsigned   clkViewP ;
218     unsigned   clkTimeX ;
219     unsigned   clkTimeY ;
220     unsigned   clkColnX ;
221     unsigned   clkMinsX ;
222     unsigned   clkEndX  ;
223
224     struct date   today;
225     struct time   thisTime;
226     int    year,  calYear;
227     int    month, calMon;
```

```
228     int     day,    calDay;
229     int     minCntr;                        // Minute counter
230     int     secCntr;                        // Second conunter
231     int     hour;
232     int     minute;
233     int     second;
234     int     MonOff;                         // Offset of day 1 from Sunday
235     BYTE    leap = OFF;
236
237     BYTE    dayMax[] =                      // Maximum days in a month
238         {
239             31, 28, 31, 30, 31, 30, 31, 31, 30, 31, 30, 31
240         };
241
242     char    *days[] =
243         {
244             "Sun", "Mon", "Tue", "Wed", "Thu", "Fri", "Sat"
245         };
246
247     char    *months[] =
248         {
249             "JANUARY",    "FEBRUARY",   "MARCH",      "APRIL",
250             "MAY",        "JUNE",       "JULY",       "AUGUST",
251             "SEPTEMBER",  "OCTOBER",    "NOVEMBER",   "DECEMBER"
252         };
253
254
255     char    *monAbr[] =
256         {
257             "Jan", "Feb", "Mar", "Apr",
258             "May", "Jun", "Jul", "Aug",
259             "Sep", "Oct", "Nov", "Dec"
260         };
261
262
263
264     /******************************************************************
265
266                     Bezel Stuff
267
268     ******************************************************************/
269
270     int     sideBut[][2] =
271         {
272             {   xSide01,    ySide01  },
273             {   xSide02,    ySide02  },
274             {   xSide03,    ySide03  },
275             {   xSide04,    ySide04  },
276             {   xSide05,    ySide05  },
277
278             {   xSide07,    ySide07  },
279             {   xSide08,    ySide08  },
280             {   xSide09,    ySide09  },
281             {   xSide10,    ySide10  },
282             {   xSide11,    ySide11  },
283             {   xSide12,    ySide12  },
284             {   xSide13,    ySide13  },
285             {   xSide14,    ySide14  }
286         };
287
288     char    *sideLabel[] =
289         {
290             "List",
291             "Link",
292             "Edit",
293             "Find",
294             "Add",
295             "Cldr",
296             "Clk",
297             "Tool",
298             "Card",
```

```
299            "Conf",
300            "Help",
301            "Pwd",
302            "Pen"
303        };
304
305    /******************************************************************
306
307                    Mouse Cursors
308
309    ******************************************************************/
310    /*
311            Shown here as strings of 1's & 0's, they will be
312            converted to binary by cursConv().
313    */
314
315    char   *curArrowText[CurSIZE][2] =
316        { //    Screen Mask              Cursor Mask
317            "1001111111111111",      "0000000000000000",
318            "1000111111111111",      "0010000000000000",
319            "1000011111111111",      "0011000000000000",
320            "1000001111111111",      "0011100000000000",
321            "1000000111111111",      "0011110000000000",
322            "1000000011111111",      "0011111000000000",
323            "1000000001111111",      "0011111100000000",
324            "1000000000111111",      "0011111110000000",
325            "1000000000011111",      "0011111111000000",
326            "1000000000001111",      "0011111000000000",
327            "1000000111111111",      "0011011000000000",
328            "1000100011111111",      "0010001100000000",
329            "1001100001111111",      "0000001100000000",
330            "1111110000111111",      "0000000110000000",
331            "1111110000111111",      "0000000110000000",
332            "1111111000111111",      "0000000000000000"
333        };
334    int    curArrowHot[2] = {    0, -1 };
335    int    curArrowBin[CurSIZE*2];
336
337    char   *curCrossText[CurSIZE][2] =
338        { //    Screen Mask              Cursor Mask
339            "1111111111111111",      "0000000100000000",
340            "1111111111111111",      "0000000100000000",
341            "1111111111111111",      "0000000100000000",
342            "1111111111111111",      "0000000100000000",
343            "1111111111111111",      "0000000100000000",
344            "1111111111111111",      "0000000100000000",
345            "1111111111111111",      "0000000100000000",
346            "1111111111111111",      "1111111111111110",
347            "1111111111111111",      "0000000100000000",
348            "1111111111111111",      "0000000100000000",
349            "1111111111111111",      "0000000100000000",
350            "1111111111111111",      "0000000100000000",
351            "1111111111111111",      "0000000100000000",
352            "1111111111111111",      "0000000100000000",
353            "1111111111111111",      "0000000100000000",
354            "1111111111111111",      "0000000000000000"
355        };
356    int    curCrossHot[2] = {    7, 7 };
357    int    curCrossBin[CurSIZE*2];
358
359    char   *curPaintText[CurSIZE][2] =
360        { //    Screen Mask              Cursor Mask
361            "1111111111111111",      "0000000000000000",
362            "1111111111111111",      "0000000000000000",
363            "1111111111111111",      "0000000000000000",
364            "1111111111111111",      "0000000000000000",
365            "1111111111111111",      "0000000000000000",
366            "1111111111111111",      "0000000000000000",
367            "1111111111111111",      "0000000100000000",
368            "1111111111111111",      "0000001110000000",
```

```
369         "1111111111111111",    "0000000010000000",
370         "1111111111111111",    "0000000000000000",
371         "1111111111111111",    "0000000000000000",
372         "1111111111111111",    "0000000000000000",
373         "1111111111111111",    "0000000000000000",
374         "1111111111111111",    "0000000000000000",
375         "1111111111111111",    "0000000000000000",
376         "1111111111111111",    "0000000000000000"
377     } ;
378     int   curPaintHot[2] = {   7, 7   };
379     int   curPaintBin[CurSIZE*2];
380
381     int   paintMODE;                    //  Set in painting mode
382     int   paintPNTR;                    //  Set for painting cursor
383     int   paintXstr;
384     int   paintYstr;                    //  Boundries of
385     int   paintXend;                    //              paint area.
386     int   paintYend;
387
388     /**********************************************************************
389
390                 Screen Icons
391
392     **********************************************************************/
393     /*
394                 Shown here as strings of *'s & 's, they will be
395                 converted to binary before use.
396     */
397
398     void  far *closeIcon;               //  Pointer to Close-Icon bitmap
399     char  *closeIconText[] =
400         {
401         "*                  ",
402         "*  *  * ***** *  * ",
403         "*  *  *  *    *  * ",
404         "*     *  *       * ",
405         "*  *     *    *  * ",
406         "*  *     *    *  * ",
407         "*     * *     *  * ",
408         "*     * *     *  * ",
409         "*  *  * *     *  * ",
410         "*  *     *    *  * ",
411         "*     * *     *  * ",
412         "*  *  * *     *  * ",
413         "*  *  * *     *  * ",
414         "*  *  * ***** *  * ",
415         "*     *       *    ",
416         "*     *  *  *  *   ",
417         "*  *  *    *   *   ",
418         "*  *  *  *  *  *   ",
419         "*                  ",
420         "*******************",
421         } ;
422
423
424     /**********************************************************************
425
426                 Process & Error Stacks
427
428     **********************************************************************/
429
430     unsigned   process[prcsSZ];
431     int        prcsIndex;
432     unsigned   errors[errsSZ];
433     int        errsIndex;
434     int        errCount;
435
436     /**********************************************************************
437
438                 Dummy Data Base
439
```

```
440      ****************************************************************/
441
442      char *dataForm[] =    //         2         3         4
443        { // 01234567890123456789012345678901234567890123456789012345678901
444          "1st Name: _____    A.K.A.: _____",
445          "Last Name: _____    Title: _____",
446          "Company: _____",
447          "Address: _____",
448          "City: _____   State: __  Zip: _____-____",
449          "Phone: (___) ___-____                 FAX: (___) ___-____",
450          "Note: _____"
451        } ;
452
453
454      char *dataKenC[] =    //         2         3         4
455        { // 01234567890123456789012345678901234567890123456789012345678901
456          "1st Name: KENNETH C._____    A.K.A.: _____",
457          "Last Name: CORL_____     Title: Human_____",
458          "Company: EASTMAN KODAK COMPANY_____",
459          "Address: 901 Elmgrove Road_____",
460          "City: Rochester_____   State: NY  Zip: 14653-5812",
461          "Phone: (716) 726-0944                 FAX: (716) 726-4902 ",
462          "Note: _____"
463        } ;
464
465
  1      /***     VERSION "8.7".-       GLBext.h                      30-OCT-91
  2
  3               Global externals for GLBpar.c in the GrScreen Prototype System.
  4
  5      ***/
  6
  7      extern    char      tmpBuf[];              // Temporary Buffer
  8      extern    char      fcb[];                 // File Control Block
  9
 10      extern    union     REGS      inregs, outregs;
 11      extern    struct    SREGS     segregs;
 12      extern    struct    tagHead   bigHead;
 13      extern    struct    butVALs   trgButn;     // Button values
 14
 15      extern    void far  *togSav;
 16      extern    void far  *togBuf;
 17
 18      /*
 19               Globals
 20      */
 21      extern    int       one, two, three, m1, m2, m3, m4;
 22      extern    int       clicks, mButn;
 23
 24      extern    int       ForeColor;             // Current foreground color
 25      extern    int       BackColor;             // Current background color
 26      extern    char      **listPntr;            // Pointer to current list
 27      extern    char      *itemPntr;
 28      extern    int       itemNumb ;             // Number of items in a list
 29      extern    int       pointFLG ;             // Pointer ON or OFF
 30      extern    int       xStrList, yStrList, xEndList, yEndList, oldList;
 31      extern    int       winFLG  ;
 32      extern    int       HiLiL, HiLiT, HiLiR, HiLiB;
 33                                                 // Border of highlighted text area
 34
 35      /******************************************************************
 36
 37                        PARAMETERS with Defaults.
 38
 39      ******************************************************************/
 40
 41      extern    int       sec2           ;       // Three second
 42      extern    int       key            ;       // Keyboard
 43      extern    int       type           ;       // Type of
 44      extern    int       cmd            ;       // Command for
```

```
 45    extern   int    rsl                    ;    // Result code from
 46    extern   int    tgt                    ;    // target
 47    extern   int    tbl                    ;    // Table numb for target lookup
 48    extern   int    xcor                   ;    // X coordinate of
 49    extern   int    ycor                   ;    // Y coordinate of
 50    extern   int    stats                  ;    // Status of
 51    extern   int    posit                  ;    // Position of
 52    extern   int    unFlg                  ;    // Notes
 53    extern   int    urFlg                  ;    // Reminder
 54    extern   int    tOff                   ;    // Offset to first Biz Card field
 55    extern   char   match                  ;    // Flag matching search criteria
 56    extern   char   logFlag                ;    // Open DATA LOGGING
 57    extern   char   mainStat               ;    // Flag for end of
 58
 59    extern   int    save_b                 ;    // Image of port "B".
 60    extern   int    atrTm                  ;    // Color attribute for TIME.
 61
 62    extern   int    xRef,  yRef            ;    // Reference co-ordinates
 63    extern   int    xRel,  yRel            ;    // Relative  co-ordinates
 64
 65    extern   char  *Mssg1, *Mssg2          ;    // Info/Diag message pointers
 66    extern   char  *Omsg1, *Omsg2          ;    // Old Info/Diag message pointers
 67    extern   char   msg1[]                 ;    // General message
 68    extern   char   msg2[]                 ;    // General message
 69    extern   char   tgSay[]                ;    // Diagnostic message
 70    extern   char   xySay[]                ;    // Diagnostic message
 71    extern   char   erSay[]                ;    // Error count
 72    extern   char   nmSay[]                ;    // Error number
 73    extern   char HitsTxt[]                ;
 74    extern   char TargTxt[]                ;
 75    extern   char ErorTxt[]                ;
 76    extern   char    tex[]                 ;    // Text for
 77    extern   char    blank[]               ;    // Blank
 78    extern   char    box1[]                ;    // Box
 79    extern   char    box2[]                ;    // Suspended box
 80    extern   char    box3[]                ;    // Filled in box
 81
 82    extern   int    index                  ;    // Page start: 0, 20, 40, etc.
 83    extern   int    curpos                 ;    // Page position: 0 to 19.
 84    extern   int    curs                   ;    // Absolute doc. pos: 0-219.
 85
 86    extern   int    plotClr                ;    // Drawing Color.
 87    extern   int    foregrnd, backgrnd;         // Text colors.
 88
 89    extern   char based[]                  ;    // Month & Day of base date.
 90
 91    extern   char diagFlg                  ;    // Diagnostic System Flag.
 92
 93    extern   int    vpNmb;                 ;    // Current viewport
 94    extern   int    vpVal[][5]             ;    // Parameters for viewports
 95
 96
 97    extern   int    oldField               ;    // Field last displayed
 98
 99    extern   int    fieldPnt               ;    // Pointer to current field
100    extern   int    elemtPnt[]             ;    //   "  to element of field
101    extern   int    elems[][BNMB]          ;    // Elements for all fields
102    extern   int    boxStat[][2]           ;    // ON/OFF indicator for boxes
103
104    extern   char   bizCard1[]             ;    // Business cards
105    extern   char    ocrMsg[]              ;
106
107    extern   char  *bizCrdFl[]             ;    // Array of field info for S1
108    extern   char  *bizCdBox[]             ;    // Array of box contents
109    extern   char   instMsg[]              ;    // Instructions for boxes
110    extern   char   oldDat[]               ;    // Last element display
111    extern   char  *oldDatPt                ;    // Pointer to above
112    extern   char  *oldMesg                 ;    // Pointer to an old message
113    extern   BYTE   imageSav[]             ;    // Buffer for image toggle
114    extern   int    ocrRate                ;    // OCR scan rate, char/sec
115
```

```
116     extern  char    *toolType[]       ;    // ASCII list of tools
117
118     /****************************************************************
119
120                     Calendar
121
122     ****************************************************************/
123
124     extern  char    dateTime[];              // Date - Time group
125     extern  void    interrupt far (*oldTICK)();
126     extern  unsigned  colnCntr     ;
127     extern  unsigned  tickCntr     ;
128     extern  unsigned  tickLast     ;
129     extern  unsigned  secCount     ;
130
131     extern  unsigned  clkForeC     ;
132     extern  unsigned  clkBackC     ;
133     extern  unsigned  clkViewP     ;
134     extern  unsigned  clkTimeX     ;
135     extern  unsigned  clkTimeY     ;
136     extern  unsigned  clkColnX     ;
137     extern  unsigned  clkMinsX     ;
138     extern  unsigned  clkEndX      ;
139
140     extern  struct date    today     ;    // Today's date
141     extern  struct time    thisTime; // Current time
142
143     extern  int     year,  calYear ;
144     extern  int     month, calMon  ;
145     extern  int     day,   calDay  ;
146     extern  BYTE    TimeUp           ;    // Time update flag
147     extern  BYTE    clkInvisible     ;    // Don't show the clock flag
148     extern  int     minCntr          ;    // Minute counter
149     extern  int     secCntr          ;    // Second conunter
150     extern  int     hour             ;
151     extern  int     minute           ;
152     extern  int     second           ;
153     extern  int     MonOff           ;    // Offset of day 1 from Sunday
154     extern  BYTE    leap             ;
155
156     extern  BYTE    dayMax[]         ;    // Maximum days in a month
157     extern  char    *months[]        ;    // ASCII strings for months
158     extern  char    *monAbr[]        ;    // ASCII strings for abrevialtions
159     extern  char    *days[]          ;    // ASCII strings for days
160
161     /****************************************************************
162
163                     Mouse Cursors
164
165     ****************************************************************/
166
167     extern     char   *curArrowText[][2];
168     extern     int    curArrowHot[] ;
169     extern     int    curArrowBin[];
170
171     extern     char   *curCrossText[][2];
172     extern     int    curCrossHot[] ;
173     extern     int    curCrossBin[];
174
175     extern     char   *curPaintText[][2];
176     extern     int    curPaintHot[] ;
177     extern     int    curPaintBin[];
178
179     extern     void   far *closeIcon;         // Pntr to Close-Icon bitmap
180     extern     char   *closeIconText[] ;
181
182     extern     int    paintMODE;              // Set in painting mode
183     extern     int    paintPNTR;              // Set for painting cursor
184     extern     int    paintXstr;
185     extern     int    paintYstr;              // Boundries of
```

```
186    extern    int        paintXend;              //              paint area.
187    extern    int        paintYend;
188
189
190    /******************************************************************
191
192                    Process & Error Stacks
193
194    ******************************************************************/
195
196    extern    unsigned   process[prcsSZ];
197    extern    int        prcsIndex;
198    extern    unsigned   errors[errsSZ];
199    extern    int        errsIndex;
200    extern    int        errCount;
201
202    extern    char       *dataForm[] ;
203    extern    char       *dataKenC[] ;
204
205    extern    int        sideBut[][2] ;
206    extern    char       *sideLabel[] ;
207
208    extern    int        cardBut[][2] ;
209    extern    char       *cardLabel[] ;
```

SECTION H

```
1    /***     VERSION "11.5"      GLBdef.h                      30-OCT-91
2
3                 Global definitions for the GrScreen Prototype System.
4
5    ***/
6
7    #include   <stdio.h>
8    #include   <dos.h>
9    #include   <stdlib.h>
10   #include   <string.h>
11   #include   <conio.h>
12   #include   <graphics.h>
13   #include   <alloc.h>
14
15   /******************************************************************
16
17                    Miscellaneous   Values
18
19   ******************************************************************/
20
21   #define    vDRIVE        DETECT          // Video Driver
22   #define    TBD           9999
23   #define    NONE          -1
24   #define    TRUE          1
25   #define    FALSE         0
26   #define    OFF           0
27   #define    ON            1
28   #define    CLIP_OFF      0
29   #define    CLIP_ON       1
30   #define    NO            0
31   #define    YES           1
32   #define    port_b        0x61            // Number for Port "B".
33
34   #define    W             0
35   #define    N             1
36   #define    E             2
37   #define    S             3
38
39   #define    NW            10
40   #define    NE            12
41   #define    SW            30
42   #define    SE            32
43
```

```
44      #define     buffMAX     25000           //  Size of read buffer
45      #define     imageMAX    600             //  Size of toggle image
46      #define     fcbMAX      38              //  Size of fcb buffer
47      #define     HDR4        0x76            //  Header, 4 bits/pixel
48      #define     HDR1        0x3E            //  Header, 1 bit/pixel
49      #define     HiPix       0x0F            //  Value for a ONE
50      #define     LoPix       0               //  Value for a ZERO
51      #define     HERE        -1
52
53      #define     BEG         0
54      #define     END         1
55      #define     TRG         2
56
57      #define     HIGH        1
58      #define     LOW         2
59      #define     TOG         0
60      #define     DLY         1
61
62      #define     sRate       8               //  OCR delay, chars/second
63
64      #define     diagFLG     ON              //  Diagnostic Flag
65
66      #define     prcsSZ      20              //  Size of process stack
67      #define     errsSZ      20              //  Size of errors stack
68
69      #define     xFtag       44
70      #define     yFtag       250
71      #define     xFdat       138
72      #define     yFdat       yFtag
73
74      /****************************************************************
75
76                  Mouse Squeeks       (Pointer)
77
78      ****************************************************************/
79
80      #define     mouse       cmousel         //  Call for LARGE model.
81      #define     RIGHT       1
82      #define     LEFT        2
83      #define     BOTH        3
84      #define     UP          4
85      #define     DOWN        5
86      #define     QUIT        -2
87      #define     CurSIZE     16
88
89
90      /****************************************************************
91
92                  Date / Time Group Indexes
93
94      ****************************************************************/
95
96      #define     dayIndx     0
97      #define     monIndx     3
98      #define     yearIndx    7
99      #define     hourIndx    11
100     #define     colnIndx    13
101     #define     minIndx     14
102     #define     secIndx     17
103     #define     anpIndx     17
104
105
106     /****************************************************************
107
108                 Clock
109
110     ****************************************************************/
111
112     #define     TICKSEC     18              //  Ticks per second
113     #define     TICKMIN     (TICKSEC*60)    //  Ticks per minute
114     #define     colonON     10              //  Second indicator ON time
```

```
115    #define   colonOFF   (TICKSEC-colonON)   // Second indicator ON time
116
117    #define   timeGAP    4
118    #define   colnGAP    7
119
120    /****************************************************************
121
122                   Interrupt Numbers
123
124    ****************************************************************/
125
126    #define   VIDEO      0x10           //  Interrupt 10, VIDEO_IO
127    #define   EQUIP      0x11           //  Interrupt 11, Equipment
128    #define   COMNS      0x14           //  Interrupt 14, Communications
129    #define   KEYBOARD   0x16           //  Interrupt 16, Keyboard
130    #define   PRINT      0x17           //  Interrupt 17, Printer
131    #define   TICK       0x1C           //  Interrupt 1C, Clock ticks
132    #define   FUNC       0x21           //  Interrupt 21, Function calls
133    #define   MOUSE      0x33           //  Interrupt 33, Mouse functions
134    #define   TIMER      0x40           //  Base location for timer ports
135
136
137    /****************************************************************
138
139                   Colors
140
141    ****************************************************************/
142
143    #define   BaseBACK   LIGHTBLUE
144    #define   ButnBACK   BROWN
145    #define   InfoBACK   CYAN
146    #define   InfoFORE   WHITE
147    #define   InfoXCHG   YELLOW
148    #define   ExitBACK   RED
149    #define   ExitFORE   BLACK
150
151
152    /****************************************************************
153
154                   Screen Values:   Simulated LCD Display
155
156    ****************************************************************/
157
158    #define   maxX       639            //  Max x-val of full screen
159    #define   maxY       479            //  Max y-val of full screen
160    #define   maxWIDE    640            //  Width of full screen
161    #define   maxHIGH    350            //  Height of full screen
162    #define   dspWIDE    480            //  Width and Height of
163    #define   dspHIGH    320            //     simulated display.
164
165    #define   xDspOrg    132            //  Origin & end point
166    #define   yDspOrg    17
167    #define   xDspEnd    (xDspOrg+dspWIDE-1)
168    #define   yDspEnd    (yDspOrg+dspHIGH-1)
169
170    /****************************************************************
171
172                   Standard Button Parameters
173
174    ****************************************************************/
175    #define   stdBx      45             // Width of standard button box
176    #define   stdBy      16             // Height of standard button box
177    #define   genGAP     2              // General gap
178
179    #define   wTopSZ     92             // Top bezel button
180    #define   hTopSZ     12
181
182    #define   wSideSZ    55             // Side bezel button
183    #define   hSideSZ    25
184
185    /****************************************************************
```

```
186
187                    Bezel Buttons & Elevator Bars
188
189    ***************************************************************/
190    #define    yTop              1
191    #define    TopGAP            35
192
193    #define    xTop0             (xDspOrg+20)
194    #define    yTop0             yTop
195    #define    xTop1             (xTop0+wTopSZ+TopGAP)
196    #define    yTop1             yTop0
197    #define    xTop2             (xTop1+wTopSZ+TopGAP)
198    #define    yTop2             yTop0
199    #define    xTop3             (xTop2+wTopSZ+(TopGAP*2)/3)
200    #define    yTop3             yTop0
201
202    #define    xSide1            5
203    #define    xSide2            (xDspOrg/2+xSide1)
204    #define    SideGAP           6
205
206    #define    xSide01           xSide1                          //  List
207    #define    ySide01           (yDspOrg+SideGAP)
208    #define    xSide02           xSide2                          //  Link
209    #define    ySide02           ySide01
210
211    #define    xSide03           xSide1                          //  Edit
212    #define    ySide03           (ySide01+hSideSZ+SideGAP)
213    #define    xSide04           xSide2                          //  Find
214    #define    ySide04           ySide03
215
216    #define    xSide05           (xSide1+(wSideSZ+xSide1)/2)     //  Add
217    #define    ySide05           (ySide03+hSideSZ+SideGAP)
218
219    #define    xSide07           xSide1                          //  Cldr
220    #define    ySide07           (ySide05+(hSideSZ+SideGAP)*2)
221    #define    xSide08           xSide2                          //  Clk
222    #define    ySide08           ySide07
223
224    #define    xSide09           xSide1                          //  Tool
225    #define    ySide09           (ySide07+hSideSZ+SideGAP)
226    #define    xSide10           xSide2                          //  Card
227    #define    ySide10           ySide09
228
229    #define    xSide11           xSide1                          //  Conf
230    #define    ySide11           (ySide09+(hSideSZ+SideGAP)*2)
231    #define    xSide12           xSide2                          //  Help
232    #define    ySide12           ySide11
233
234    #define    xSide13           xSide1                          //  Pwb
235    #define    ySide13           (ySide11+(hSideSZ+SideGAP)*2)
236    #define    xSide14           xSide2                          //  Pen
237    #define    ySide14           ySide13
238
239    #define    ElvSZ             12
240
241    #define    xElvBotm          xDspOrg
242    #define    yElvBotm          (yDspEnd+4)
243    #define    wElvBotm          dspWIDE
244    #define    hElvBotm          ElvSZ
245
246    #define    xElvSide          (xDspEnd+4)
247    #define    yElvSide          yDspOrg
248    #define    wElvSide          ElvSZ
249    #define    hElvSide          dspHIGH
250
251    /****************************************************************
252
253              The Information Screen   (all absolute values)
254
255    ***************************************************************/
```

```
256   #define    infoGAP        5
257   #define    infoWIDE       maxWIDE
258   #define    infoHIGH       (480-infoGAP-maxHIGH)
259   #define    InfoVPx1       0
260   #define    InfoVPy1       (480-infoHIGH)
261   #define    InfoVPx2       (InfoVPx1+infoWIDE-1)
262   #define    InfoVPy2       (InfoVPy1+infoHIGH-1)
263
264   #define    xInst          150
265   #define    yInst          440
266
267   #define    exitWIDE       80
268   #define    exitHIGH       50
269   #define    ExitVPx1       (InfoVPx2-exitWIDE)
270   #define    ExitVPy1       (InfoVPy2-exitHIGH)
271   #define    ExitVPx2       InfoVPx2
272   #define    ExitVPy2       InfoVPy2
273
274   #define    xHitsTxt       (InfoVPx1+10)
275   #define    yHitsTxt       (InfoVPy1+70)
276
277   #define    xTargTxt       xHitsTxt
278   #define    yTargTxt       (yHitsTxt+16)
279
280   #define    xErorTxt       xHitsTxt
281   #define    yErorTxt       (yHitsTxt+32)
282
283   #define    xHits          (xHitsTxt+textwidth(HitsTxt))
284   #define    yHits          yHitsTxt
285
286   #define    xTarg          (xTargTxt+textwidth(TargTxt))
287   #define    yTarg          yTargTxt
288
289   #define    xEror          (xErorTxt+textwidth(ErorTxt))
290   #define    yEror          yErorTxt
291
292   #define    xEnmb          (xEror+45)
293   #define    yEnmb          yErorTxt
294
295   #define    xMssg1         (xHits+100)
296   #define    yMssg1         yHitsTxt
297
298   #define    xMssg2         (xTarg+100)
299   #define    yMssg2         yTargTxt
300
301   /****************************************************************
302
303              Arrow Dimensions
304
305   ****************************************************************/
306   #define    RISE       8            // Length of arrowhead
307   #define    REACH      15           // Length of entire arrow
308   #define    FLANGE     2            // Flange of arrowhead
309   #define    xCoOrd     0            // Indexes
310   #define    yCoOrd     1            //     for arrays
311
312   #define    endGAP     3            // Gap at end of arrows
313   #define    midGAP     (RISE+2)     // Gap between arrow groups
314   #define    perGAP     3            // Perimeter gap for arrow boxes
315
316   #define    yBODY      23
317   #define    secondGAP  12
318   #define    prmptGAP   15
319
320   /****************************************************************
321
322              Business Card Window
323
324   ****************************************************************/
325   #define    crdSizeX   400          // Size of business card
326   #define    crdSizeY   190          //       X & Y
```

```
327     #define     crdSizeW     (crdSizeX/8)         // Card width in bytes
328     #define     crdWIDE      (crdSizeX+2)         // Width and Height of
329     #define     crdHIGH      (crdSizeY+2)         //   Business card window
330
331     #define     xCrdOrg      (xDspOrg+44)
332     #define     yCrdOrg      (yDspOrg+50)
333     #define     xCrdEnd      (xCrdOrg+crdWIDE-1)
334     #define     yCrdEnd      (yCrdOrg+crdHIGH-1)
335
336     #define     xInd         360
337     #define     yInd         20
338     #define     xOmsg        150
339     #define     yOmsg        yInd
340
341     #define     xCFR         0                    // Card frame origin with
342     #define     yCFR         0                    //   ref to LCD screen.
343     #define     xCRD         1                    // Business card origin
344     #define     yCRD         1                    //   ref to card frame.
345
346     #define     wBcTeSZ      46
347     #define     hBcTeSZ      17
348
349     /*
350                 Card Buttons on Screen ONE
351     */
352     #define     FNMB         10                   // Number of fields
353     #define     BNMB         24                   // Number of boxes (elements)
354
355     #define     wCardSZ      52                   // Button size (Width)
356     #define     hCardSZ      20                   // Button size (Height)
357     #define     yCard        267                  // Button Y position
358
359     #define     wSelc        45                   // Width of card selection but
360     #define     hSelc        18                   // Height of card selection but
361     #define     ySelc        13
362
363     #define     xBCd         5                    // Bus Cd Button
364     #define     yBCd         ySelc
365
366     #define     xTel         73                   // Tel  Button
367     #define     yTel         ySelc
368
369     #define     xCnc         44                   // Cancel Button
370     #define     yCnc         yCard
371
372     #define     xPrv         254                  // Prev Button
373     #define     yPrv         yCard
374
375     #define     xNxt         322                  // Next Button
376     #define     yNxt         yCard
377
378     #define     xDon         392                  // Done Button
379     #define     yDon         yCard
380
381
382     /*****************************************************************
383
384                        ***  WINDOWS  ***
385
386     ******************************************************************/
387
388     #define     newGAP       25
389     #define     winGAP       3                    // Edge gap for window outline
390     #define     CloseSZ      20                   // Size of close box
391
392     /*
393                 List Window
394     */
395     #define     COMPANY      1
396     #define     CONTACT      2
```

```
397     #define     TITLE       3
398     #define     CITY        4
399     #define     STATE       5
400     #define     CtySta      6
401     #define     COUNTRY     7
402     #define     INDUSTRY    8
403     #define     FIRST       9
404     #define     LAST        10
405     #define     AKA         11
406
407     #define     ListSpc     12
408     #define     listMAX     24
409
410     #define     LISTWIDE    180
411     #define     LISTHIGH    (dspHIGH-40)
412     #define     ListVPx1    (xDspEnd-LISTWIDE)
413     #define     ListVPy1    (yDspOrg+40)
414     #define     ListVPx2    (ListVPx1+LISTWIDE)
415     #define     ListVPy2    (ListVPy1+LISTHIGH)
416     #define     LcloseX     (LISTWIDE-winGAP)
417     #define     LcloseY     winGAP
418
419     /*
420                     Tool Window
421     */
422     #define     TOOLWIDE    100
423     #define     TOOLHIGH    100
424     #define     ToolOff     34              // Location of tool item 1
425     #define     ToolSpc     16              // Separation between items
426
427     #define     ToolVPx1    xDspOrg
428     #define     ToolVPy1    (yDspEnd-TOOLHIGH)
429     #define     ToolVPx2    (ToolVPx1+TOOLWIDE)
430     #define     ToolVPy2    (ToolVPy1+TOOLHIGH)
431
432     #define     TcloseX     (TOOLWIDE-winGAP)
433     #define     TcloseY     winGAP
434     #define     TlinesX     (winGAP+2)
435     #define     TlinesY     (ToolOff-2)
436
437     /*
438                     Calculator
439     */
440     #define     CALCWIDE    (195+winGAP*2)
441     #define     CALCHIGH    (190+winGAP*2)
442
443     #define     xCalcOrg    (xDspOrg+(dspWIDE-CALCWIDE)/2)
444     #define     yCalcOrg    (yDspOrg+(dspHIGH-CALCHIGH)/3)
445
446     #define     CalcVPx1    xCalcOrg
447     #define     CalcVPy1    yCalcOrg
448     #define     CalcVPx2    (CalcVPx1+CALCWIDE)
449     #define     CalcVPy2    (CalcVPy1+CALCHIGH)
450     #define     CalcCzX     (CALCWIDE-winGAP)
451     #define     CalcCzY     winGAP
452
453     /*
454                     Calendar
455     */
456     #define     Jan91off    2               // Offset for January 1991
457     #define     cellWIDE    32              // Width of single day cell
458     #define     cellHIGH    20              // Height of single day cell
459     #define     headHIGH    35              // Height of the header area
460
461     #define     CLNDWIDE    ((7*cellWIDE)+(2*winGAP))
462     #define     CLNDHIGH    ((5*cellHIGH)+(2*winGAP)+headHIGH)
463
464     #define     xClndOrg    (xDspOrg+(dspWIDE-CLNDWIDE)/2)
465     #define     yClndOrg    (yDspOrg+(dspHIGH-CLNDHIGH)/2)
466
467     #define     ClndVPx1    xClndOrg
```

```
468     #define     ClndVPy1     yClndOrg
469     #define     ClndVPx2     (ClndVPx1+CLNDWIDE)
470     #define     ClndVPy2     (ClndVPy1+CLNDHIGH)
471     #define     DcloseX      (CLNDWIDE-winGAP)
472     #define     DcloseY      winGAP
473
474     #define     wDAY         (cellWIDE-6)
475     #define     hDAY         (cellHIGH-4)
476     #define     xDAYstr      (winGAP+((cellWIDE-wDAY)/2))
477     #define     yDAYstr      (winGAP+((cellHIGH-hDAY)/2)+headHIGH)
478
479     #define     xMONname     (winGAP+60)
480     #define     yMONname     (winGAP+10)
481     #define     xYRSname     (CLNDWIDE-winGAP-CloseSZ-45)
482     #define     yYRSname     yMONname
483
484     #define     xScrMonL     (xMONname-50)
485     #define     yScrMonL     (yMONname+2)
486     #define     xScrMonR     (xMONname+51)
487     #define     yScrMonR     yScrMonL
488
489     #define     xScrYrsL     (xYRSname-30)
490     #define     yScrYrsL     yScrMonL
491     #define     xScrYrsR     (xYRSname+31)
492     #define     yScrYrsR     yScrMonR
493
494     #define     SLOPE        3
495     #define     DROP         3
496
497     #define     OVERWIDE     ((cellWIDE+winGAP)*2)
498     #define     OVERHIGH     (cellHIGH+winGAP)
499     #define     OverVPx1     ClndVPx1
500     #define     OverVPy1     (ClndVPy2-winGAP)
501     #define     OverVPx2     (OverVPx1+OVERWIDE)
502     #define     OverVPy2     (OverVPy1+OVERHIGH)
503     #define     xCellOff     8
504     #define     yCellOff     3
505
506     /*
507                 Dialer
508     */
509     #define     DIALWIDE     180
510     #define     DIALHIGH     120
511
512     #define     xDialOrg     (xDspOrg+(dspWIDE-DIALWIDE)/3)
513     #define     yDialOrg     (yDspOrg+(dspHIGH-DIALHIGH)/2)
514
515     #define     DialVPx1     xDialOrg
516     #define     DialVPy1     yDialOrg
517     #define     DialVPx2     (DialVPx1+DIALWIDE)
518     #define     DialVPy2     (DialVPy1+DIALHIGH)
519     #define     DialCzX      (DIALWIDE-winGAP)
520     #define     DialCzY      winGAP
521
522     /*
523                 Communicator
524     */
525     #define     COMMWIDE     150
526     #define     COMMHIGH     150
527
528     #define     xCommOrg     (xDspOrg+(dspWIDE-COMMWIDE)/4)
529     #define     yCommOrg     (yDspOrg+(dspHIGH-COMMHIGH)/2)
530
531     #define     CommVPx1     xCommOrg
532     #define     CommVPy1     yCommOrg
533     #define     CommVPx2     (CommVPx1+COMMWIDE)
534     #define     CommVPy2     (CommVPy1+COMMHIGH)
535     #define     CommCzX      (COMMWIDE-winGAP)
536     #define     CommCzY      winGAP
537
538     /******************************************************************
```

```
                    Target or Keyboard Type Numbers:

/******************************************************************* define    BACKSPACE   0x08        //  Backspace
define    TAB         0x09        //  Forward Tab.
#define    CR          0x0D        //  Carriage return
#define    BACTAB      0x0F        //  Back Tab.
#define    SPC         0x20        //  Space
define    ZERO        0x30        //  ASCII 0 define    DONE        S1don       //  Done define    WRIT        60          //  Write.
define    ALPH        61          //  Alph - qwerty......
#define    ENTR        62          //  Enter.
#define    SLCT        64          //  Select
#define    SRCH        65          //  SEARCH
#define    VYEW        66          //  VIEW
#define    UNDO        67          //  Undo
#define    PRNT        69          //  Print.
define    XFER        70          //  Transfer define    LST1        74          //  List 1.
define    LST2        75          //  List 2.
#define    LST3        76          //  List 3.
#define    NEXT        S1nxt       //  NEXT
#define    PREV        S1prv       //  Previous.
#define    CNCL        S1cnc       //  Cancel
#define    BuCd        S1bcd       //  Business Card
define    TELE        S1tel       //  TelePhone define    CLSW        LSTC        //  Close Window on screen
define    DIAG        90          //  Special Diagnostic code.

/*******************************************************************

Target Table Assignments

*******************************************************************/ define    TblWIDE     5           //  Entries per target
define    TblEND      -1          //  End Mark for target tables.

#define    mainTRG     1           //  Initial screen & banner.
#define    cardTRG     2           //  Screen target number
#define    skedTRG     3           //  Screen target number
#define    infoTRG     4           //  Screen target number
#define    memoTRG     5           //  Screen target number
#define    listTRG     6           //  Window target number
#define    toolTRG     7           //  Window target number
#define    clndTRG     8           //  Window target number
#define    calcTRG     9           //  Window target number
#define    dialTRG     10          //  Window target number
#define    commTRG     11          //  Window target number
define    keybTRG     12          //  Window target number define    SKEDDAY1    491
define    SKEDDAY2    492
#define    SKEDDAY3    493
#define    SKEDDAY4    494
#define    SKEDDAY5    495
#define    SKEDDAY6    496
define    SKEDDAY7    497 define    TOP0        500
define    TOP1        501
#define    TOP2        502
#define    TOP3        503
```

```
609    #define    INFOTAB1    505
610    #define    INFOTAB2    506
611    #define    INFOTAB3    507
612    #define    INFOTAB4    508
613    #define    INFOTAB5    509
614
615    #define    SIDE0       510
616    #define    SIDE1       511
617    #define    SIDE2       512
618    #define    SIDE3       513
619    #define    SIDE4       514
620    #define    SIDE5       515
621    #define    SIDE6       516
622    #define    SIDE7       517
623    #define    SIDE8       518
624    #define    SIDE9       519
625    #define    SID10       520
626    #define    SID11       521
627    #define    SID12       522
628    #define    SID13       523
629    #define    SID14       524
630
631    #define    MEMOTAB1    525
632    #define    MEMOTAB2    526
633    #define    MEMOTAB3    527
634    #define    MEMOTAB4    528
635
636    #define    S1cnc       540
637    #define    S1prv       541
638    #define    S1nxt       542
639    #define    S1don       543
640    #define    S1bcd       544
641    #define    S1tel       545
642
643    #define    TOOL0       546           //   Must
644    #define    TOOL1       547           //     be
645    #define    TOOL2       548           //       consecutive
646    #define    TOOL3       549           //         numbers
647
648    #define    KEYC        553           //   Keyboard close
649    #define    CLCC        554           //   Calculator close
650    #define    CLNC        555           //   Calendar close
651    #define    DILC        556           //   Dialer close
652    #define    COMC        557           //   Communicator close
653    #define    LSTC        558           //   List close
654    #define    TOLC        559           //   Tool close
655    #define    TOOLFIELD   560           //   Tool items area
656    #define    LISTFIELD   561           //   List items area
657    #define    WHENFIELD   562           //   Sked items area
658    #define    WHOFIELD    563           //   Sked items area
659    #define    WHEREFIELD  564           //   Sked items area
660    #define    WHYFIELD    565           //   Sked items area
661    #define    KEYBFIELD   566
662
663    #define    ClndSL      567           //   Calendar month left
664    #define    ClndSR      568           //   Calendar month right
665    #define    ClndYL      569           //   Calendar year left
666    #define    ClndYR      570           //   Calendar year right
667
668    #define    INFOCARD1   571
669    #define    INFOCARD2   572
670    #define    INFOCARD3   573
671    #define    INFOCARD4   574
672    #define    INFOCARD5   575
673    #define    INFOCARD6   576
674    #define    INFOCARD7   577
675    #define    INFOCARD8   578
676    #define    INFOCARD9   579
677    #define    INFOCARD10  580
678    #define    INFOCARD11  581
679    #define    INFOCARD12  582
```

```
680     #define     INFOCARD13      583
681     #define     INFOCARD14      584
682     #define     INFOCARD15      585
683     #define     INFOCARD16      586
684     #define     INFOCARD17      587
685     #define     InfoCrdCnt      (INFOCARD17-INFOCARD1+1)
686
687     #define     ElevLF          591             //  Elevator bar Left
688     #define     ElevRT          592             //  Elevator bar Right
689     #define     ElevUP          593             //  Elevator bar Up
690     #define     ElevDN          594             //  Elevator bar Down
691
692     #define     LstElvLF        595             //  List elevator bar Left
693     #define     LstElvRT        596             //  List elevator bar Right
694     #define     LstElvUP        597             //  List elevator bar Up
695     #define     LstElvDN        598             //  List elevator bar Down
696
697     #define     vOffSet         600
698
699     #define     S1xA1           (vOffSet+0)     //  The 1st biz card target
700     #define     S1xA2           (vOffSet+1)
701     #define     S1xA3           (vOffSet+2)
702
703     #define     S1xB1           (vOffSet+3)
704     #define     S1xB2           (vOffSet+4)
705
706     #define     S1xC1           (vOffSet+5)
707     #define     S1xC2           (vOffSet+6)
708     #define     S1xC3           (vOffSet+7)
709
710     #define     S1xD1           (vOffSet+8)
711
712     #define     S1xF1           (vOffSet+9)
713     #define     S1xF2           (vOffSet+10)
714     #define     S1xF3           (vOffSet+11)
715
716     #define     S1xG1           (vOffSet+12)
717     #define     S1xG2           (vOffSet+13)
718     #define     S1xG3           (vOffSet+14)
719
720     #define     S1xH1           (vOffSet+15)
721     #define     S1xH2           (vOffSet+16)
722     #define     S1xH3           (vOffSet+17)
723     #define     S1xH4           (vOffSet+18)
724
725     #define     S1xJ1           (vOffSet+19)
726     #define     S1xJ2           (vOffSet+20)
727
728     #define     S1xK1           (vOffSet+21)
729     #define     S1xK2           (vOffSet+22)
730     #define     S1xK3           (vOffSet+23)
731
732     #define     firstCardTarg   S1xA1
733     #define     tOFFdef         16              //  Default offset position in table
734
735     #define     CALREG          650
736     #define     CALOVR          651
737
738     #define     OPR             0               //  Operator/input flag for returns.
739                                                 //      Must be zero.
740     #define     CALC            TOOL0           //  Calculator
741     #define     DIAL            TOOL1           //  Dialer
742     #define     COMM            TOOL2           //  Communicator
743     #define     SKED            TOP0
744     #define     INFO            TOP1
745     #define     MEMO            TOP2
746
747     #define     LIST            SIDE1
748     #define     LINK            SIDE2
749     #define     EDIT            SIDE3
```

```
750     #define   FIND      SIDE4
751     #define   ADD       SIDE5
752
753     #define   CLDR      SIDE7
754     #define   CLCK      SIDE8
755     #define   TOOL      SIDE9
756     #define   CARD      SID10
757     #define   CONF      SID11
758     #define   HELP      SID12
759     #define   PWD       SID13
760     #define   PEN       SID14
761
762
763     /******************************************************************
764
765                       Macros
766
767     ******************************************************************/
768
769     #define   MAINSCRN   0
770     #define   LCDsSCRN   1
771     #define   S1CdSCRN   2
772     #define   LISTWIND   3
773     #define   TOOLWIND   4
774     #define   CLNDWIND   5
775     #define   OVERWIND   6
776     #define   CALCWIND   7
777     #define   DIALWIND   8
778     #define   COMMWIND   9
779     #define   LISTSCRN   10
780     #define   KEYBWIND   11
781     #define   CANVASVP   14
782
783     #define   vpSET(v)   {setviewport(vpVal[v][0],vpVal[v][1],vpVal[v][2],v
784
785     #define   BLANKSPC   outtext(" ");
786
787     #define   imageToggle(l,t,r,b,x)   {getimage(l,t,r,b,x);putimage(l,t,x,N
788     #define   targToggle(t)   {imageToggle(TARGT02[t+tOFF][1],TARGT02[t+tOFF
789
790     #define   PointON    {mouse(&one,&m2,&m3,&m4);pointFLG++;};
791     #define   PointOFF   {mouse(&two,&m2,&m3,&m4);pointFLG--;};
792     #define   PointUP    {m2=-1;while(m2!=0)mouse(&three,&m2,&m3,&m4);};
793
794     /******************************************************************
795
796                       Structures
797
798     ******************************************************************/
799
800     //   The typedefs are from WINDOWS.H
801
802     typedef unsigned char      BYTE;
803     typedef unsigned int       WORD;
804     typedef unsigned long      DWORD;
805
806     typedef struct tagBITMAPFILEHEADER {
807             WORD      bfType;
808             DWORD     bfSize;
809             WORD      bfReserved1;
810             WORD      bfReserved2;
811             DWORD     bfOffBits;
812     } BITMAPFILEHEADER;
813
814     typedef struct tagBITMAPINFOHEADER{
815             DWORD     biSize;
816             DWORD     biWidth;
817             DWORD     biHeight;
818             WORD      biPlanes;
819     WORD      biBitCount;
820
```

```
821            DWORD       biCompression;       DWORD      biXPelsPerMeter;
822            DWORD       biYPelsPerMeter;
823            DWORD       biClrUsed;
824            DWORD       biClrImportant;
825       } BITMAPINFOHEADER;
826
827       struct    tagBig
828         {
829         BYTE    header[HDR1];
830         BYTE    grid[crdSizeY][crdSizeW];
831         };
832
833       struct    tagHead
834         {
835         struct    tagBITMAPFILEHEADER    hFile;
836         struct    tagBITMAPINFOHEADER    hInfo;
837         };
838
839       struct    butVALs
840         {
841         unsigned     xAbs;              // Origin (absolute)
842         unsigned     yAbs;
843         unsigned     wAbs;              // Width & height
844         unsigned     hAbs;
845
846         unsigned     xRel;              // Origin (relative to
847         unsigned     yRel;              //    viewport)
848         };
```

What is claimed is:

1. An electronic organizer comprising:

text data entry means, coupled to a memory unit, for entering text data into the memory unit;

image data entry means, coupled to the memory unit, for entering image data into the memory unit, wherein the image data entry means includes a linear electronic scanning unit;

a small document transport mechanism for transporting small documents past the electronic scanning unit;

processing means, coupled to the memory unit, for retrieving the text and image data entered in the memory unit; and display means, coupled to the processing means, for displaying the text and image data retrieved by the processing means;

wherein said document transport mechanism comprises transport wheels coupled to a drive axle and a document pinch roller coupled to the drive axle by pinch roller drive gears; and wherein the transport wheels rotate and cause the drive axle to drive the document pinch roller via the pinch roller drive gears when the transport wheels are placed in contact with a surface and the organizer is moved across the surface.

2. An electronic organizer as claimed in claim 1, wherein the display means includes a touch sensitive display unit.

3. An electronic organizer as claimed in claim 1, wherein the text and image data are stored in the memory unit in a relational database format.

4. An electronic organizer comprising:

a main unit including an integral scanning unit, a touch sensitive display unit, a memory unit, and control means, coupled to the integral scanning unit, the touch sensitive display unit and the memory unit, for controlling the processing and storage of text and image data entered into the main unit through the integral scanning unit and the touch sensitive display unit; and a battery unit, releaseably coupled to the main unit, wherein the battery unit supplies power to the integral scanning unit, the touch sensitive display unit, the memory unit and the control means of the main unit;

wherein the main unit further comprises a small document transport mechanism for transporting documents past the integral scanning unit, said small document transport mechanism comprising transport wheels coupled to a drive axle and a document pinch roller coupled to the drive axle by pinch roller drive gears; and wherein the transport wheels rotate and cause the drive axle to drive the document pinch roller via the pinch roller drive gears when the transport wheels are placed in contact with a surface and the organizer is moved across the surface.

5. An electronic organizer as claimed in claim 4, wherein the small document transport mechanism extends from the main unit during operation and retracts into the main unit when not in operation.

6. An electronic organizer as claimed in claim 4, further comprising an encoder unit coupled to the drive axle by an encoder gear assembly, wherein the encoder unit generates signals, indicative of the movement of the organizer during a scanning operation, that are supplied to the control means.

7. An electronic organizer as claimed in claim 4, wherein machine generated text data is scanned by the integral scanning unit to produce scanned text data that is supplied to the control means, and wherein the control means applies an optical character recognition routine to the scanned text data produced by the integral scanning unit to convert the scanned text data to computer coded text data.

8. An electronic organizer as claimed in claim 7, wherein hand-printed text data is produced by the touch sensitive display unit in response to an operator input and supplied to the control means, and wherein the control means performs and optical character recognition routine on the hand-printed text data to generate computer coded text data.

9. An electronic organizer as claimed in claim 4, wherein the control means includes a central processing unit and a digital signal processing unit coupled to a system bus, the display unit and the memory unit are coupled to the system bus, and the scanning unit is coupled to the digital signal processing unit.

10. An electronic organizer as claimed in claim 9, wherein the main unit further comprises memory expansion slots coupled to the system bus.

11. An electronic organizer as claimed in claim 4, wherein the image and text data is stored in the memory unit in a relational database format in which a file tag, containing at least one linking field, is used to identify related image and text data in a plurality of databases.

12. An electronic organizer as claimed in claim 4, wherein the main unit further comprises a speaker unit coupled to the control means.

13. An electronic organizer as claimed in claim 4, wherein the main unit further comprises a communications module coupled to the control means.

14. An electronic organizer as claimed in claim 4, further comprising a pen unit that is used to activate the touch sensitive display unit.

15. An electronic organizer as claimed in claim 4, further comprising an electronic camera unit, separate from the integral scanning unit, coupled to the control means of the main unit.

* * * * *